(12) United States Patent
Takamine et al.

(10) Patent No.: US 6,240,055 B1
(45) Date of Patent: May 29, 2001

(54) FOCUS POSITION ADJUSTMENT DEVICE AND OPTICAL DISC DRIVE APPARATUS

(75) Inventors: Kouichi Takamine, Kawanishi; Kenji Fujiune, Neyagawa; Akihiro Hatsusegawa, Kyoto; Hiroyuki Yamaguchi, Nishinomiya, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/200,009

(22) Filed: Nov. 25, 1998

(30) Foreign Application Priority Data

Nov. 26, 1997 (JP) .................................................. 9-323665
Sep. 16, 1998 (JP) ................................................ 10-261157

(51) Int. Cl.$^7$ ...................................................... G11B 7/00
(52) U.S. Cl. ................................... 369/44.29; 369/44.35; 369/55.22; 369/53.23
(58) Field of Search ........................... 369/44.34, 94, 369/44.35, 44.27, 44.29, 44.25, 53

(56) References Cited

U.S. PATENT DOCUMENTS

| | | |
|---|---|---|
| 5,297,114 | 3/1994 | Itoh et al. . |
| 5,351,224 | 9/1994 | Nagata et al. . |
| 5,481,526 | 1/1996 | Nagata et al. . |
| 5,568,461 | * 10/1996 | Nishiuchi et al. .................... 369/110 |
| 5,751,675 | 5/1998 | Tsutsui et al. . |
| 5,771,214 | * 6/1998 | Saga ................................. 369/44.25 |
| 5,808,983 | 9/1998 | Tsutsui et al. . |

FOREIGN PATENT DOCUMENTS

| | | |
|---|---|---|
| 1307929 | 12/1989 | (JP) . |
| 3259428 | 11/1991 | (JP) . |
| 3260916 | 11/1991 | (JP) . |
| 4205928 | 7/1992 | (JP) . |
| 97193 | 1/1997 | (JP) . |

\* cited by examiner

*Primary Examiner*—Nabil Hindi
(74) *Attorney, Agent, or Firm*—Price and Gess

(57) ABSTRACT

While discerning whether the laser beam spot is positioned on a land track or a groove track according to the L/G switch signal LGS from the land groove detection unit 34, the focus position rough detection unit 50 and the focus position precise detection unit 60 detect two new focus positions (for the land and the groove) so that the bit error rate BER that is measured in the error rate measurement unit 33 and the envelope of and the jitter in the reproduction signal RF would improve, and output two control signals (FBAL and FOFF) for changing the control target position into the new two focus position to the focus error detection unit 36.1.

43 Claims, 37 Drawing Sheets

BROADBAND TRACKING
ERROR SIGNAL (RFTE)

PEAK ENVELOPE OF RFTE
IN BINARY NUMBERS

BOTTOM ENVELOPE OF RFTE
IN BINARY NUMBERS

IDGATE

FIG. 13

| DETECTION EXAMPLE NO. | | GROOVE TRACK | LAND TRACK | REMARKS |
|---|---|---|---|---|
| 1 | FBAL | [FBAL] --→ | FBAL | |
| | FOFF | — | [FOFF] | |
| 2 | FBAL | FBAL ←-- | [FBAL] | REVERSE L/G IN NO.1 |
| | FOFF | [FOFF] | — | |
| 3 | FBAL | [FIRST FBAL] | [SECOND FBAL] | |
| | FOFF | — | — | |
| 4 | FBAL | — | — | |
| | FOFF | [FIRST FOFF] | [SECOND FOFF] | |
| 5 | FBAL | [FBAL] --→ | FBAL | |
| | FOFF | — | FOFF | |
| 6 | FBAL | FBAL ←-- | [FBAL] | REVERSE L/G IN NO.5 |
| | FOFF | FOFF | — | |
| 7 | FBAL | FIRST FBAL | SECOND FBAL | |
| | FOFF | [FOFF] --→ | FOFF | |
| 8 | FBAL | FIRST FBAL | SECOND FBAL | REVERSE L/G IN NO.7 |
| | FOFF | FOFF | [FOFF] | |

 :DETECTION    :REUSE

FIG. 14

| | | | PRESCRIBED RANGE(MM) | NUMBER OF SECTORS IN ONE TRACK | NUMBER OF TRACK | SECTOR NUMBER (hex value) |
|---|---|---|---|---|---|---|
| LEAD-IN AREA | EMBOSS DATA AREA | BLANK AREA | 22.59~23.996 | 18 | 1896 | 27AB0~2EFFF |
| | | REFERENCE SIGNAL AREA | | | | 2F000~2F00F |
| | | BLANK AREA | | | | 2F010~2F1FF |
| | | CONTROL DATA AREA | | | | 2F200~2FDFF |
| | | BLANK AREA | | | | 2FE00~2FFFF |
| | MIRROR AREA | CONNECTION AREA | 23.996~24.00 | | | |
| | REWRITABLE DATA AREA | GUARD TRACK AREA | 24.00~24.18 | 17 | 1888 | 3000~301FF |
| | | DISK TEST AREA | | | | 30200~305FF |
| | | DRIVE TEST AREA | | | | 30600~300FF |
| | | GUARD TRACK AREA | | | | 30D00~30EFF |
| | | DISK TEST AREA | | | | 30F00~30F7F |
| | | DMA1&2 | | | | 30F80~30FFF |
| DATA AREA | | ZONE 0 | 24.18~25.40 | 17 | | 31000~37D5F |
| | | ZONE 1 | 25.40~26.79 | 18 | 1888 | 37D60~4021F |
| | | ZONE 2 | 26.79~28.19 | 19 | 1888 | 40220~48E3F |
| | | ZONE 3 | 28.19~29.59 | 20 | 1888 | 48E40~521BF |
| | | ZONE 4 | 29.59~30.99 | 21 | 1888 | 521C0~5BC9F |
| | | ZONE 5 | 30.99~32.28 | 22 | 1888 | 5BCA0~65EDF |
| | | ZONE 6 | 32.38~33.78 | 23 | 1888 | 65EE0~7087F |
| | | ZONE 7 | 33.78~35.18 | 24 | 1888 | 70880~7B97F |
| | | ZONE 8 | 35.18~36.57 | 25 | 1888 | 7B980~871DF |
| | | ZONE 9 | 36.57~37.97 | 26 | 1888 | 871E0~9319F |
| | | ZONE 10 | 37.97~39.37 | 27 | 1888 | 931A0~9F8BF |
| | | ZONE 11 | 39.37~40.76 | 28 | 1888 | 9F8C0~AC73F |
| | | ZONE 12 | 40.76~42.16 | 29 | 1888 | AC740~B9D1F |
| | | ZONE 13 | 42.16~43.56 | 30 | 1888 | B9D20~C7A5F |
| | | ZONE 14 | 43.56~44.96 | 31 | 1888 | C7A60~D5EFF |
| | | ZONE 15 | 44.96~46.35 | 32 | 1888 | D5F00~E4AFF |
| | | ZONE 16 | 46.35~47.75 | 33 | 1888 | E4B00~F3E5F |
| | | ZONE 17 | 47.75~49.15 | 34 | 1888 | F3E60~10391F |
| | | ZONE 18 | 49.15~50.55 | 35 | 1888 | 103920~113B3F |
| | | ZONE 19 | 50.55~51.94 | 36 | 1888 | 113B40~1244BF |
| | | ZONE 20 | 51.94~53.34 | 37 | 1888 | 1244C0~13559F |
| | | ZONE 21 | 53.34~54.74 | 38 | 1888 | 1355A0~146DDF |
| | | ZONE 22 | 54.74~56.13 | 39 | 1888 | 146DE0~158D7F |
| | | ZONE 23 | 56.13~57.53 | 40 | 1888 | 158D80~16B47F |
| LEAD-OUT AREA (= REWRITABLE DATA AREA) | | DMA3&4 | 57.53~58.60 | 40 | 1446 | 16B480~16B4FF |
| | | DISK CONFIRMATION AREA | | | | 16B500~16B57F |
| | | GUARD TRACK AREA | | | | 16B580~16B77F |
| | | DISK TEST AREA | | | | 16B780~16BE7F |
| | | DRIVE TEST AREA | | | | 16BE80~16C57F |
| | | GUARD TRACK AREA | | | | 16C580~17966F |

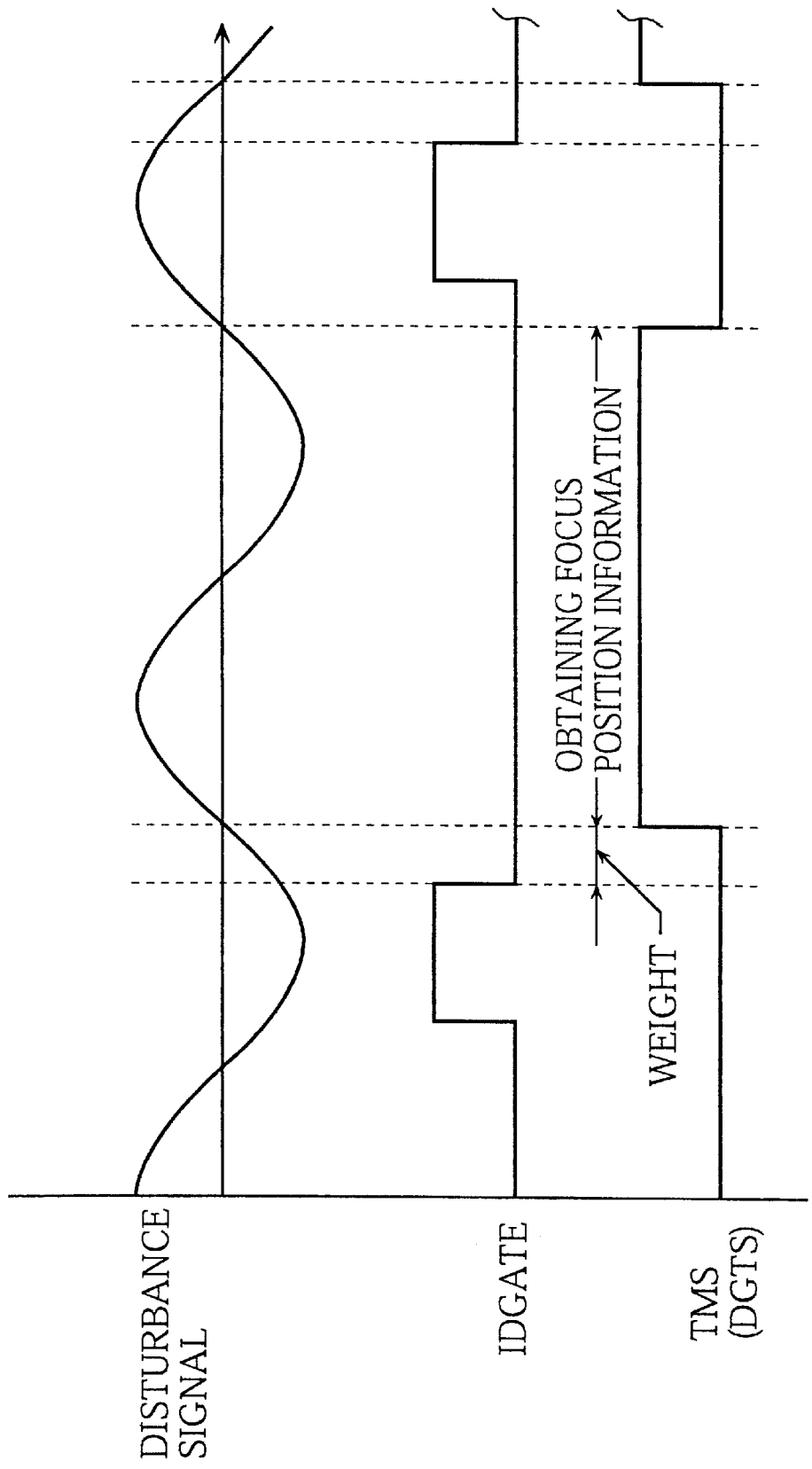

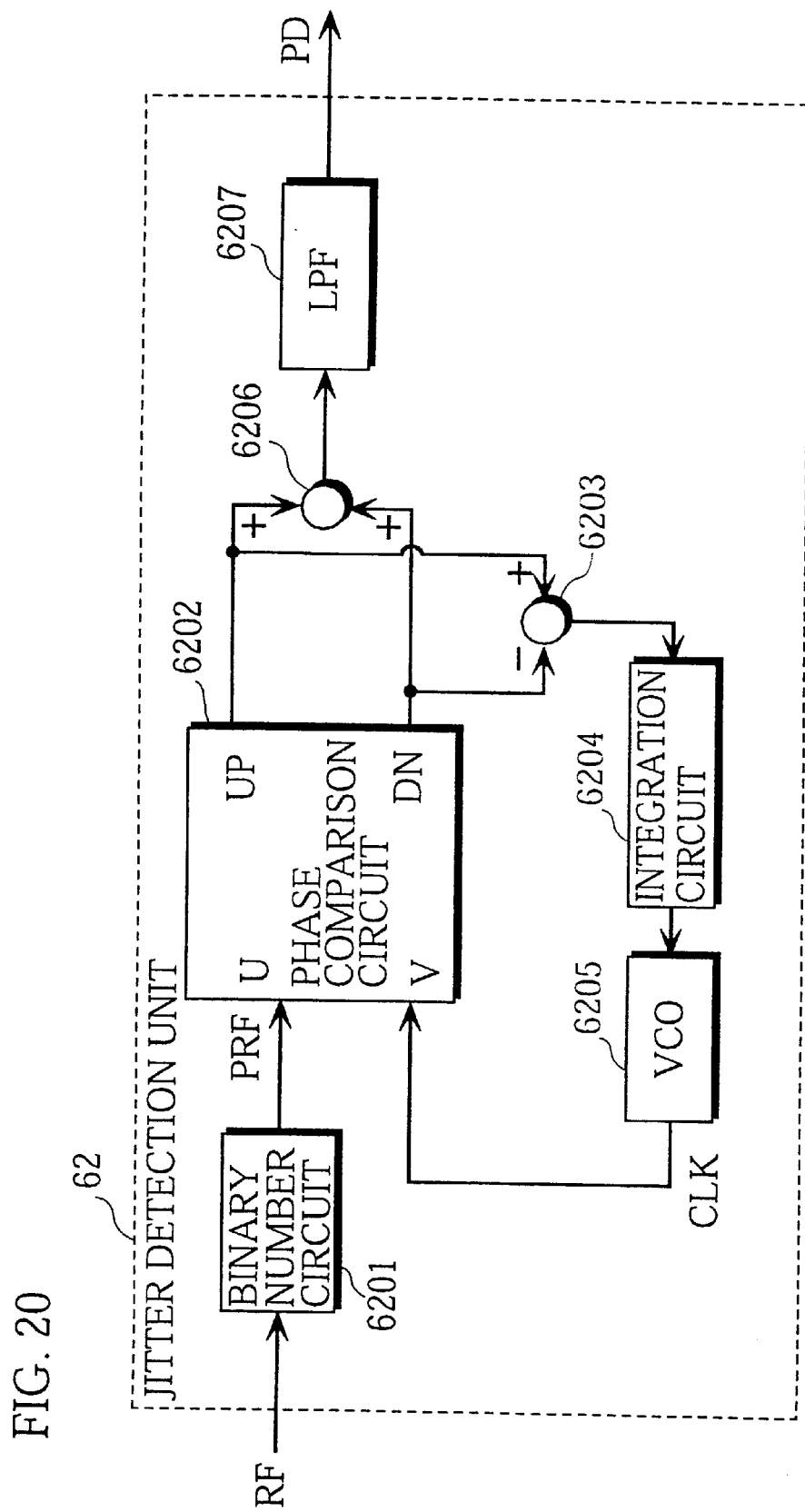

FOCUS POSITION ADJUSTMENT DEVICE AND OPTICAL DISC DRIVE APPARATUS

This application is based on application Nos. 9-323665 and 10-261157 filed in Japan, the content of which is hereby incorporated by reference.

BACKGROUND OF THE INVENTION (1) Field of the Invention

The present invention relates to a focus position adjustment device that adjusts the focus position of a recordable and reproducible optical disc and to an optical disc drive apparatus.

(2) Description of the Prior Art

With the development of multimedia technologies, an optical disc drive apparatus has been widely used as a bulk auxiliary memory in a personal computer or a graphic audio system. In an optical disc drive apparatus, an optical disc such as a compact disc (CD) and a digital video disc (DVD) is used as record medium. Information such as computer data and graphic audio data is recorded on such an optical disc, and the information recorded on the optical disc is reproduced.

In such an optical disc drive apparatus, focus servo and tracking servo have been performed so that information would be recorded or reproduced properly. In this specification, the focus servo refers to control the laser beam directed at an optical disc so that the laser beam would always converge to a certain condition. The focus servo is performed according to a focus error signal that is a signal created from a reflected beam at the laser beam spot by an optical disc. A focus error signal shows a shift of the position of the laser beam on an optical disc (called a "focus position" in this specification). On the other hand, the tracking servo refers to control the laser beam so that the laser beam would follow the track that is formed in a spiral on an optical disc.

An optical disc set in an optical disc drive apparatus is rotated by a spindle motor. When the rotation speed attains a certain level, a laser beam is directed at the optical disc. While the focus servo and the tracking servo are being performed, information is recorded on the optical disc and information recorded on the optical disc is reproduced.

A conventional optical disc drive apparatus in which the focus servo and the tracking servo are performed, however, has problems described below.

First of all, in a conventional optical disc drive apparatus, the focus servo is performed for an optical disc in single spiral land groove format (SS-L/GFMT) without distinguishing a groove track (a concave part of the guide groove of the track that is formed in a spiral) and a land track (a convex part of the guide groove). As a result, it is not always possible to perform the accurate focus servo especially for a high-density optical disc. In this specification, an optical disc in SS-L/GFMT refers to an optical disc on which one turn of recordable and reproducible groove track and land track are alternatively formed from the inner radius to the outer radius and information may be consecutively recorded and reproduced on the land and groove tracks.

When the laser beam reflected by an optical disc of this type passes through an object lens, the diffraction of the reflected beam is influenced by the aberration of the object lens, and the distributions of the diffracted beam for the land track and groove track are different. As a result, the relationships between the zero level of the focus error signal (the control target position of the focus position) and the focus positions for the land track and groove track are different. In other words, in a conventional optical disc drive apparatus, the focus positions are controlled so that a focus position would always converge into the same control target position in the focus servo, and the focus positions for the land tracks and the groove tracks are different. As a result, when the focus positions are adjusted so that the reproduction condition (and the recording condition for a recordable optical disc) would be best for one of the land track and the groove track, it is impossible to obtain the best reproduction condition (and the best recording condition for a recordable optical disc) for the other one.

Secondly, in a conventional disc drive apparatus, it is not considered that the zero level of the focus error signal is not always the best focus position. As a result, the degree of the errors in reproduction is relatively high. In other words, the control target position corresponding to the zero level of the focus error signal and the focus position at which the amplitude of the reproduction signal detected by the optical head is the best (maximum) or the jitter in the reproduction signal is the best (minimum) (called a "best focus position" in this specification) are not always the same. In this case, even when the focus servo is performed according to the control target position, the amplitude of the obtained reproduction signal may be smaller than the original signal and the reproduction jitter may be bigger, so that the number of reproduction errors would be increased. As a result, it is impossible for such a conventional disc drive apparatus to sufficiently record and reproduce data.

Thirdly, for an optical disc in SS-L/GFMT, even when the focus position is adjusted so that the amplitude of the reproduction signal would be maximum or the reproduction jitter is minimum, errors may be produced since the sizes of the amplitude of the reproduction signal and the reproduction jitter are different for the address area and data area. On an optical disc in SS-L/GFMT, address areas are formed between sectors that are areas in which data are recorded. In an address area, the track number and the sector number for identifying a sector are recorded in advance with pits in a different manner in data areas. As a result, adjustment errors are produced in a conventional manner in which the focus position is adjusted using the size of the amplitude of the reproduction signal or the reproduction jitter as the focus position information (the information showing the present focus position, i.e., the shift of the position of the laser beam for the optical disc) since the values shown by the focus position information in the data area and the address area are different.

Fourthly, when the displacement of the face shake that is produced at a certain frequency by the rotation of an optical disc is relatively large, errors are produced for focus position information. As a result, fine adjustment of a focus position is prevented.

Further, for an optical disc in SS-L/GFMT, (1) when a focus position shifts significantly from the best focus position, it is impossible to correctly obtain the address information that is a precondition for the adjustment of the focus position, (2) when an optical disc is shipped, nothing is recorded in the data area on the optical disc. As a result, it is impossible to obtain the focus position information from the data area of an optical disc on which no data is recorded, so that (3) if a test pattern is recorded on an unrecorded optical disc in advance, correct recording can be impossible when the focus position significantly shifts from the best focus position. As a result, when the focus position shifts so significantly that the address information may not be read out, it is impossible to detect the best focus position for an optical disc in SS-L/GFMT Still further, for a write-protected optical disc in SS-L/GFMT, it is impossible to tentatively record a test pattern on the optical disc when nothing is recorded in the data area.

In addition, for an optical disc in SS-L/GFMT, even when the recording/reproduction processing is correctly performed, the surrounding temperature can change the characteristics of the optical head, and the zero level of the focus error signal that is detected by the optical head, i.e., the control target position in the focus servo can change. As a result, it is impossible to start the detect of the focus position even when the best focus position is detected on the activation of the optical disc drive apparatus and the recording/reproduction processing is correctly performed, when the error rate in the recording/reproduction processing is higher than the acceptable value and the laser beam power in recording reaches the maximum value due to the characteristic changes of the optical head over time.

SUMMARY OF THE INVENTION

It is accordingly an object of the present invention to provide a focus position adjustment device and an optical disc drive apparatus that obtain good recording and reproduction characteristics for both of a land track and a groove track.

Another object of the present invention is to provide a focus position adjustment device that performs the focus position adjustment with high accuracy in which the shift of the zero level of the focus error signal from the best focus position for recording and reproducing is considered even when the zero level of the focus error signal is not always the best focus position. More specifically, the second object is to provide a focus position adjustment device with which the inconvenience that reproduction errors arise due to the disregard of the amplitude or the jitter in the reproduction signal is avoided.

A further object of the present invention is to provide a focus position adjustment device that performs the focus position adjustment with high accuracy in which the disturbance of the focus position information by the address areas on an optical disc is avoided even for an optical disc on which pits are formed in different ways in the address areas and the data areas.

Yet another object of the present invention is to provide a focus position adjustment device that performs the focus position adjustment in which the adjustment errors due to the face shake of an optical disc is reduced.

A still further object of the present invention is to provide a focus position adjustment device that adjusts the focus position again even when the focus position shifts too much to read the address information.

An additional object of the present invention is to provide a focus position adjustment device that detects the best focus position even for a write-protected optical disc on which no information is recorded.

Another object of the present invention is to provide a focus position adjustment device that begins the focus position detection even when the error rate in recording and reproducing is beyond the tolerance due to the change of the temperature characteristics of the optical element, and even when the optical beam power reaches the upper limit.

The above-mentioned first object is achieved by a focus position adjustment device for an optical disc that includes a first shape track and a second shape track, and an optical disc drive apparatus that records information on an optical disc including a first shape track and a second shape track and reproduces the information recorded on the optical disc, both of which may include: a focus error detection unit for detecting a convergence condition of a laser beam that is directed at the optical disc, and for outputting a focus error signal that represents the convergence condition; a focus control unit for changing a focus position of the laser beam according to the focus error signal so that the convergence condition is a predetermined condition; a reproduction condition detection unit for detecting a reproduction condition of the optical disc according to a reproduction signal when information that has been recorded on the optical disc is read; a track detection unit for detecting whether a laser beam spot is positioned on a first or second shape track, and for outputting a track identification signal that represents a track on which the laser beam spot is positioned; and a focus position detection unit that includes: a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal.

Such a focus position adjustment device discerns whether the laser beam spot is positioned on a first shape track or a second shape track, detects the new focus position with which the reproduction condition is better for a land track and a groove track independently, and controls the focus position for a land track and a groove track independently so that the new focus positions would be the focus control target positions. As a result, the conventional inconvenience that the reproduction condition is good for one of a land track and a groove track and is not good for another one.

The above-mentioned second object is achieved by the focus position adjustment device, wherein the reproduction condition detection means detects the reproduction condition according to the reproduction signal and the focus error signal, and by the focus position adjustment device, wherein the reproduction condition detection unit may includes: an envelope detection unit for detecting an envelope of the reproduction signal; and a jitter detection unit for detecting jitter in the reproduction signal, and wherein the reproduction condition detection unit detects the reproduction condition according to the detected envelope, the detected jitter, and the focus error signal.

With such a focus position adjustment device, the reproduction information includes the information on the envelope and the jitter in the reproduction signal, and the focus position detection unit detects the focus position according to the reproduction signal. As a result, the focus position adjustment with high accuracy is realized. More specifically, the conventional inconvenience of increasing reproduction error, which is given when the focus position is controlled according only to the amplitude of the reproduction signal and according only to the jitter in the reproduction signal, is avoided.

The above-mentioned third object is achieved by the focus position adjustment device that may further include an area detection unit for detecting whether the laser beam spot is positioned in a data area or an address area on the optical disc, wherein the reproduction condition detection unit detects a part of the reproduction signal according to the detection by the area detection unit, and detects the reproduction condition according to the detected part of the reproduction signal, and by the focus position adjustment device, wherein the reproduction condition detection unit detects the reproduction condition according to the detected part of the reproduction signal only when the area detection unit detects that the laser beam spot is positioned in a data area.

Such a focus position adjustment device removes the address areas on an optical disc and adjusts the focus position. As a result, even when the focus position adjustment is performed for an optical disc on which pits are formed in different ways in the address areas and the data areas, the disturbance of the focus position adjustment due to the difference is avoided.

The above-mentioned fourth object is achieved by the focus position adjustment device that may further include face shake element exclusion filter for excluding a frequency element that represents a face shake of the optical disc from the focus error signal, wherein the reproduction condition detection unit detects the reproduction condition according to the reproduction signal and the focus error signal from which the frequency element has been removed, and by the focus position adjustment device that may further include sector designation unit for designating sectors which each is positioned at a point where a face shake acceleration is small, wherein the reproduction condition detection unit detects the reproduction condition according to the focus error signal and the reproduction signal that has been obtained from the designated sectors.

With such a focus position adjustment device, the reproduction condition in which the face shake element of an optical disc is removed is obtained, and the focus position is adjusted according to such a reproduction condition. The focus position adjustment with high accuracy that is rarely influenced by the face shake of an optical disc is realized.

The above-mentioned fifth object is achieved by the focus position adjustment device, wherein the focus position renewal unit judges whether the reproduction condition improves when the focus position is moved by a predetermined amount, and determines the first and second renewed focus position according to the judgement by the focus position renewal unit.

In such a focus position adjustment device, the focus position detection unit forcefully shifts the focus position by a predetermined amount that has been set in advance, and determines the new focus target position according to the reproduction condition obtained by the shift. As a result, even when the precise adjustment of the focus position is impossible due to the drastic shift of the focus position, the focus position may be adjusted again.

The above-mentioned sixth object is achieved by the focus position adjustment device that may further include recording unit for recording test data on a test area that has been allocated in at least one of a lead-in area and a lead-out area on the optical disc, wherein the reproduction condition detection unit detects the reproduction condition according to the reproduction signal when the test data is read.

With such a focus position adjustment device, the test data is recorded in the areas apart from the write-protected areas, and the focus position is adjusted using the test data. As a result, the focus position is detected even for a write-protected optical disc on which no information is recorded.

The above-mentioned seventh object is achieved by the focus position adjustment device that may further include: a poor condition judgement unit for judging whether the reproduction condition is a poor condition in which the reproduction condition is beyond a predetermined tolerance level; and a re-detection unit for having the focus position renewal unit determine new first and second renewed focus positions and for having the focus error signal modification unit modify the focus error signal when the poor condition judgement unit has judged that the reproduction condition is the poor condition.

With such a focus position adjustment device, the focus position adjustment is started not only when an optical disc starts to be rotated, but also when a certain poor condition is found. As a result, the certain poor condition is improved.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 13 shows transformed examples of a rough focus position detection in the present embodiment;

FIG. 14 shows the layout of the information areas on the optical disc 1 in SS-L/GFMT;

FIG. 18 is a timing chart of the disturbance signal, the gate signal IDGATE, and the timer signal TMS when the read gate detection unit 32 does not operate;

FIG. 20 is a block diagram showing the in-detail structure of a jitter detection unit 62;

DESCRIPTION OF THE PREFERRED EMBODIMENT

An optical disc drive apparatus 100 according to the present invention will be explained with reference to figures.
(Structure of Optical Disc Drive Apparatus 100)

Figure 1:
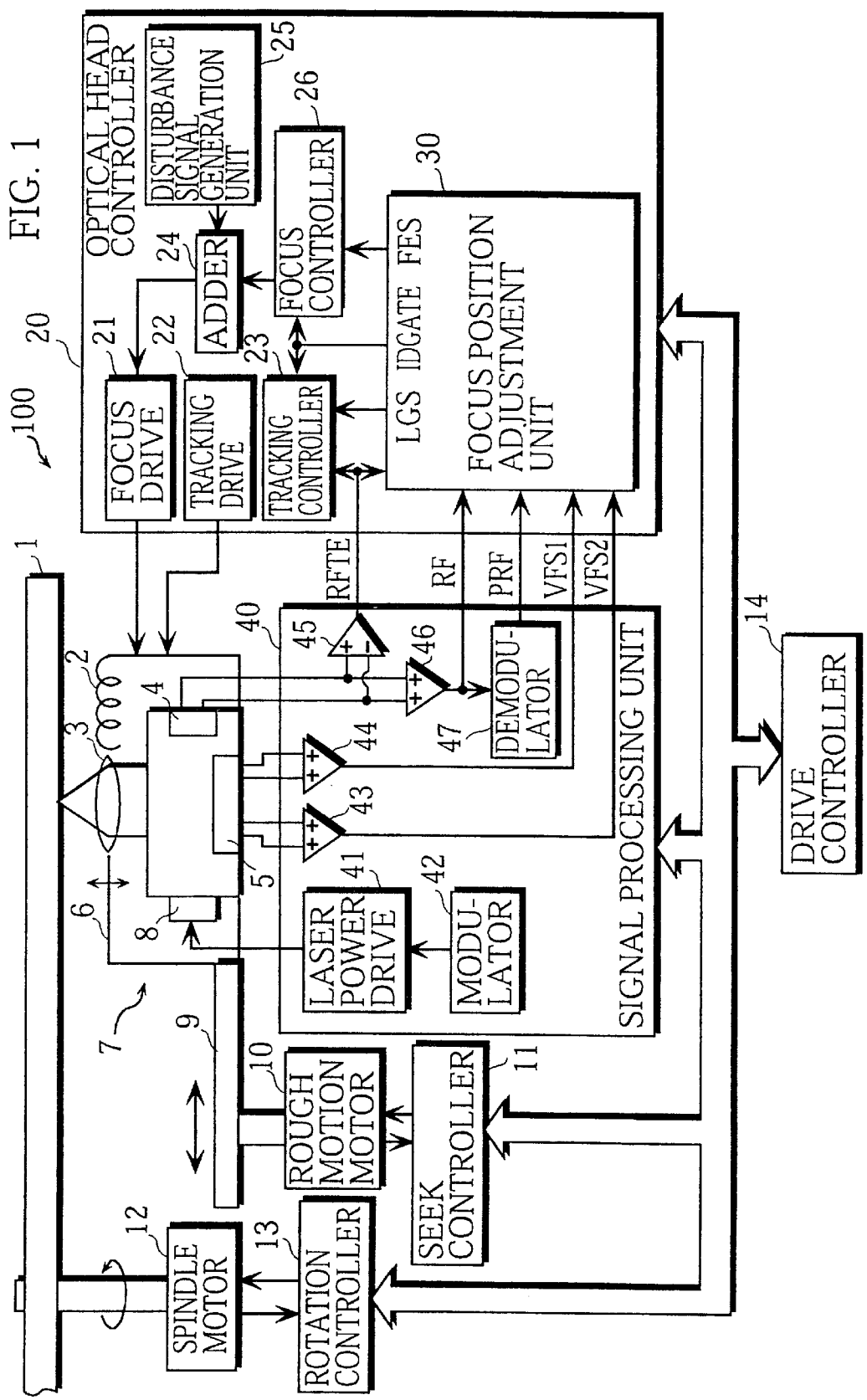
FIG. 1 is a block diagram showing the whole structure of an optical disc drive apparatus according to the present invention.

FIG. 1 is a block diagram showing the whole structure of the optical disc drive apparatus 100. The optical disc drive apparatus 100 includes a signal processing unit 40, an optical head controller 20, a drive controller 14, and optics and other units 1 to 13.

The optics and other units includes an optical disc 1, an optical head 7 (including an actuator 2, an object lens 3, a reproduction signal detection unit 4, a beam detection unit 5, a leaf spring 6, and a semiconductor laser 8), an optical head support unit 9, a rough motion motor 10, a seek controller 11, a spindle motor 12, and a rotation controller 13.

The signal processing unit 40 is a circuit that processes write signals to the optical disc 1 and read signals from the optical disc 1, and includes a laser power drive 41, a modulator 42, an addition amplifiers 43, 44 and 46, a difference amplifier 45, and a demodulator 47.

The optical head controller 20 is a circuit that controls the tracking servo and the focus servo by the optical head 7 using a variety of control signal from the signal processing unit 40, and includes a focus drive 21, a tracking drive 22, a tracking controller 23, an adder 24, a disturbance signal generation unit 25, a focus controller 26, and a focus position adjustment unit 30.

The optical disc 1 is a reloadable information record medium and is placed on the spindle motor 12. The rotation controller 13 drives and controls the spindle motor 12 under the control of the drive controller 14. The optical head support unit 9 supports the optical head 7 and is moved in the direction of the radius of the optical disc 1 by the rough motion motor 10. The seek controller 11 drives and controls the rough motion motor 10 under the controller 14 and controls the seek motion by the optical head 7.

The modulator 42 performs a certain conversion of a signal pattern transferred from the drive controller 14, and outputs the obtained signal to the laser power drive 41. The laser power drive 41 modulates the output power of the semiconductor laser 8 according to the signal from the modulator 42. As a result, the signal pattern from the drive controller 14 is recorded on the optical disc. 1.

The optical head 7 includes the semiconductor laser 8, the object lens 3, the beam detection unit 5, the reproduction signal detection unit 4, the actuator 2, the leaf spring and the like 6. The laser beam radiated from the semiconductor laser 8 passes optics in the optical head 7, is condensed by the object lens 3, and is directed at the optical disc 1. The laser beam reflected by the optical disc 1 passes the object lens 3 and other optics in the optical head 7 and is directed to the beam detection unit 5 and the reproduction signal detection unit 4.

The beam detection unit 5 is a four-part split photo diode. Each of the addition amplifiers 43 and 44 adds and amplifies the two of four optical signals from the beam detection unit 5, and outputs focus signals VFS1 and VFS2. The focus signals VFS1 and VFS2 are used for creating a focus error signal FES that shows the shift of the laser beam from a certain convergence condition. In other words, a focus error detection method in accordance with an astigmatism is used in this specification.

The reproduction signal detection unit 4 is a broadband two-part split photo diode that detects the amount of laser beam reflected by the optical disc 1 and outputs two reflected beam amount signals. Information (signal patterns) are recorded on the optical disc 1 using the change of reflectivity, so that the information recorded on the optical disc 1 is read according to these two reflected beam amount signals.

The difference amplifier 45 calculates the difference between the two reflected beam amount signals from the reproduction signal detection unit 4, and outputs the calculated difference as a broadband tracking error signal RFTE to the tracking controller 23 and the focus position adjustment unit 30. The broadband tracking error signal RFTE is a signal that includes a reproduction signal according to an address area (called an "address signal in this specification) formed with pits on the optical disc 1. Address pits on the optical disc 1 are formed ¼ track pitch apart from the center of the groove track or the land track. The broadband tracking error signal RFTE that shows the condition of the address pits is used for the detection of the address area on the optical disc 1, the detection of the land track and the groove track, and the tracking servo.

The addition amplifier 46 adds the two reflected beam amount signals from the reproduction signal detection unit 4, and outputs the sum as the reproduction signal RF to the demodulator 47. The reproduction signal RF is a broadband signal that shows all of the information recorded on the optical disc 1. The demodulator 47 changes the reproduction signal RF from the addition amplifier 46 into binary numbers using a threshold, and performs the conversion that corresponds to the conversion performed by the modulator 42 in reverse. By doing so, the demodulator 47 creates an RF pulse signal PRF that shows the information recorded on the optical disc 1, and transfers the RF pulse signal PRF to the focus position adjustment unit 30 and the drive controller 14.

Basically, the focus position adjustment unit 30 creates a focus error signal FES from the two focus signals VFS1 and VFS2. When creating the focus error signal FES, the focus position adjustment unit 30 detects the best focus position that depends on the laser beam spot position (on the land track or the groove track on the optical disc 1) using a variety of control signals, the broadband tracking error signal RFTE, the reproduction signal RF, and the RF pulse signal PRF, and reflects the result in the focus error signal FES. The focus position adjustment unit 30 creates a land(L)/groove (G) switch signal LGS that indicates whether the present laser beam spot is positioned on a land track or a groove track and a gate signal (address area signal) IDGATE that indicates the timing of the laser beam spot in positioning in the address area according to the broadband tracking error signal RFTE.

The focus position detection performed by the focus position adjustment unit 30 includes two kinds of mode, i.e., rough detection that is performed after the rotation speed of the optical disc 1 attains a certain level, and precise detection just after the coarse detection. In the precise detection, two functions (option functions) for further improving the precision may be performed when necessary. By these two functions, it is possible to remove a face shake element from the focus error signal FES and perform detection for a certain data area. Each of the two modes and two option functions is selected and added under the control of the drive controller 14.

The focus drive 21 and the tracking drive 22 provides drive current for changing the position of the object lens 3 to the actuator 2 according to the signals from the adder 24 and the tracking controller 23, respectively. The actuator 2 includes a magnet, coil, and the like, and moves the object lens 3 against the reaction of the leaf spring 6. By doing so, the actuator 2 changes convergence condition of the laser beam (shift of the focus point of the laser beam from the surface of the optical disc 1) and shift of the laser beam spot from the track.

The tracking controller 23 is a circuit for controlling the tracking servo, and performs feedback control so that the laser beam would follow the track on the optical disc 1 according to the broadband tracking error signal RFTE from the difference amplifier 45. When indicated by the drive controller 14, the tracking controller 23 controls the laser beam so that the laser beam would always follow a land track or a groove track, i.e., has the laser beam perform a jump back to the inner peripheral of the optical disc 1 for one rotation of the optical disc 1 (a still jump) according to the L/G switch signal LGS transferred from the focus position adjustment unit 30.

The focus controller 26 includes a loop filter for phase compensation, creates a signal that has the difference between the focus position indicated by the focus error signal FES from the focus position adjustment unit 30 and the control target position in the focus servo is zero according to the focus error signal FES so, and outputs the created signal to the adder 24.

The focus controller 26 and the tracking controller 23 hold the signal that has been output just before the laser beam positioned in the address area only when the laser beam directed at the optical disc 1 positions in the address area according to the address area signal IDGATE transferred from the focus position adjustment unit 30. This is because the focus servo and the tracking servo should not be performed for unnecessary areas since the address pits on the optical disc 1 are formed ¼ track pitch apart from the center of the groove track or the land track.

The disturbance signal generation unit 25 outputs a signal that is necessary for the focus position adjustment unit 30 to precisely detect the focus position, more specifically, a 1 kHz sine wave signal that changes the focus position by ±0.4 $\mu$m to adder 24. The adder 24 adds the signals from the focus controller 26 and the disturbance signal generation unit 25 and outputs the sum to the focus drive 21, or transfers the signal from the focus controller 26 to the focus drive 21 under the control of the drive controller 14 (the instruction of the rough detection or the precise detection).

The drive controller 14 includes a micro processor, a read only memory (ROM) that stores a control program, and a random access memory (RAM) as a work area, and controls the rotation controller 13, the seek controller 11, the signal processing unit 40, and the optical head controller 20 as a group. For instance, when detecting a certain condition, the drive controller 14 sets the conditions for a certain kind of focus position detection for the focus position adjustment unit 30, and has the detection be performed.

Figure 2A:
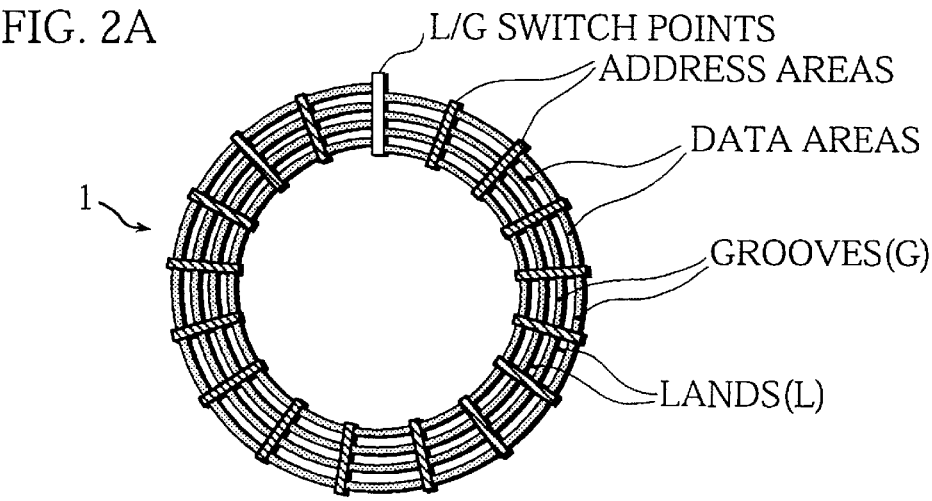
FIG. 2A is a simplified overhead view of an optical disc 1 in SS-L/GFMT.
Figure 2B:
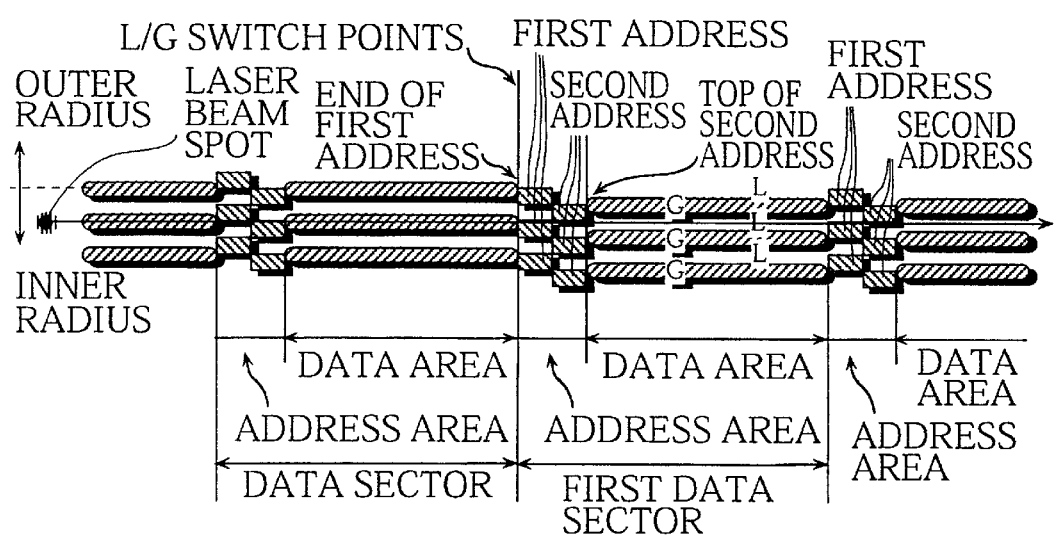
FIG. 2B is an enlarged top view of the optical disc 1 around the L/G switch points.

FIGS. 2A and 2B shows the structure of the optical disc 1. FIG. 2A is a simplified overhead view of the optical disc 1. FIG. 2B is an enlarged top view of the optical disc 1 around the L/G switch points. This optical disc is an optical disc in SS-L/GFMT. In other words, the groove tracks (Gs) and the land tracks (Ls) in a spiral are both recordable and reproducible, and one turn of groove track and land track are alternatively formed from the inner radius to the outer radius. As a result, it is possible to consecutively use the land tracks and groove tracks from the inner radius to the outer radius for reproducing and recording.

As shown in FIG. 2A, on the optical disc 1, a turn of land track (shown in a white line) and a turn of groove track (shown in black line) are alternatively connected to form one spiral.

As shown in FIG. 2B, the optical disc 1 includes address areas that have pit structures of concaves and concedes for discerning sectors between the data areas. An L/G switch point is positioned for one turn of the spiral on the optical disc 1 so that a land track and a groove track would switch at the address area corresponding to an L/G switch point. 17 address areas are included in one turn of the spiral on the optical disc 1 and one address area corresponds to the L/G switch point for the turn. An address area and a data area are included in one data sector. As a result, one turn of the track is divided into 17 data sectors.

As shown in FIG. 2B, an address area on the optical disc 1 is positioned at the head of a data sector and includes pits that are complementary positioned at a ½ track pitch shifted from the center of the track in the direction of the radius of the optical disc 1 (called a "Complementary Allocated Pit Address (CAPA)" in this specification). More specifically, at the end of each data area except for the end of the data area in the first data sector that includes the L/G switch point, the first address is positioned at a ½ track pitch shifted from the groove track of the previous data sector in the outward direction of the optical disc 1 and the second address is positioned at a ½ track pitch shifted from the groove track in the inward direction. On the other hand, at the top of the first data sector that includes the L/G switch point, the first address is positioned at a ½ track pitch shifted from the groove track in the inward direction of the optical disc 1 and the second address is positioned at a ½ track pitch shifted from the groove track in the outward direction.

Figure 2C:
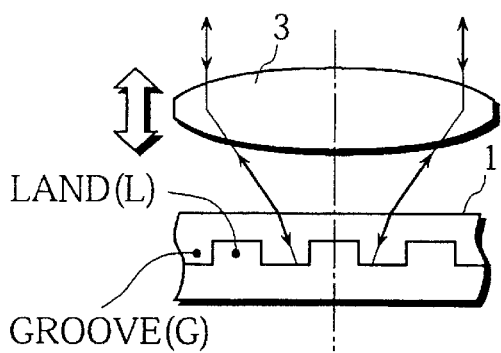
FIG. 2C shows a cross section of the optical disc 1 and an object lens 3 when the laser beam is directed to a land track on the optical disc 1.
Figure 2D:
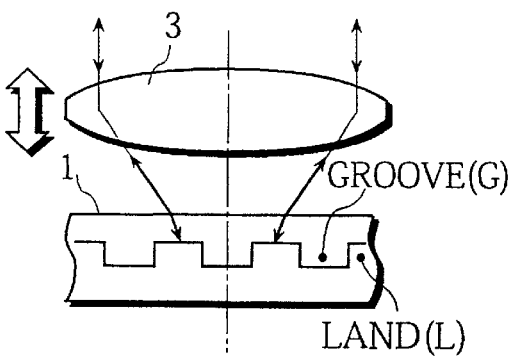
FIG. 2D shows a cross section of the optical disc 1 and the object lens 3 when the laser beam is directed to a groove track on the optical disc 1.

FIG. 2C shows a cross section of the optical disc 1 and the object lens 3 when the laser beam is directed to a land track on the optical disc 1 in SS-L/GFMT. FIG. 2D shows a cross section of the optical disc 1 and the object lens 3 when the laser beam is directed to a groove track on the optical disc 1 in SS-L/GFMT. As shown in FIGS. 2C and 2D, the shapes of the land track and the groove track are different, and when the laser beam reflected by the optical disc 1 passes through the objective lens 3 and is diffracted in the optical head 7, the distributions of the diffracted beam for the land track and groove track are different. As a result, the relationships between the zero level of the focus error signal (the control target position of the focus position) and between the focus position for the land track and groove track are different. For this reason, the optical disc drive apparatus 100 differently adjusts the focus position when the laser beam is directed to a land track and a groove track. In other words, control target positions when the laser beam is directed to a land track and a groove track are different.

(Structure of Focus Position Adjustment Unit 30)

Figure 3:
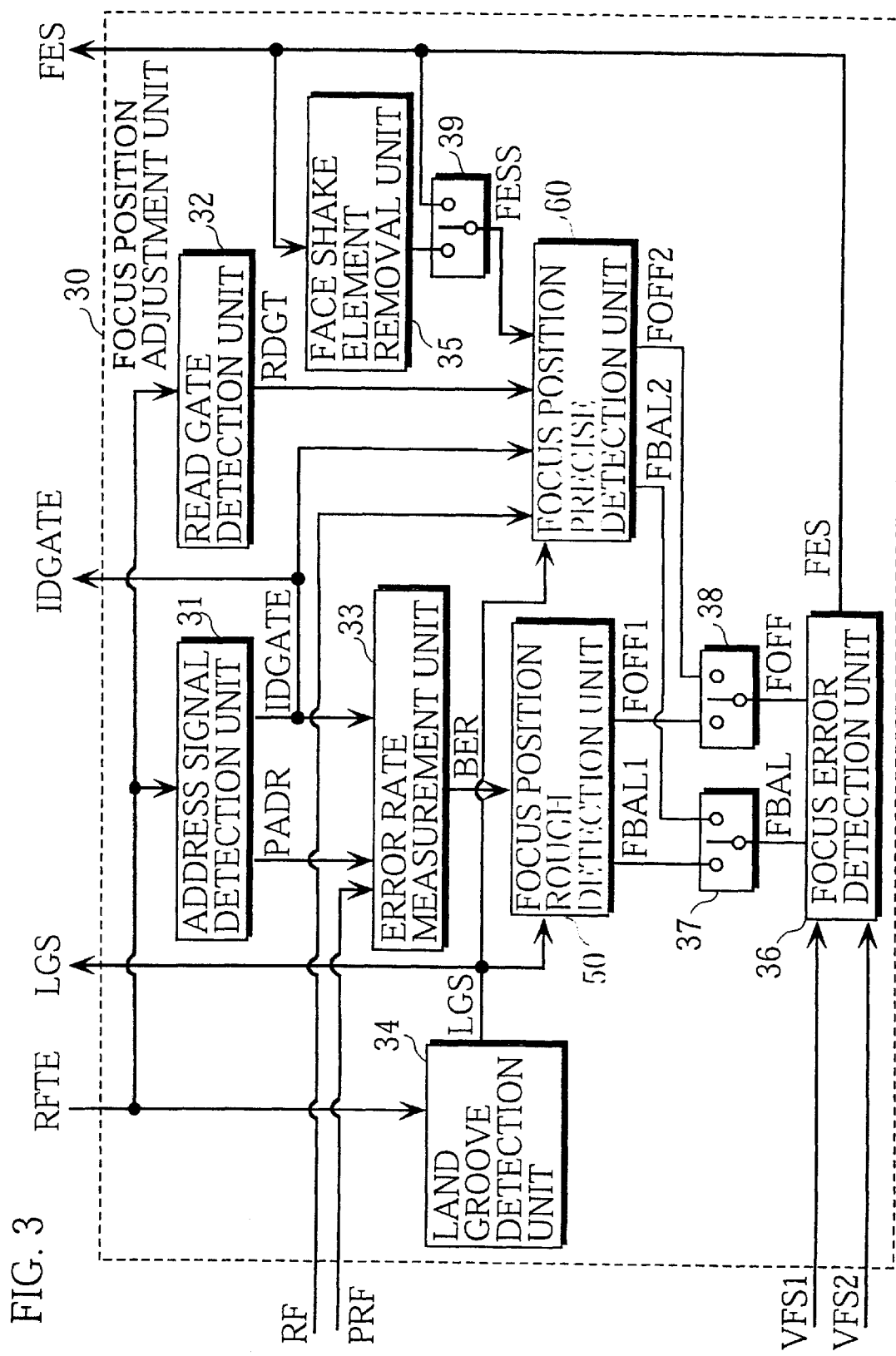
FIG. 3 is a block diagram showing the in-detail structure of the focus position adjustment unit 30.

FIG. 3 is a block diagram showing the in-detail structure of the focus position adjustment unit 30 shown in FIG. 1. The focus position adjustment unit 30 includes the components for the rough focus position detection (an error rate measurement unit 33 and a focus position rough detection unit 50), the components for precise detection (a read gate detection unit 32, a face shake element removal unit 35, a switch unit 39, and a focus position precise detection unit 60), and the components for both of rough and precise detections (an address signal detection unit 31, a land groove detection unit 34, switch units 37 and 38, and a focus error detection unit 36).

The land groove detection unit 34 creates an L/G switch signal LGS that indicates whether the present laser beam spot is positioned on a land track or a groove track according to the broadband tracking error signal RFTE output from the difference amplifier 45 in the signal processing unit 40. More specifically, the land groove detection unit 34 creates a signal that expresses the peak envelope of the broadband tracking error signal RFTE in binary numbers (called a "peak envelope signal PEPS" in this specification) and a signal that expresses the bottom envelope of the broadband tracking error signal RFTE in binary numbers (called a "bottom envelope signal BEPS" in this specification). When the laser beam follows the track on the optical disc 1 and passes an address area, and when the logical level of the bottom envelope signal BEPS changes after the change of the logical level of the peak envelope signal PEPS, the land groove detection unit 34 judges that the laser beam spot is positioned on a groove. On the other hand, when the logical level of the peak envelope signal PEPS changes after the change of the logical level of the bottom envelope signal BEPS, the land groove detection unit 34 judges that the laser beam spot is positioned on a land. The land groove detection unit 34 outputs such a judgement result as the L/G switch signal LGS. Such the L/G switch signal LGS is used for discerning a land track and a groove track in a focus position detection and for having the tracking controller 23 perform a still jump.

Figure 4:
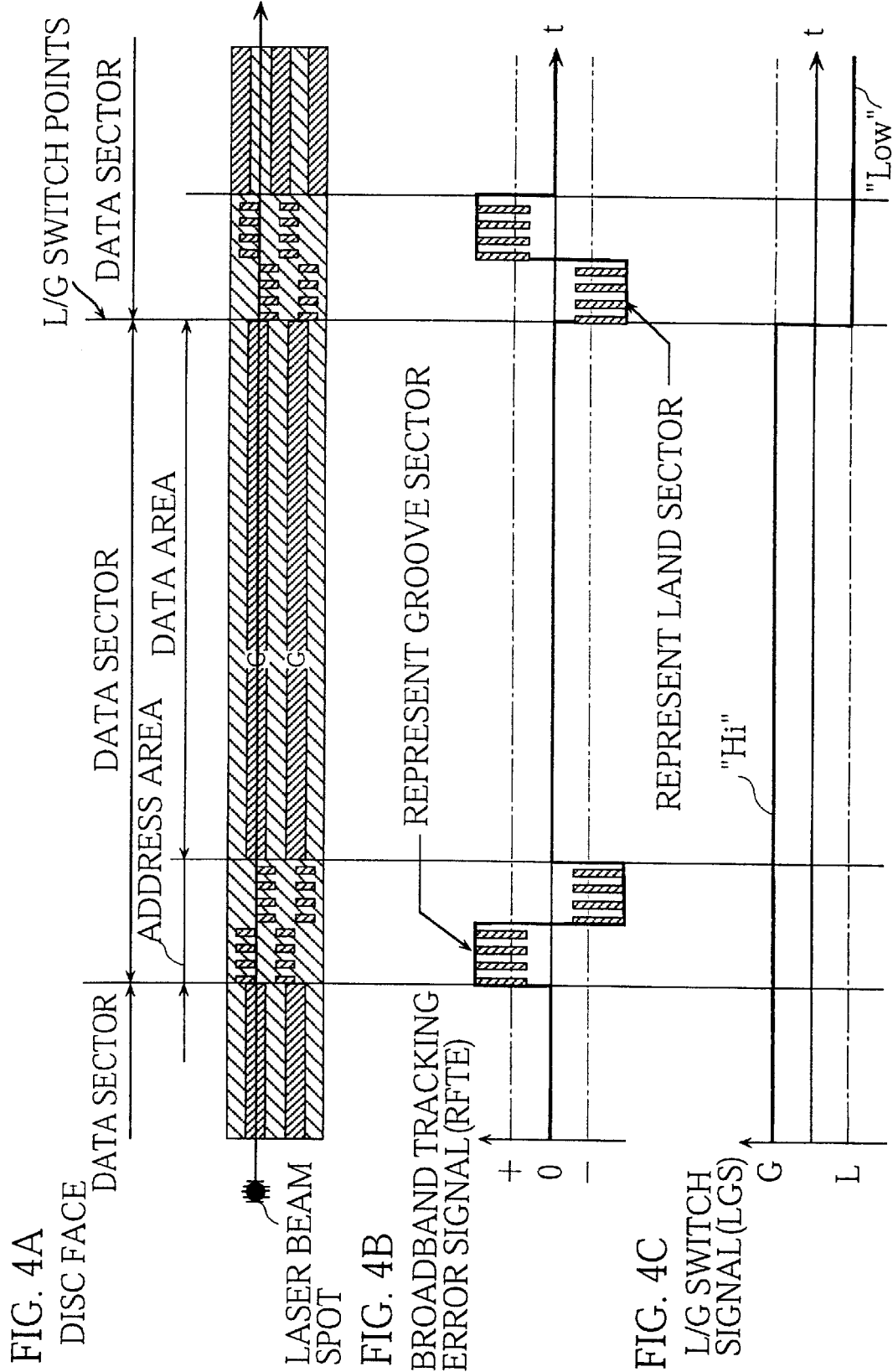
FIG. 4A shows the overall structure of tracks on the optical disc 1.
FIG. 4B shows a broadband tracking error signal RFTE.
FIG. 4C shows an L/G switch signal LGS.

FIGS. 4A to 4C shows the timing of the broadband tracking error signal RFTE that is input into the land groove detection unit 34 and the L/G switch signal LGS that is output from the land groove detection unit 34. FIG. 4A shows the overall structure of tracks on the optical disc 1 and the trajectory of the laser beam spot that moves from a groove track to a land track through an L/G switch point. FIG. 4B shows the broadband tracking error signal RFTE and FIG. 4C shows the L/G switch signal LGS when the laser beam spot follows the track as the trajectory shown in FIG. 4A.

As shown in FIG. 4A, an address area on the optical disc 1 includes pits that are complementary positioned at a ½ track pitch shifted from the center of the track in the direction of the radius of the optical disc 1 (CAPAs). The address information that has been formed with pits using such CAPAs formed on the optical disc 1 according to the broadband tracking error signal RFTE when the laser beam passes the address area.

When the laser beam spot follows a groove track and is positioned in the address area shown in FIG. 4A, the broadband tracking error signal RFTE has a waveform that shows an address signal on the plus side first and then on the minus side as shown in the left part of the timing chart in FIG. 4B. On the other hand, when the laser beam spot is positioned at the L/G switch point, the broadband tracking error signal RFTE has a waveform that shows an address signal on the minus side first and then on the plus side as shown in the right part of the timing chart in FIG. 4B. The land groove detection unit 34 detects an L/G switch point by the order of inversion as shown in FIG. 4B. As a result, the land groove detection unit 34 outputs the L/G switch signal LGS (a signal that is at a "Hi" level and at a "Low" level when the laser beam spot is positioned on a groove track and a land track, respectively) as shown in FIG. 4C.

The address signal detection unit 31 receives the broadband tracking error signal RFTE output from the difference amplifier 45 in the signal processing unit 40 and outputs the address pulse signal PADR that expresses the received broadband tracking error signal RFTE in binary numbers using a predetermined threshold. The address signal detection unit 31 also outputs the gate signal IDGATE (the gate signal that is at "Low" in a data area and at "Hi" at an address area) that shows the timing when the laser beam spot is positioned in an address area. More specifically, the address signal detection unit 31 creates a signal that expresses the peak envelope of the broadband tracking error signal RFTE in binary numbers and an inversion of a signal that expresses the bottom envelope of the broadband tracking error signal RFTE in binary numbers, creating the gate signal IDGATE by carrying out the logical OR between these two signals.

Figure 5:
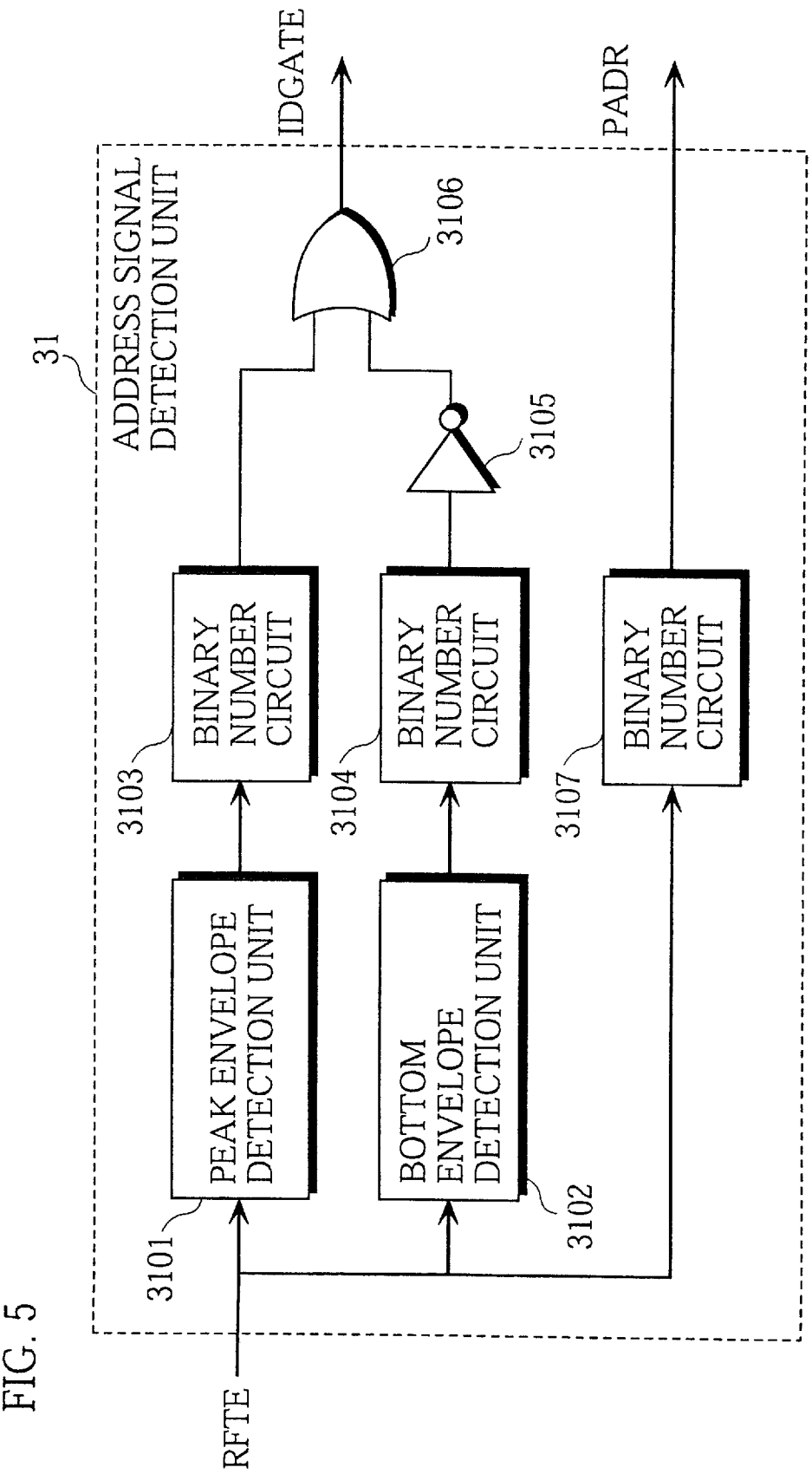
FIG. 5 is a block diagram showing the in-detail structure of an address signal detection unit 31.

FIG. 5 is a block diagram showing the in-detail structure of the address signal detection unit 31. The address signal detection unit 31 includes a peak envelope detection unit 3101, a bottom envelope detection unit 3102, binary number circuits 3103 and 3104, a NOT circuit 3105, and an OR circuit 3106 for creating the gate signal IDGATE, and a binary number circuit 3107 for creating the address pulse signal PADR.

The peak envelope detection unit 3101 detects the peak envelope of the broadband tracking error signal RFTE from the reproduction signal detection unit 4. The bottom envelope detection unit 3102 detects the bottom envelope of the broadband tracking error signal RFTE. The binary number circuit 3103 expresses the signal from the peak envelope detection unit 3101 (a signal showing the peak envelope of the broadband tracking error signal RFTE) in binary numbers using a predetermined threshold. The binary number circuit 3104 expresses the signal from the bottom envelope detection unit 3102 (a signal showing the bottom envelope of the broadband tracking error signal RFTE) in binary numbers using a predetermined threshold. The NOT circuit 3105 outputs the inversion of the output signal from the binary number circuit 3104. The OR circuit 3106 outputs the gate signal IDGATE that has been obtained by the logical OR between the signals output from the binary number circuits 3103 and the NOT circuit 3105. The binary number circuit 3107 expresses the address reproduction signal in binary numbers and creates the address pulse signal PADR using a plus threshold that corresponds to the center of the amplitude for the address reproduction signal on the plus side of the zero level of the broadband tracking error signal RFTE and a minus threshold that corresponds to the center of the amplitude for the address reproduction signal on the minus side.

Figures 6A, 6B, 6C, 6D:
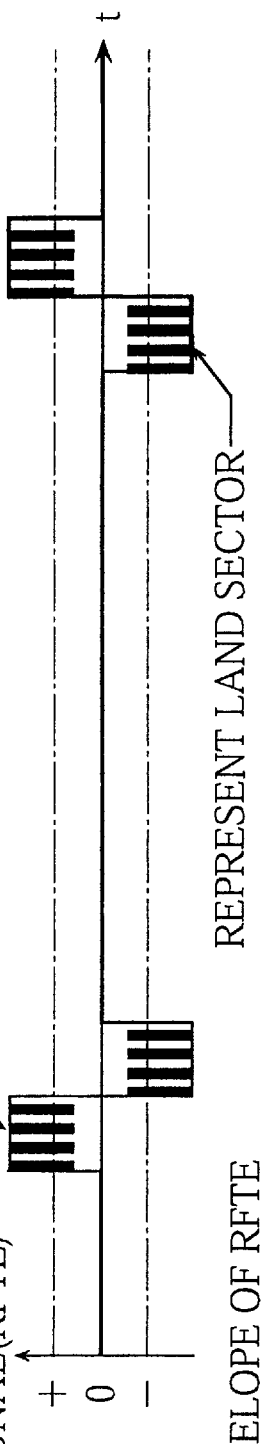
FIG. 6A shows a broadband tracking error signal RFTE that is to be input into the address signal detection unit 31.
FIG. 6B shows an output signal from the binary number circuit 3103.
FIG. 6C shows an output signal from a binary number circuit 3104.
FIG. 6D shows a gate signal IDGATE output from the address signal detection unit 31.

FIGS. 6A to 6D are timing charts showing the process in which the gate signal IDGATE is created in the address signal detection unit 31. FIG. 6A shows the broadband tracking error signal RFTE that is to be input into the address signal detection unit 31. FIG. 6B shows an output signal from the binary number circuit 3103. FIG. 6C shows the output signal from the binary number circuit 3104. FIG. 6D shows the gate signal IDGATE output from the address signal detection unit 31.

When the broadband tracking error signal RFTE as shown in FIG. 6A is input into the address signal detection unit 31, the output signal from the binary number circuit 3103 has the waveform as shown in FIG. 6B. In FIG. 6B, the output signal from the binary number circuit 3103 is "Hi" when the address signal is on the plus side of the zero level of the broadband tracking error signal RFTE, and the output signal is "Low" in other conditions. On the other hand, the output signal from the binary number circuit 3104 has the waveform as shown in FIG. 6C. In FIG. 6C, the output signal from the binary number circuit 3104 is "Low" when the address signal is on the minus side of the zero level of the broadband tracking error signal RFTE, and the output signal is "Hi" in other conditions. As a result, the output signal from the OR circuit 3106, i.e., the gate signal IDGATE has the waveform as shown in FIG. 6D. In FIG. 6D, the gate signal TDGATE is "Hi" when the address signal is in the broadband tracking error signal RFTE, and the gate signal IDGATE is "Low" in other conditions.

The error rate measurement unit 33 creates evaluation information used in the rough focus position detection, i.e., a signal that shows the error rate of the information recorded in the address areas on the optical disc 1 or in the data areas (a bit error rate BER). More specifically, the error rate measurement unit 33 selects the error rate of the RF pulse signal PRF from the demodulator 47 (for instance, the parity bit error number of the RF pulse signal PRF for a certain period of time) or the error rate of the address pulse signal PADR from the address signal detection unit 31 (for instance, the parity bit error number of the address pulse signal PADR for a certain period of time) according to the gate signal IDGATE and measures from the address signal detection unit 31, measures the selected error rate, and outputs the result to the focus position rough detection unit 50 as the bit error rate BER.

Figure 7:
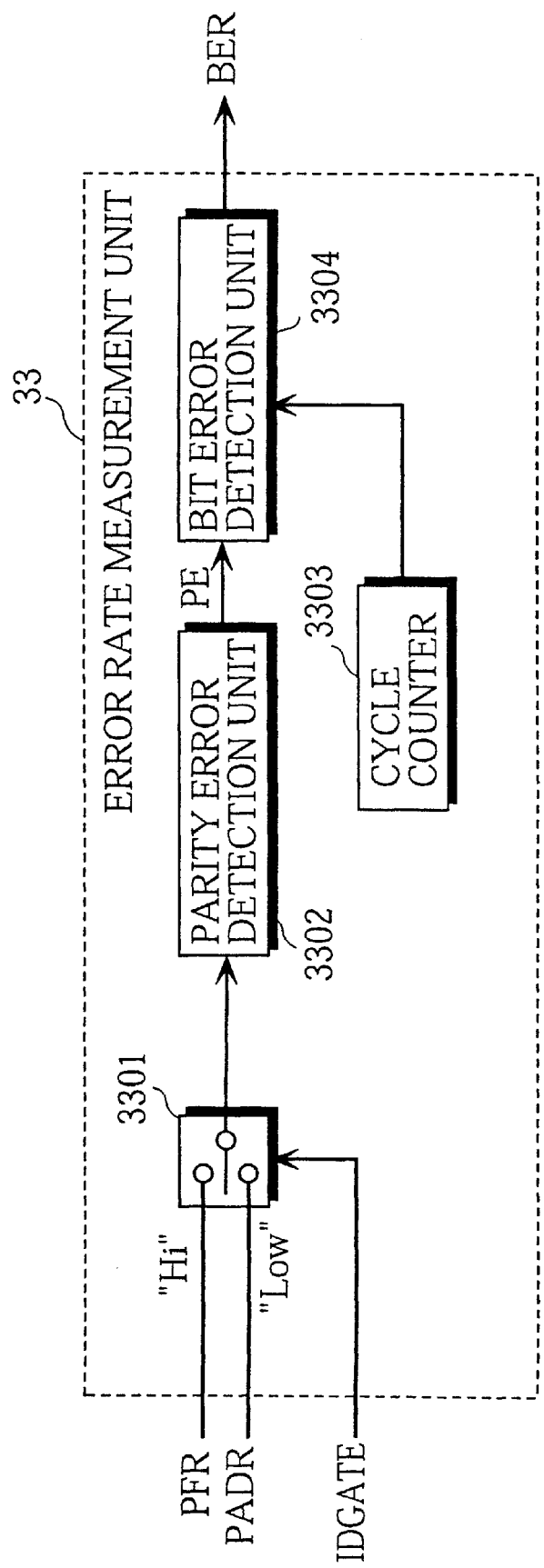
FIG. 7 is a block diagram showing the in-detail structure of an error rate measurement unit 33.

FIG. 7 is a block diagram showing the in-detail structure of the error rate measurement unit 33. A selection circuit 3301 is a selector that two signals are input into and one signal is output from. The selection circuit 3301 selects and outputs the RF pulse signal PRF from the demodulator 47 when the gate signal IDGATE from the address signal detection unit 31 is "Hi", and selects and outputs the address pulse signal PADR from the address signal detection unit 31 when the gate signal IDGATE is "Low".

A parity error detection unit 3302 detects the generation of the parity error of the RF pulse signal PRF or the address pulse signal PADR output from the selection circuit 3301 for each symbol data, and outputs one pulse signal that has a "Hi" level (a parity error signal PE) when detecting an error. For the data recorded on the optical disc 1, a parity bit is added to one symbol data. As a result, the parity error detection unit 3302 detects a parity error for each symbol data according to the data bit and the parity bit included in the symbol data.

A cycle counter 3303 outputs a certain cycle of clock signal to a bit error detection unit 3304. The bit error detection unit 3304 counts the number of parity error signal PE that has been input in one cycle of the clock signal from the cycle counter 3303, and outputs the result as the bit error rate BER.

The focus error detection unit 36 calculates information corresponding to the difference between the two focus signals VFS1 and VFS2 input from the beam detection unit 5 through the addition amplifiers 43 and 44 using an expression 1 described below, and outputs the calculated information as the focus error signal FES to the focus controller 26, the face shake element removal unit 35, and the switch unit 39.

$$FES = k1*VFS1 - k2*VFS2 + OFFSET \quad \text{(Expression 1)}$$

The focus error detection unit 36 weights each of the focus signals VFS1 and VFS2, calculates the difference between the two focus signals, and adds a certain offset value to the calculated difference, outputting the result of the addition as the focus error signal FES. In this calculation, the focus error detection unit 36 determines the ratio between the weights, "k1" and "k2", (the focus balance) according to a balance control signal FBAL, and the offset value OFFSET (the focus offset) according to the offset control signal FOFF input from the switch unit 38. As the focus error signal FES is input into the focus controller 26, the focus error detection unit 36 changes (sets) the zero level of the focus error (the difference between the focus signals VFS1 and VFS2), i.e., the control target position in the focus servo, by changing the focus balance and the focus offset according to the two control signals FBAL and FOFF.

Figure 8:
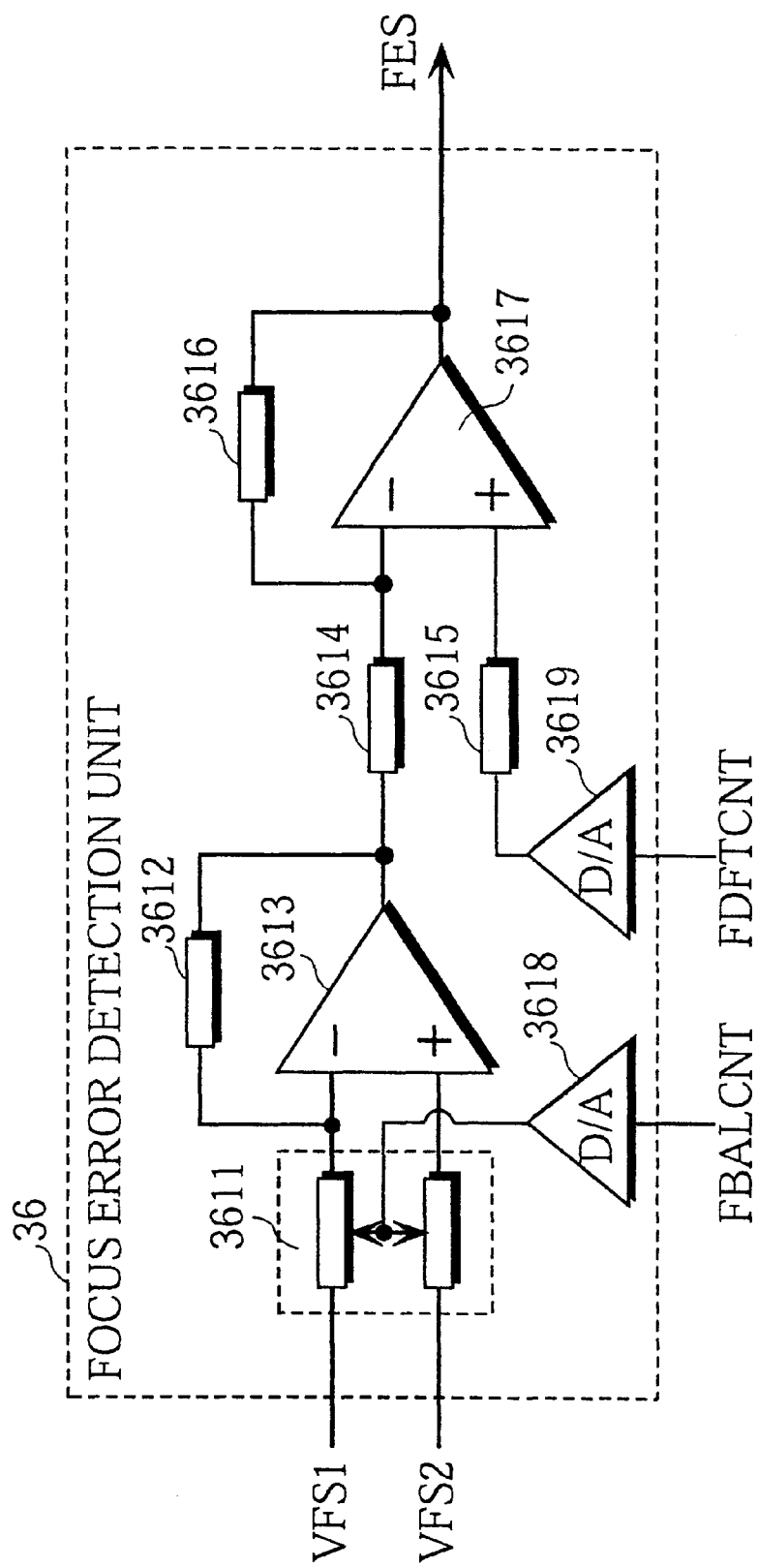
FIG. 8 is a block diagram showing the in-detail structure of a focus error detection unit 36.

FIG. 8 is a block diagram showing the in-detail structure of the focus error detection unit 36. The front end or the focus error detection unit 36 is a differential amplifier circuit including a differential amplifier 3613, a feedback resistor 3612, a focus balance circuit 3611, and a digital-to-analog (D/A) converter 3618. The focus balance circuit 3611 includes a variable resistance component for voltage control (two transistors that are complementarity connected). The differential amplifier circuit changes the gain ratio in the calculation of the difference between the two input signals VFS1 and VFS2 (the focus balance) according to (the analog value of) the balance control signal FBAL transferred from the switch units 37. The back end of the focus error detection unit 36 is an offset adjustment circuit including three registers 3614 to 3616, a differential amplifier 3617, and an analog-to-digital (A/D) converter 3619. A certain offset value according to the offset control signal FOFF (an analog value) transferred from the switch unit 38 (a focus offset) is added to a differential signal from the front end.

Each of the switch units 37 and 38 is a selector that two signals are input into and one signal is output from, and is controlled by the drive controller 14. When receiving the instruction from the drive controller 14 that the drive controller 14 performs the rough focus position detection, the switch unit 37 selects and outputs a control signal FBAL1 transferred from the focus position rough detection unit 50 and the switch unit 38 selects and outputs the control signal FOFF1 transferred from the focus position rough detection unit 50. When receiving the instruction from the drive controller 14 that the drive controller 14 performs the precise detection, the switch unit 37 selects and outputs a control signal FBAL2 transferred from a focus position precise detection unit 60 and the switch unit 38 selects and outputs the control signal FOFF2 transferred from the focus position precise detection unit 60.

The focus position rough detection unit 50 is a control circuit that performs the focus position detection at the beginning of focusing, i.e., the rough focus position detection. The focus position rough detection unit 50 outputs two control signals FBAL1 and FOFF1 to the switch units 37 and 38 for forcing the focus position to move a certain distance so that the bit error rate BER from the address signal detection unit 31 would be equal to or smaller than a certain value. In doing so, the focus position rough detection unit 50 refers to the LIG switch signal LGS from the land groove detection unit 34, performs different controls when the laser beam spot is positioned on a land track and a groove track in accordance with a manner that has been programmed. This is because the fact that the adjustment of the focus position for obtaining the best reproduction condition for one of the land track and the groove track does not always mean the best reproduction condition for another track is considered. In other words, this is because overall good reproduction conditions should be obtained for both of the land track and the groove track by discerning a land track and a groove track and by detecting different control target positions for the land track and the groove track.

Figure 9:
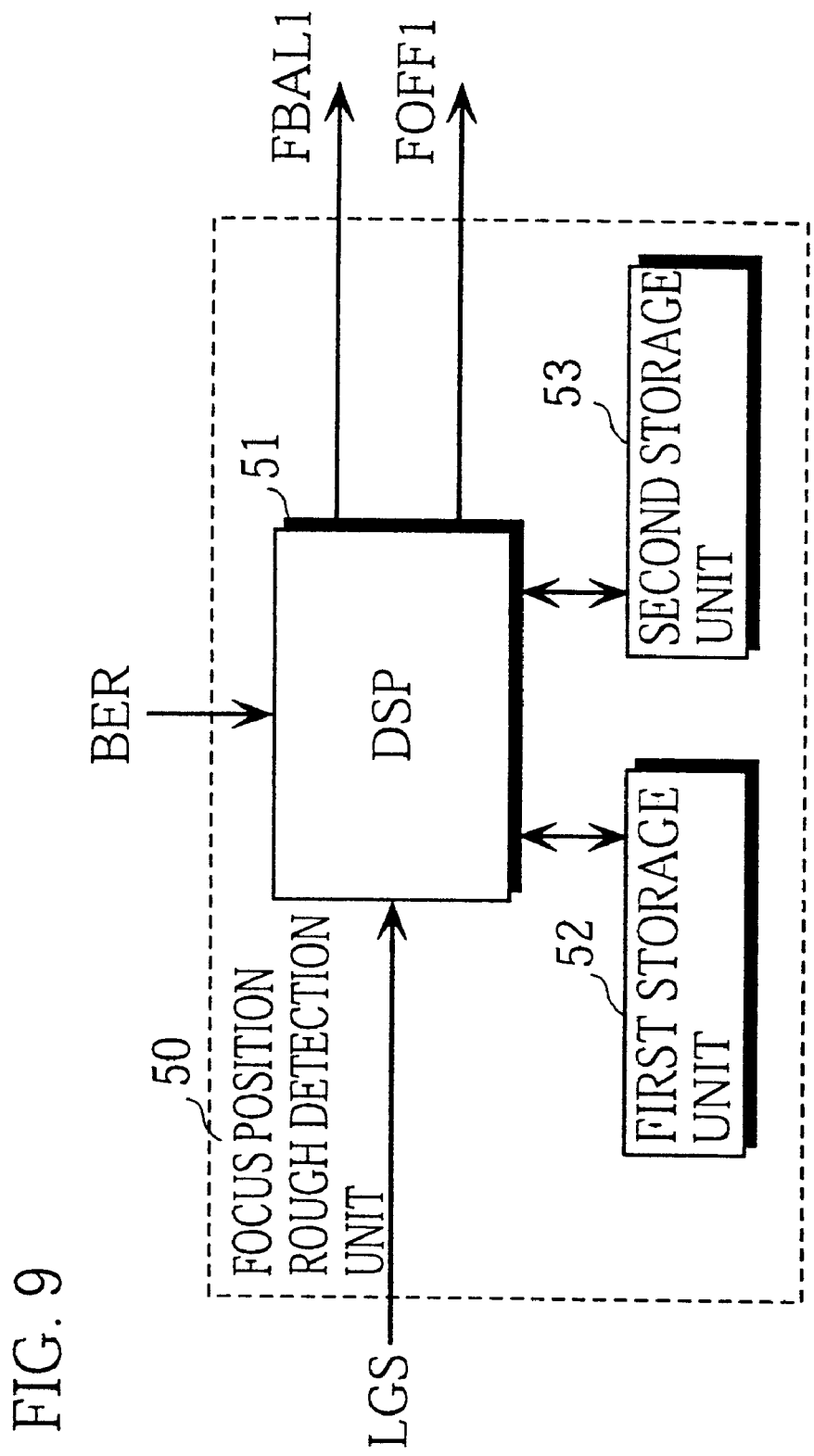
FIG. 9 is a block diagram showing the in-detail structure of a focus position rough detection unit 50.

FIG. 9 is a block diagram showing the in-detail structure of the focus position rough detection unit 50. A first storage unit 52 is an erasable nonvolatile memory having areas for recording a plurality of focus balance values (each of which is a numerical value corresponding to the size of a balance control signal FBAL1). The first storage unit 52 stores in advance a focus balance value indicating the adjustment value of the focus position for the groove track on the optical disc 1 that has been obtained when the optical disc drive apparatus 100 was assembled. A second storage unit 53 is also an erasable nonvolatile memory having areas for recording a plurality of focus offset values (each of which is a numerical value corresponding to the size of the offset control signal FOFF1). The second storage unit 53 stores in advance a focus balance value indicating the adjustment value of the focus position for the land track on the optical disc 1 that has been obtained when the optical disc drive apparatus 100 was assembled.

A digital signal processor (DSP) 51 is a digital signal processor storing a control program, and performs soft processing of a focus position detection. More specifically, when the laser beam spot is positioned on a groove track on the optical disc 1, the DSP 51 refers to the focus balance values stored in the first storage unit 52, outputs a balance control signal FBAL1, and detects the best focus balance value so that the bit error rate BER from the error rate measurement unit 33 would be equal to or smaller than a certain value. Then, when the laser beam spot is positioned on a land track on the optical disc 1, the DSP 51 keeps the output of the balance control signal FBAL1, refers to the focus offset values stored in the second storage unit 53, and outputs the offset control signal FOFF1. By doing so, the DSP 51 detects the best focus offset value so that the bit error rate BER from the error rate measurement unit 33 would be equal to or smaller than a certain value.

When obtaining the best focus balance value and focus offset value, the DSP 51 distinguishes the best focus balance value and the focus offset value for the groove track and for the land track, and stores the values in the first storage unit 52 and the second storage unit 53. The DSP 51 distinguishes a land track and a groove track as the new control standard position for the focus position after the detection and outputs control signals FBAL1 and FOFF1 that correspond to the focus balance value and the focus offset value to the switch units 37 and 38.

The read gate detection unit 32 is a circuit that is used as an option when the precision is improved in the precise focus position detection, and outputs the gate signal RDGT that is "Hi" in the address areas and the data areas that have been designated in advance on the optical disc 1 to the focus position precise detection unit 60.

More specifically, the drive controller 14 fetches the focus error signal FES and performs an A/D conversion in advance, and detects a face shake (an alternating current (AC) signal) produced in the rotation of the optical disc 1. The drive controller 14 informs the read gate detection unit 32 of the sectors of the data areas where the amount of the change of the AC signal is small so that the gate signal RDGT would be "Hi" in the data areas. The read gate detection unit 32 distinguishes the address area and the data areas using the broadband tracking error signal RFTE from the signal processing unit 40, and creates the gate signal RDGT that is "Hi" in the address areas and the data areas that the drive controller 14 have designated in advance. The gate signal RDGT is used for removing the effect of a face shake in the precise focus position detection in order to prevent the deterioration of the focus control precision.

Figure 10:
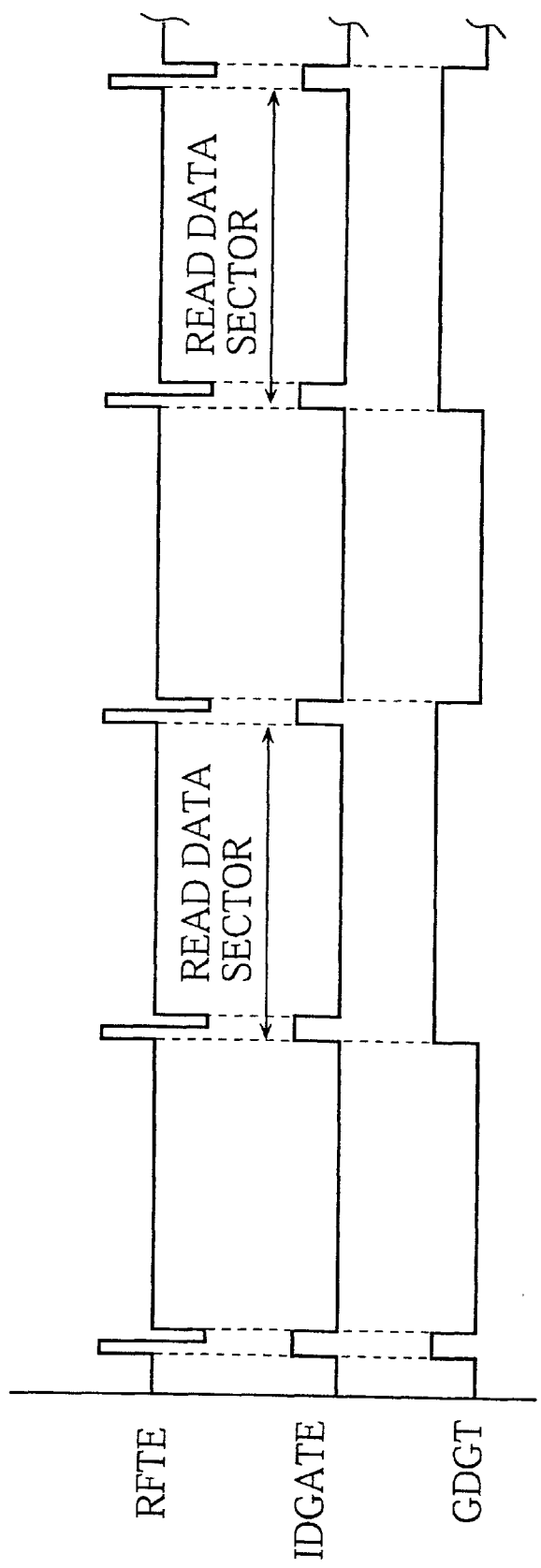
FIG. 10 is a timing chart of the broadband tracking error signal RFTE input into a read gate detection unit 32, the gate signal IDGATE that indicates the address areas, and the gate signal RDGT output from the read gate detection unit 32.

FIG. 10 is a timing chart of the broadband tracking error signal RFTE input into the read gate detection unit 32, the gate signal IDGATE that indicates the address areas, and the gate signal RDGT output from the read gate detection unit 32. The gate signal RDGT indicates the address areas and the data sectors that have been designated in advance (read data sectors). When high precision is not demanded in the precise focus position detection, the drive controller 14 may instructs the read gate detection unit 32 to stop the functions. In this case, the read gate detection unit 32 always sets the gate signal RDGT as "Hi".

The face shake element removal unit 35 is a circuit that is used as an option when the precise focus position detection is performed. The face shake element removal unit 35 is a filter that removes a face shake element of the optical disc 1 is from the focus error signal FES from the focus error detection unit 36 and has other frequency components (for instance, a signal of 1 kHz applied by the disturbance signal generation unit 25) passes, and outputs the signal that has passed to the focus position precise detection unit 60 through the switch unit 39. Such a function of the face shake element removal unit 35 is the same as the read gate detection unit 32. The face shake element removal unit 35 removes the effect of a face shake in the precise focus position detection in order to perform more precise focus position control.

The switch unit 39 is a 2-input/1-output selector controlled by the drive controller 14, and bypasses the input into and output from the face shake element removal unit 35 according to the instruction from the drive controller 14. More specifically, when performing the rough focus position detection, the switch unit 39 selects a signal output from the face shake element removal unit 35 or the focus error signal FES output from the focus error detection unit 36 according to the instruction from the drive controller 14, and outputs the selected signal as the focus error signal FESS to the focus position precise detection unit 60. The switch unit 39 determines whether to have the face shake element removal unit 35 function in the precise focus position detection, i.e., whether to perform a more precise focus position detection.

The focus position precise detection unit 60 is a circuit for control the precise focus position detection after the rough focus position detection by the focus position rough detection unit 50. More specifically, the focus position precise detection unit 60 detects the best focus position where the envelope of the reproduction signal RF transferred from the signal processing unit 40 is large and the jitter in the reproduction signal RF is small according to the disturbance signal included in the focus error signal FESS transferred from the switch unit 39 (the disturbance signal output from the disturbance signal generation unit 25) and the reproduction signal RF. The focus position precise detection unit 60 outputs two control signals FBAL2 and FOFF2 to the switch units 37 and 38 so that the detected best focus position would be kept by the focus servo by the focus controller 26. As a result, a focus control that considers the envelope and the jitter in the reproduction signal RF is performed, and overall good reproduction conditions are obtained.

As the focus position rough detection unit 50 does, the focus position precise detection unit 60 performs different controls when the laser beam spot is positioned on a land track and a groove track according to the L/G switch signal LGS from the land groove detection unit 34. As a result, different focus control target positions are detected for a land track and a groove track, and overall good reproduction conditions are obtained for both of the land track and the groove track.

(Rough Focus Position Detection)

The processing by the optical disc drive apparatus 100, the structure of which has been explained, when performing the rough focus position detection in recording and reproducing data will be described below.

The overall processing by the optical disc drive apparatus 100 will be explained with reference to FIGS. 1 and 3. In the rough focus position detection, the switch units 37 and 38 selects and has control signals FBAL1 and FOFF1 from the focus position rough detection unit 50 pass according to the instruction from the drive controller 14, and the adder 24 has the signal from the focus controller 26 pass. As a result, none of the components that is used only for the precise focus position detection (the disturbance signal generation unit 25, the read gate detection unit 32, the face shake element removal unit 35, and the focus position precise detection unit 60) functions in (directly relates to) the rough focus position detection.

The drive controller 14 instructs the rotation controller 13 and has the spindle motor 12 rotates at a certain rotation speed. Then, the drive controller 14 instructs the seek controller 11 and has the rough motion motor 10 perform a rough seek motion. The drive controller 14 controls the modulator 42 and the laser power drive 41 and has the semiconductor laser 8 direct the laser beam to the optical disc 1.

The beam detection unit 5 detects the laser beam that has been reflected by the laser beam spot on the optical disc 1 with a quartered lens and converts the four detected laser beams into four electric signals. The addition amplifiers 43 and 44 add two of the four signals, and create the two focus signals VFS1 and VFS2 that are used for creating the focus error signal FES.

The focus error detection unit 36 substitutes the two focus signals VFS1 and VFS2 into the expression 1 that is based on the two control signals FBAL and FOFF input from the focus position rough detection unit 50 through the switch units 37 and 38, and creates the focus error signal FES. In other words, the focus error detection unit 36 changes the control target position in the focus servo.

The focus controller 26 activates the actuator 2 through the adder 24 and the focus drive 21 according to the focus error signal FES from the focus error detection unit 36, and performs the focus servo by which the difference between the focus error signal FES and the control target position in the focus servo is "0".

When the focus servo is being performed, the tracking servo is started. The difference amplifier 45 calculates the difference between the two signals from the reproduction signal detection unit 4, and creates the broadband tracking error signal RFTE that indicates the shift of the laser beam spot from the track center on the optical disc 1. The tracking controller 23 activates the actuator 2 through the tracking drive 22 according to the created broadband tracking error signal RFTE so that the laser beam would follow the track on the optical disc 1, and performs feedback control.

When the focus control and the tracking control are being performed, the reproduction signal RF obtained from the reproduction signal detection unit 4 through the addition amplifier 46 has a certain amplitude that is not the highest one but is a moderate one. As a result, the reproduction conditions may be stable and good.

Figure 11:
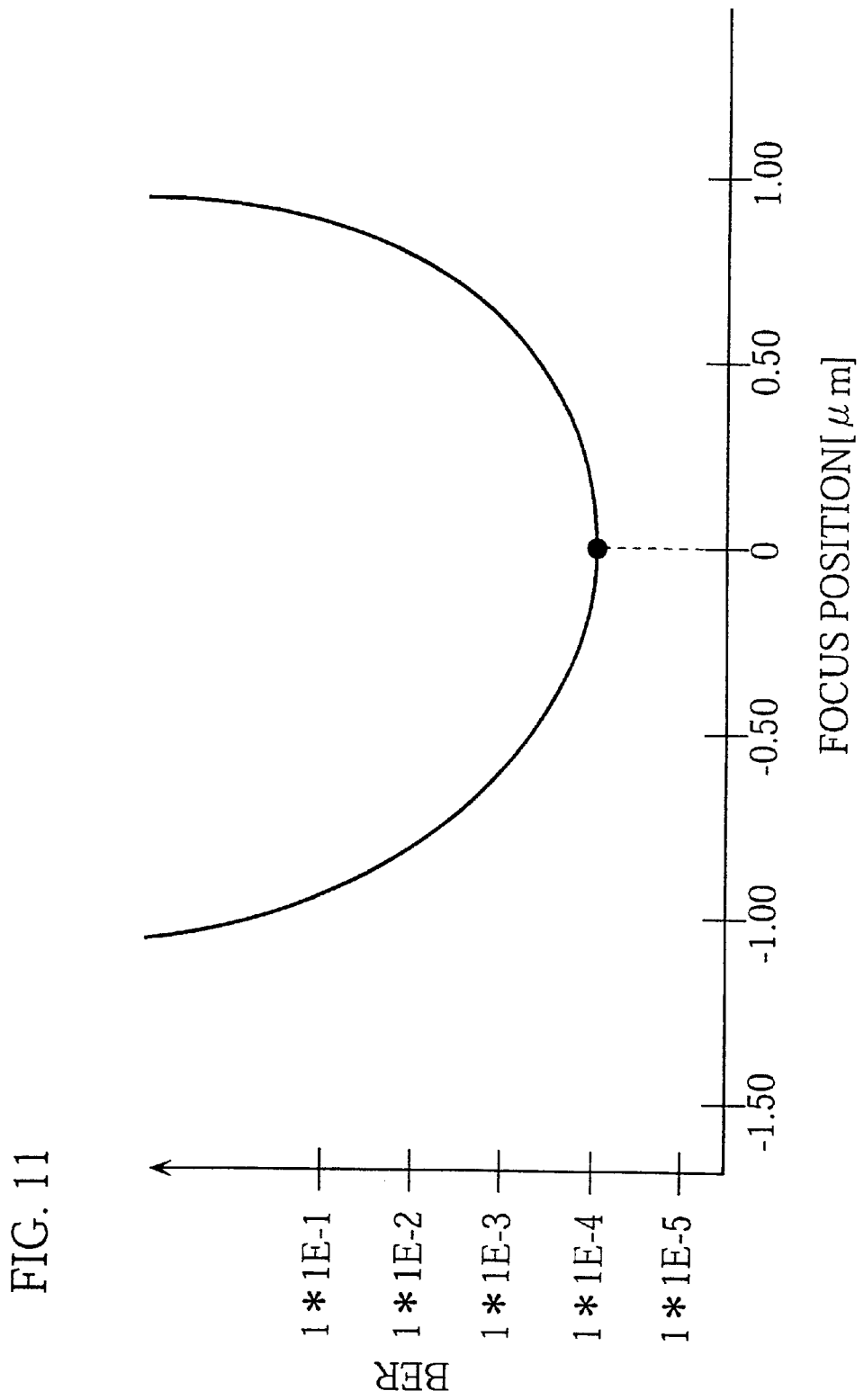
FIG. 11 is a graph showing the relationship between the bit error rate BER of the RF pulse signal PRF and the change of the focus position.

The relationship between the focus position and the reproduction conditions will be explained below. FIG. 11 is a general graph showing the relationship between the bit error rate BER of the RF pulse signal PRF and the change of the focus position. The X-axis represents the bit error rate BER and the Y-axis represents the focus position. When the best focus position is set at 0 μm, the bit error rate BER at the best focus position is about "1e-4". As the focus position is apart from the best focus position, the bit error rate BER increases in accordance with a quadratic function. When the focus position is apart from the best focus position by ±0.6 μm, the error rate BER is about "1e-3".

The focus position rough detection unit 50 changes the focus balance and the focus offset in the focus error detection unit 36 to change the conversion condition of the laser beam on the optical disc 1. More specifically, the focus position rough detection unit 50 repeatedly changes the focus balance and the focus offset until the error rate of the RF pulse signal PRF measured by the error rate measurement unit 33 is equal to or smaller than a predetermined value, for instance, the bit error rate is equal to or smaller than "5e-4", and detects the best focus position. As shown in FIG. 11, when the bit error rate BER is equal to or smaller than "5e-4" in a reproduction condition, the shift of the focus position from the best focus position is equal to or smaller than ±0.6 μm. In other words, the focus position rough detection unit 50 corrects the two control signals FBAL1 and FOFF1 according to the bit error rate so that the shift of the focus position from the best focus position would be equal to or smaller than a predetermined value.

Figure 12:
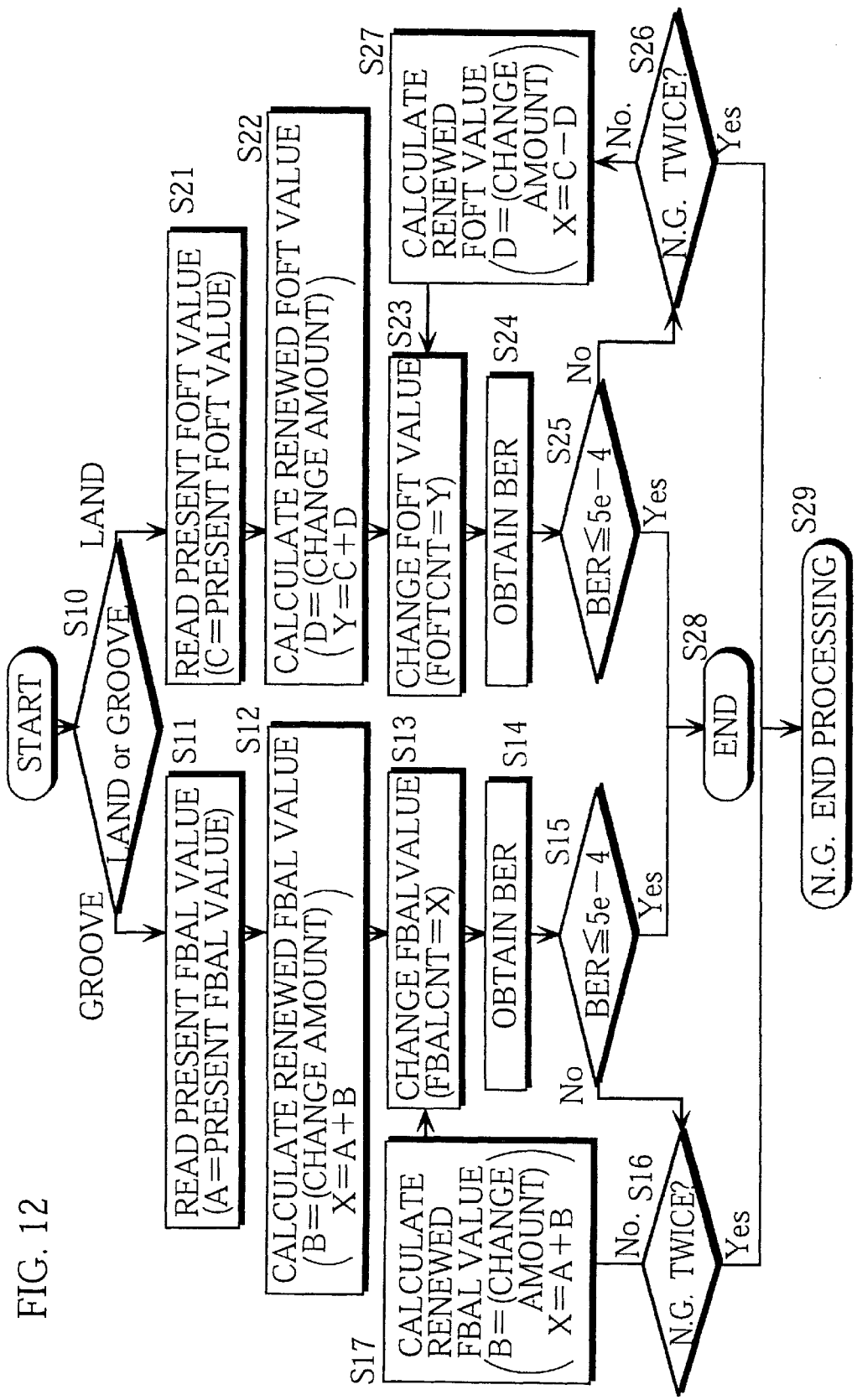
FIG. 12 is a flowchart showing the in-detail processing by a focus position rough detection unit 50.

The rough focus position detection will be explained in detail. FIG. 12 is a flowchart showing the in-detail processing by the focus position rough detection unit 50.

As shown in FIG. 9, the focus position rough detection unit 50 is realized like a software by the DSP 51 with a built-in control program and the like. The rough focus position detection is performed while tracking control in which the drive controller 14 instructs the tracking controller 23 to has the laser beam follow a certain land track or groove track is being performed. In other words, the processing described below is performed under the condition in which the laser beam performs a still jump that is a jump back to the inner peripheral of the optical disc 1 for one rotation of the optical disc 1 and follows a certain land track or groove track on the optical disc 1.

Now the rough focus position detection is necessary due to the generation of reproduction errors the value of which is equal to or larger than a certain value. In other words, the DSP 51 in the focus position rough detection unit 50 outputs the focus balance value and the focus offset value that have been stored in the first storage unit 52 and the second storage unit 53 in advance as control signals FBAL1 and FOFF1 to the focus error detection unit 36, and the bit error rate BER that is measured by the error rate measurement unit 33 is larger than a certain value "5e-4" in this condition.

The focus position rough detection unit 50 judges whether the laser beam is positioned on a land track or a groove track according to the logical level of the L/G switch signal LGS from the land groove detection unit 34 (Step S10). More specifically, the focus position rough detection unit 50 observes that the L/G switch signal LGS is at the "Low" level or at the "Hi" level for a certain period of time, and judges according to the observation result.

As a result, when judging that the laser beam is positioned on a groove track, the focus position rough detection unit 50 reads the focus balance value (the present FBAL value) that is stored in the first storage unit 52, and sets the focus balance value as "A" (representing a present FBAL value) (Step S11). At Step S12, a new focus balance value (an update FBAL value) is calculated. More specifically, the calculation represented by the expression 2 below in which the "B" (a focus balance value that is converted into, for instance, a 0.6 μm focus position) represents the change amount of the FBAL value and the "X" represents the update FBAL value is performed.

$$X=A+B \qquad \text{(Expression 2)}$$

The focus position rough detection unit 50 outputs the obtained update FBAl value "X" to the focus error detection unit 36 through the switch unit 37 as a balance control signal FBAL1 (Step S13). This means that the focus balance in the focus error detection unit 36 is changed so that the focus position would be apart from the original focus position by +0.6 μm.

After the focus balance is changed, the focus position rough detection unit 50 receives the bit error rate BER from the error rate measurement unit 33 (Step S14) and judges whether the bit error rate BER is equal to or smaller than "5e-4" (Step S15). When the bit error rate BER is equal to or smaller than "5e-4", the focus position rough detection unit 50 judges that the focus position after the focus balance change is within 0.3 μm from the best focus position as has been described using FIG. 11. The focus position rough detection unit 50 stores the update FBAl value "X" in the first storage unit 52 and normally finishes the focus position detection (Step S28).

On the other hand, when the bit error rate BER is larger than "5e-4", the focus position rough detection unit 50 judges how often the FBAL value is changed (Step S16). When the FBAL value is changed once, the focus position rough detection unit 50 calculates the update FBAL value for the second time (Step 517). More specifically, the focus position rough detection unit 50 performs the calculation represented by the expression 3 below.

$$X=A-B \qquad \text{(Expression 3)}$$

The focus position rough detection unit 50 outputs the obtained FBAl value "X" to the focus error detection unit 36 through the switch unit 37 as a balance control signal FBAL1. This means that the focus balance in the focus error detection unit 36 is changed so that the focus position would be apart from the original focus position by −0.6 μm.

After the focus balance is changed, Steps S14 and S15 are repeated. In other words, the focus position rough detection unit 50 receives the bit error rate BER from the error rate measurement unit 33 (Step S14) and judges whether the bit error rate BER is equal to or smaller than "5e-4" (step S15). When the bit error rate BER is equal to or smaller than "5e-4", the focus position rough detection unit 50 stores the update FBAL value "X" in the first storage unit 52 and normally finishes the focus position detection (Step S28).

On the other hand, when the bit error rate BER is larger than "5e-4", the focus position rough detection unit 50 judges how often the FBAL value is changed (Step S16). When the FBAL value is changed twice, the focus position rough detection unit 50 judges that the focus position detection is not finished normally and finishes the focus position detection. (Step S29).

When judging that the laser beam is positioned on a land track at Step S10, the focus position rough detection unit 50 reads the focus offset value stored in the second storage unit 53 (the present FOFT value), and sets the focus offset value as "C" (Step S21). Then, a new focus offset value (an update FOFT value) is calculated (Step S22). More specifically, the calculation represented by the expression 4 below in which "D" (a focus offset value that is converted into, for instance, a 0.6 μm focus position) represents the change amount of the FOFT value and the "Y" represents the update FOFT value is performed.

$$Y=C+D \quad \text{(Expression 4)}$$

At Step S23, the focus position rough detection unit 50 outputs the obtained FOFT value "Y" to the focus error detection unit 36 through the switch unit 38 as the offset control signal FOFF1 (Step S23). This means that the focus offset in the focus error detection unit 36 is changed so that the focus position would be apart from the original focus position by +0.6 μm.

After the focus offset is changed, the focus position rough detection unit 50 receives the bit error rate BER from the error rate measurement unit 33 (Step S24) and judges whether the bit error rate BER is equal to or smaller than "5e-4" (Step S25). When the bit error rate BER is equal to or smaller than "5e-4", the focus position rough detection unit 50 judges that the focus position after the focus offset change is within 0.3 μm from the best focus position. The focus position rough detection unit 50 stores the FOFF value "Y" in the second storage unit 53 and normally finishes the focus position detection (Step S28).

On the other hand, when the bit error rate BER is larger than "5e-4", the focus position rough detection unit 50 judges how often the FOFF value is changed (Step S26). When the FOFF value is changed once, the focus position rough detection unit 50 calculates the update FOFF value for the second time (Step S27). More specifically, the focus position rough detection unit 50 performs the calculation represented by an expression 5 below.

$$Y=C-D \quad \text{(Expression 5)}$$

The focus position rough detection unit 50 outputs the obtained FOFF value "Y" to the focus error detection unit 36 through the switch unit 37 as the offset control signal FOFF1. This means that the focus offset in the focus error detection unit 36 is changed so that the focus position would be apart from the original focus position by −0.6 μm.

After the focus offset is changed, Steps S24 and S25 are repeated. In other words, the focus position rough detection unit 50 receives the bit error rate BER from the error rate measurement unit 33 (Step S24) and judges whether the bit error rate BER is equal to or smaller than "5e-4" (Step S25). When the bit error rate BER is equal to or smaller than "5e-4", the focus position rough detection unit 50 stores the update FOFF value "Y" in the second storage unit 53 and normally finishes the focus position detection (Step S28).

On the other hand, when the bit error rate BER is larger than "5e-4", the focus position rough detection unit 50 judges how often the FOFF value is changed (Step S26). When the FOFF value is changed twice, the focus position rough detection unit 50 judges that the focus position detection is not finished normally and finishes the focus position detection (Step S29).

When a new focus balance value and/or focus offset value is detected at Steps S15 and S25, the focus position rough detection unit 50 outputs the new focus balance value and/or focus offset value to the focus error detection unit 36 as a control signal FBAL1 and/or the control signal FOFF1 until another detection is performed. In other words, when the laser beam spot is positioned on a groove track, the focus position rough detection unit 50 outputs a balance control signal FBAL1 using the latest focus balance value stored in the first storage unit 52 (and outputs the offset control signal FOFF1 the value of which is "0"). On the other hand, when the laser beam spot is positioned on a land track, the focus position rough detection unit 50 outputs a balance control signal FBAL1 using the latest focus balance value stored in the first storage unit 52, and outputs the offset control signal FOFF1 using the latest focus balance offset value stored in the second storage unit 53. As a result, a focus position detection by the focus position rough detection unit 50 is reflected as the decrease of the bit error rate BER in the following recording and the reproduction.

The reason why the change amount of the focus position in the present embodiment is set at 0.6 μm is described below. When an optical disc drive apparatus is assembled, the initial focus position is adjusted so that the signals recorded in the address areas and data areas on an optical disc would be reproduced in good conditions. The focus position that is indicated by a focus error signal, however, may change due to the temperature characteristics and the secular changes of the optical head. As a result, the number of reproduction errors may increase and the recording characteristics may deteriorate. The temperature characteristics of an optical head depends on the structure. The temperature characteristics of some optical head is 0.0114 μm/° C. In this case, if the temperature around the optical head when the optical disc drive apparatus is activated is 25° C. and the temperature rises to 60° C., the focus position changes about 0.4 μm. If the secular changes of the optical head take place in addition to the temperature characteristics, the signals recorded in the address areas and data areas on the optical disc may not reproduced.

Especially, the addresses in the address areas can not read well when the focus position is apart from the focus position where the bit error rate BER of the address pulse signal is the minimum by ±0.6 μm or more. For instance, when the focus position is apart from the focus position where the bit error rate BER is the minimum by +0.6 to +1.0 μm, and when the focus position is forced to move by −0.6 μm, the focus position is apart from the focus position where the bit error rate BER is the minimum by 0 to +0.4 μm and the addresses may read normally. When the focus position is apart from the focus position where the bit error rate BER is the minimum by −0.6 to −1.0 μm, and when the focus position is forced to move by +0.6 μm, the focus position is apart from the focus position where the bit error rate BER is the minimum by 0 to −0.4 μm and the addresses may read normally.

For the reason described above, the change amount of the focus position is set at 0.6 μm and the focus position where the bit error rate BER is equal to or smaller than "5e-4" is detected in the present embodiment.

As described above, the focus position rough detection unit 50 adjusts the focus balance in the focus error detection unit 36 so that the bit error rate BER would be equal to or smaller than a certain value for the groove track, adjusts the focus offset in the focus error detection unit 36 so that the bit error rate BER would be equal to or smaller than a certain value for the land track, and determines the zero level of the focus error, i.e., the control target position in the focus servo. According to the present embodiment, the focus position is detected using both of the groove track and the land track in the rough focus position detection. As a result, the rough focus position detection avoids the inconvenience that the reproduction characteristics for one of the groove track and the land track is especially bad unlike a conventional detection in which the focus position is detected using one of the groove track and the land track. In other words, the focus control in which good reproduction characteristics are obtained for both of the groove track and the land track, i.e., the focus control in which the number of reproduction errors is small for both of the groove track and the land track is realized.

In the present embodiment, the focus position rough detection unit 50 adjusts the focus balance only for the groove track first, and then adjusts the focus offset only for the land track to detect the best focus position for both of the groove track and the land track. The detection of the best focus position in the present invention is not limited to the kinds of track and the procedure.

FIG. 13 shows transformed examples of the rough focus position detection in the present embodiment. FIG. 13 shows eight different detection methods, i.e., Detection Example Nos. 1 to 8 and control parameters (the control signals FBAL1 and FOFF1 output from the focus position rough detection unit 50 to the focus error detection unit 36) for each of the detection methods. In FIG. 13, a control parameter that is surrounded by a square represents an object that is to be obtained by the detection according to the procedure shown in FIG. 12, and a dotted line with an arrow head indicates that an control parameter obtained for one track is to be used as the control parameter of another track.

In each of the eight methods, the focus position is detected for the groove track and the land track considering both of the groove track and the land track, and the detection procedure is fundamentally the same as shown in FIG. 12 (whether the bit error rate BER is equal to or smaller than a certain value is judged).

In FIG. 13, the Detection Example No. 1 represents the present embodiment (the procedure shown in FIG. 12). According to detection example No. 1, when the laser beam spot is positioned on a groove track, the focus position rough detection unit 50 outputs only a balance control signal FBAL1 corresponding to the latest FBAL value stored in the first storage unit 52, and when the laser beam spot is positioned on a land track, the focus position rough detection unit 50 outputs the balance control signal FBAL1 and the offset control signal FOFF1 corresponding to the latest FOFF value stored in the second storage unit 53. In this case, the focus position rough detection unit 50 adjusts the FBAl value for the groove track and then adjust the FOFF value for the land track with maintaining the FBAl value.

The Detection Example No. 2 corresponds to a transformation of the present embodiment (the Detection Example No. 1) in which the kinds of track are switched.

In the Detection Example No. 3, different FBAL values (a first and a second FBAL value) are used for the groove track and the land track, and no adjustment of the focus offset is performed. More specifically, when the laser beam spot is positioned on a groove track, the focus position rough detection unit 50 outputs only a control signal FBAL1 corresponding to the latest first FBAL value stored in the first storage unit 52, and when the laser beam spot is positioned on a land track, the focus position rough detection unit 50 outputs only a balance control signal FBAL1 corresponding to the latest second FBAL value stored in the first storage unit 52. In this case, the focus position rough detection unit 50 adjusts the first FBAL value for the groove track and then adjusts the second FBAL value for the land track.

As described above, the focus position rough detection unit 50 changes the focus control target position using the focus balance for the land track and the groove track, and sets the focus position at the focus control target position without outputting the focus offset. As a result, the inconvenience that the dynamic range of the focus control system is narrow due to the offset is avoided. For instance, when a disturbance oscillation is applied to the optical disc drive apparatus that is reproducing data, and when the focus position is adjusted using the offset, inconveniences arise. The focus control system is apt to be saturated, and the performance on following the focus control target position degrades. According to the method in the Detection Example No. 3, the inconvenience is avoided and the playability of the optical disc drive apparatus is improved.

In the Detection Example No. 4, different FOFF values (a first and a second FOFF value) are used for the groove track and the land track, and no adjustment of the focus balance is performed. More specifically, when the laser beam spot is positioned on a groove track, the focus position rough detection unit 50 outputs only the offset signal FOFF1 corresponding to the latest first FOFF value stored in the second storage unit 53, and when the laser beam spot is positioned on a land track, the focus position rough detection unit 50 outputs only the offset control signal FOFF1 corresponding to the latest second FOFF value stored in the second storage unit 53. In this case, the focus position rough detection unit 50 adjusts the first FOFF value for the groove track and then adjusts the second FOFF value for the land track.

Generally speaking, a focus offset adjustment circuit is realized with a simpler structure than a focus balance adjustment circuit, and the response of the focus servo when the focus balance changes is poorer than the response when the focus offset changes. As a result, a simple and high speed focus servo control signal is realized in the Detection Example No. 4.

The Detection Example No. 5 has the same basic control method as the Detection Example No. 1. In other words, when the laser beam spot is positioned on a groove track, the focus position rough detection unit 50 only outputs a balance control signal FBAL1 corresponding to the latest FBAL value stored in the first storage unit 52, and when the laser beam spot is positioned on a land track, the focus position rough detection unit 50 outputs the balance control signal FBAL1 and the offset control signal FOFF1 corresponding to the latest FOFF value stored in the second storage unit 53.

In the Detection Example No. 5, however, the focus position rough detection unit 50 performs the same procedure as the Detection Example No. 1, obtains the FOFF value that corresponds to the difference between the best focus positions for the groove track and for the land track, i.e., the FOFF value by which the same (not necessarily the best) focus condition is obtained for the groove track and the land track, and stores the obtained FOFF value in the second storage unit 53 in advance. Then the focus position rough detection unit 50 adjusts the FBAL value only for the groove track.

The Detection Example No. 6 corresponds to a transformation of the present embodiment (the Detection Example No. 5) in which the kinds of track are switched. In the Detection Example Nos. 5 and 6, even when a focus balance is adjusted for one track, it is possible to automatically obtain the best focus position for the other track. In other words, the most suitable focus position for one of the groove track and the land track is obtained by the focus position detection for the other one of the tracks. As a result, the time required for the focus position adjustment is reduced.

In the Detection Example No. 7, the same FOFF value and different FBAL values (a first and a second FBAl value) are used for the groove track and the land track, and no adjustment of the focus balance is performed. More specifically, when the laser beams spot is positioned on a groove track, the focus position rough detection unit 50 outputs the control signals FBAL1 and FOFF1 corresponding to the latest fist FBAl value and the FOFF value stored in the first storage unit 52 and the second storage unit 53, and when the laser beams spot is positioned on a land track, the focus position rough detection unit 50 outputs the offset control signal FOFF1 and a balance control signal FBAL1 corresponding to the latest second FBAl value stored in the first storage unit 52. In this case, the focus position rough detection unit 50 performs the same procedure as the Detection Example No. 3, obtains the first FBAL value and the second FBAL value by which the same (not necessarily the best) focus condition is obtained for the groove track and the land track, and stores the obtained first FBAL value and second FBAL value in the first storage unit 52 in advance. Then the focus position rough detection unit 50 adjusts the FOFF value only for the groove track.

The Detection Example No. 8 corresponds to a transformation of the Detection Example No. 7 in which the kinds of track are switched. In the Detection Example Nos. 7 and 8, the most suitable focus position for one of the groove track and the land track is obtained by the focus position detection for the other one of the tracks. As a result, the time required for the focus position adjustment is reduced.

In the present embodiment, even if the focus position in the reproduction is most suitable, the focus position in the recording may shift from the best focus position because the output powers of the optical head in the reproduction and the recording are different. In this case, it is possible to simply correct the difference between the focus positions in the reproduction and the recording by correcting the focus position in the recording by the same focus offset as for the focus position in the reproduction for both of the groove track and the land track.

While the error rate measurement unit 33 detects a parity error in the present embodiment, a reproduction error may be detected using an error correcting code called a "Cyclic Redundancy Check Code (CRCC)". The CRCC is obtained in the manner described below. The data to be recorded on the optical disc 1 is divided into blocks, and the data bit is expressed in a polynomial, and the polynomial is divided by a certain value called a generating polynomial. The result of the division is added to the data bit as a check bit and is recorded. In order to detect errors in a reproduction, the data including the data bit and the check bit is divided by the generating polynomial once more. When no digital error is included in the data, the data is divisible and the division result is "0", and when any digital error is included, the data is indivisible and the division result is not "0". Whether any error is included in the data may be judged using the division result. As a result, it is possible for the error rate measurement unit 33 to include an error detection unit using the CRCC instead of the parity error detection unit 3302.

While the focus position rough detection unit 50 detects the focus position for the positions apart from the adjustment value that has been stored by $+0.6\,\mu$m and $-0.6\,\mu$m as shown in FIG. 12 in the present embodiment, it is possible to set the change amount of the focus position smaller than $0.6\,\mu$m (for instance, $0.1\,\mu$m) and to detect the focus position. As a result, the focus position where the bit error rate BER is the minimum may be detected with higher accuracy.

The focus position rough detection unit 50 detects the focus position according to the RF pulse signal PRF so that the error rate of the RF pulse signal PRF would be equal to or smaller than a certain value, and detects the focus position according to the address pulse signal PADR so that the error rate of the address pulse signal PADR would be equal to or smaller than a certain value in the present embodiment. It is possible for the focus position rough detection unit 50 to detect the focus position where the reproduction signal is the maximum, the focus position where the jitter in the reproduction signal is the minimum, the focus position that is positioned between the focus position where the amplitude of the reproduction signal is the maximum and the focus position where the jitter in the reproduction signal is the minimum, or the focus position where the error rate of the reproduction signal is the minimum for an address area and a data area according to the position of the address area and the data area.

For instance, when only the address pulse signal PADR is directly input into the parity error detection unit 3302 in the error rate measurement unit 33, the bit error rate BER output from the error rate measurement unit 33 represents the bit error rate in the address areas on the optical disc 1. As a result, it is possible to detect the focus position only according to the error rate in the address areas and to realize an optical disc drive apparatus that detects the focus position for an optical disc on which information is recorded not in the data areas but in the address areas as a rewritable optical disc just after the formatting.

(Precise Focus Position Detection)

The components that are related to the precise focus position detection performed by the optical disc drive apparatus 100 in the recording and the reproduction will be explained in detail. For convenience of explanation, the case in which none of the read gate detection unit 32 and the face shake element removal unit 35 operates will be explained first.

In order to record a test signal for focus position detection on a drive test area on the optical disc 1, the drive controller 14 outputs a test recording control signal TWCNT for controlling the recording position and the start and the stop of the recording to the modulator 42 for the precise focus position detection. After recording the test signal for focus position detection, the drive controller 14 outputs a focus position precise detection control signal FPSON for controlling the start and the stop of the precise focus position detection to the focus position precise detection unit 60.

The drive controller 14 receives the address pulse signal PADR expressed in binary numbers from the address signal detection unit 31, recognizes the present position of the laser beam that is directed from the optical head 7 to a track on the optical disc 1, and instructs the tracking controller 23 according to the address pulse signal PADR to move the laser beam on any track on the optical disc 1.

The reason why a test signal for focus position detection has been recorded on the optical disc 1 prior to the start of the precise focus position detection in the present embodiment will be described below. The optical disc 1 in the present embodiment is a recordable optical disc. On the optical disc 1, no data is recorded except for the preformat areas such as the address areas on which address signals have been recorded before recording. When the optical disc 1 is put in the optical disc drive apparatus 100, it is impossible for the focus position precise detection unit 60 that performs the precise focus position detection according to the reproduction signal RF in a data area to start the precise focus position detection. For this reason, a test signal for focus position detection has been recorded in a drive test area on the optical disc 1 prior to the start of the precise focus position detection.

More specifically, the drive controller 14 judges whether nothing is recorded on the optical disc 1 put in the optical disc drive apparatus 100 prior to a focus position detection. When judging that nothing is recorded, the drive controller 14 records a test signal for focus position detection in a drive test area in advance and records the information specifying (the track in) the drive test area for use later. When judging that information is recorded on the put optical disc 1, the drive controller 14 has the optical head 7 perform a seek move to the position (track) where the information is recorded, and starts a focus position detection.

FIG. 14 shows the layout of the information areas on the optical disc 1 in SS-L/GFMT and is used for explaining the drive test areas on the optical disc 1. As shown in FIG. 14, sector numbers representing the addresses on the optical disc 1 are allotted to an area according to the position on the optical disc 1. The lead-in area (corresponding to the sector numbers 27AB0hex to 30FFFhex) at the inner radius of the optical disc 1 includes the emboss data area (corresponding to the sector numbers 27AB0hex to 2FFFhex), the mirror area (which no address is allotted to and positioned between the emboss data areas and the rewritable data areas), and the rewritable data area (corresponding to the sector numbers 30000hex to 30FFFhex). The rewritable data area includes a drive test area. The lead-out area (corresponding to the sector numbers 16B480hex to 17966Fhex) in the outer radius of the optical disc 1 corresponds to the rewritable data area, and includes the drive test area. The lead-in area and the lead-out area on the optical disc 1 include disc test areas and drive test areas as test areas. In a focus position detection, a drive test area is used (called a "test area" hereinafter in this specification). On the optical disc 1 in SS-L/GFT, a test area is included in each of the lead-in area and the lead-out area.

The drive controller 14 instructs the modulator 42 to record a test signal for focus position detection in a test area before the precise focus position detection, especially before the activation of the optical disc drive apparatus 100. When the track having the same address is repeatedly used for recording, the recording and reproduction characteristics of the track deteriorates significantly, so that the track in a test area on which information is recorded would be changed at random for each learning. The reproduction signal RF that is necessary for the precise focus position detection needs to be successively recorded for more than one turn both on a land track and a groove track on the optical disc 1. As a result, the drive controller 14 determines a groove track in the test areas at the inner radius and the outer radius of the optical disc 1 at random, and instructs the modulator 42 to record the reproduction signal RF on the selected groove track for one track (one turn) from the head address and on the following land track for one track (one turn).

The drive controller 14 determines a test area in the process described below. It the head track address of the test area in the lead-in area is called "Tnih", the last track address of the test area in the lead-in area is called "Tnie", the head track address of the test area in the lead-out area is called "Tnoh", and the last track address of the test area in the lead-out area is called "Tnoe", recording in the test areas is performed for two tracks (two turns) from the head of a groove track to the end of the following land track. In other words, the tracks on which information is to be recorded are the track from the Tnih to the Tnie-1 and the track from the Tnoh to Tnoe-1. The track addresses Tnih, Tnie-1, Tnoh, and Tnoe-1 correspond to sector numbers 30600h, 30CDDh, 16BE80h, and 16C52Fh, respectively. The sector number of the zero-sector included in sector numbers 30600h to 30CDDh and 16BE80h to 16C5Fh are determined at random.

The overall processing when the optical disc drive apparatus 100 performs the precise focus position detection will be explained with reference to FIGS. 1 and 3.

When the rotation speed of the optical disc 1 reaches a certain rotation speed under the control of the drive controller 14, the laser beam from the semiconductor laser 8 is directed to the optical disc 1. The focus error detection unit 36 creates the focus error signal FES from two focus signals VFS1 and VFS2 depending on the laser beam reflected by the optical disc 1, and outputs the created focus error signal FES. The focus error detection unit 36 changes the focus balance and the focus offset according to the control signals FBAL2 and FOFF2 from the focus position precise detection unit 60, and changes the zero level of the focus error, i.e., the control target position in the focus servo.

The focus controller 26 moves the actuator 2 via the adder 24 and the focus drive 21 according to the focus error signal FES from the focus error detection unit 36, and performs the focus servo by which the difference between the focus position corresponding to the focus error signal FES from the focus error detection unit 36 and the focus control target position. The adder 24 is instructed by the drive controller 14 to calculates the summation of the disturbance signal from the disturbance signal generation unit 25 and the signal from the focus controller 26 and to output the signal corresponding to the summation to the focus drive 21 only when the precise focus position detection is being performed. The adder 24 outputs the signal from the signal from the focus controller 26 to the focus drive 21 as it is when no precise focus position detection is being performed.

When the focus controller 26 is performing the focus servo, the broadband tracking error signal RFTE representing the shift of the laser beam from the center of the track on the optical disc 1 is obtained by the reproduction signal detection unit 4 and the difference amplifier 45. The tracking controller 23 performs feedback control so that the laser beam would follow the track on the optical disc 1 according to the broadband tracking error signal RFTE. When a focus control and tracking control are being performed, the reproduction signal RF that has a certain amplitude that is not the highest one but is a moderate one is obtained from the reproduction signal detection unit 4.

When a focus control and tracking control are being performed, the drive controller 14 reads the address on the optical disc 1 at which the laser beam is now positioned via the demodulator 47. The drive controller 14 detects the groove track in a test area on the optical disc 1 at random. When the drive controller 14 detects any groove track in the test areas, it is preferable to detect the track that is adjacent to the target groove track on the inner side and to send a command for making a recording signal (called a "test recording command" in this specification) and a test signal for precise focus position detection to the modulator 42 when the laser beam reaches the head sector (sector zero) of the target groove track.

The modulator 42 outputs the test signal for precise focus position detection to the laser power drive 41 according to the test recording command from the drive controller 14. The laser power drive 41 receives the test signal for precise focus position detection from the modulator 42 and modulates the laser power using the test signal for precise focus position detection.

The drive controller 14 records the test signal for precise focus position detection that has been detected at random on the consecutive two tracks, i.e., a groove track and the following land track from the inner radius of the optical disc 1, and finishes recording.

Then, the drive controller 14 moves the optical head 7 to the groove track in the test area on which the test signal for precise focus position detection has been recorded. In this case it is preferable to detect the track that is positioned at the inner radius of the target groove track by one turn and to send the command of a still jump so that the laser beam would always follow the groove track to the tracking controller 23 when the laser beam is positioned on the target groove track. The tracking controller 23 performs one still jump for each rotation of the optical disc 1, and controls the tracking drive 22 so that the laser beam would always follow one groove track in the test areas that has been detected at random.

When having the focus control and the tracking control perform, one still jump perform for each rotation of the optical disc 1, and the laser beam always follow a groove track in the test areas on the optical disc 1, the drive controller 14 has the disturbance signal generation unit 25 output a disturbance signal and apply a disturbance to the focus control system. Due to the applied disturbance, the focus position is forced to change, and the focus error signal FES includes the frequency element of the disturbance signal (a disturbance element). The focus position precise detection unit 60 obtains the information representing the shift of the laser beam position from the optical disc 1, i.e., the focus position information FPIS from the disturbance element included in the focus error signal FESS transferred from the switch unit 39 and the envelope and the jitter in the reproduction signal RF transferred from the signal processing unit 40, and detects the focus position that is the most suitable for the amplitude and the jitter in the reproduction signal RF, i.e., the best focus position according to the obtained focus position information FPIS. The focus position precise detection unit 60 obtains the focus position information FPIS for the data areas or a specific data area that has been designated by the drive controller 14 according to the gate signal IDGATE from the address signal detection unit 31 and the gate signal RDGT from the read gate detection unit 32, and detects the best focus position with higher accuracy.

Figure 15:
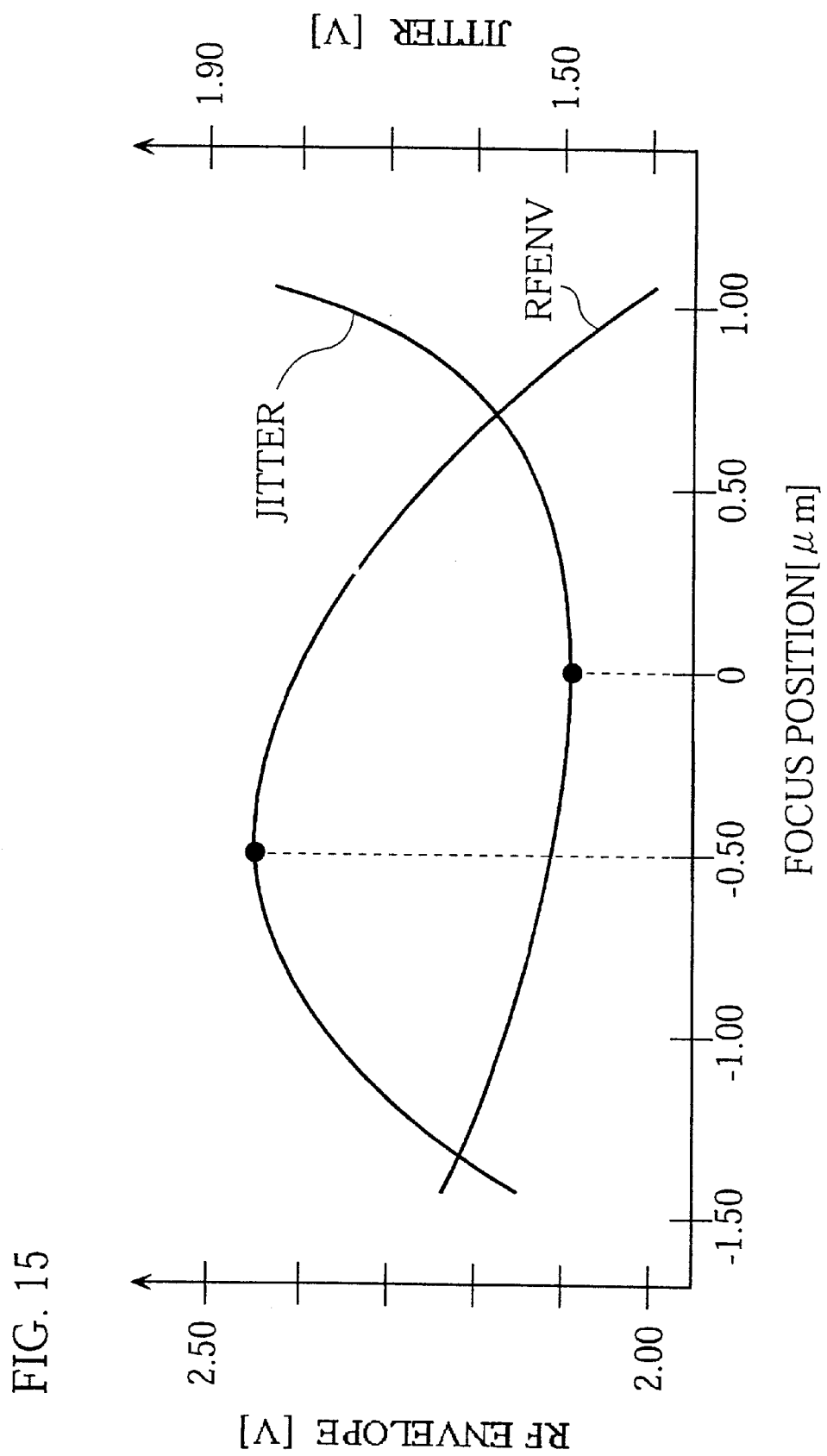
FIG. 15 is a graph showing the relationships between the size of the envelope RFENV and the focus position, and the size of the reproduction jitter in the reproduction signal RF and the focus position.

FIG. 15 is a graph showing the relationships between the size of the envelope RFENV and the focus position, and the size of the reproduction jitter in the reproduction signal RF and the focus position. FIG. 15 is used for explaining the best focus position in the precise focus position detection. As shown in FIG. 15, the envelope shows a convex curve and has the maximum size at a focus position (−0.50 μm), and the jitter shows a concave curve and has the minimum size at a focus position different from the position at which the envelope has the maximum size (0 μm). In other words, the focus position at which the envelope of the reproduction signal RF has the maximum size (the envelope maximum position) differs from the focus position at which the jitter in the reproduction signal RF has the minimum size (the jitter minimum position). In the present embodiment, the best focus position is detected according to the value (the focus position information FPIS) that is obtained by multiplying the envelope and the jitter in the reproduction signal by coefficients and calculating the summation of the multiplied envelope and the jitter. More specifically, the focus position precise detection unit 60 adjusts each of the coefficients that are to multiply the envelope and the jitter so that the best focus position is positioned at a certain position (for instance, −0.25 μm) between the envelope maximum position and the jitter minimum position.

Figure 16:
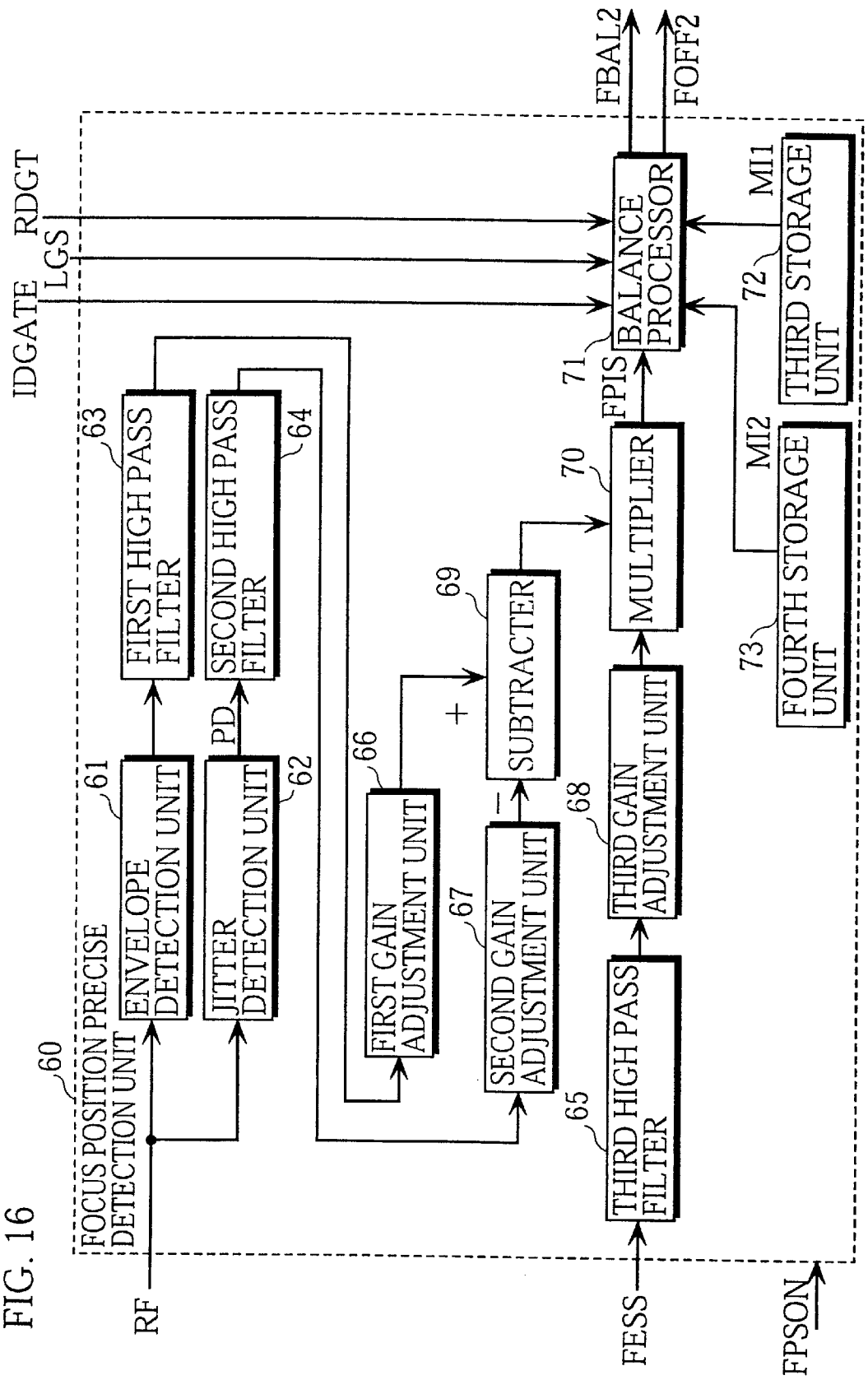
FIG. 16 is a block diagram showing the in-detail structure of a focus position precise detection unit 60.

FIG. 16 is a block diagram showing the in-detail structure of the focus position precise detection unit 60. An envelope detection unit 61 detects the envelope of the reproduction signal RF from the signal processing unit 40. A first high pass filter 63 cuts off the frequency element of the reproduction signal envelope output from the envelope detection unit 61 that is equal to or lower than the rotation frequency of the optical disc 1 (for instance, 39.78 Hz), and passes the signal element of the frequency equal to or higher than a certain frequency, i.e., the signal element of the frequency equal to or higher than the frequency of the disturbance signal (1 kHz) output from the disturbance signal generation unit 25. A first gain adjustment unit 66 adjusts the gain of the signal output from the first high pass filter 63 so that the gain would be a certain value.

A jitter detection unit 62 expresses the reproduction signal RF in binary numbers using a certain threshold, creates the RF pulse signal PRF, and detects the jitter from the created RF pulse signal PRF and a reference clock signal that has been created in the jitter detection unit 62. A second high pass filter 64 has the same characteristics as the first high pass filter 63, passes the frequency element of the frequency (1 kHz) of the disturbance signal of the reproduction signal that has been detected by the jitter detection unit 62, and cuts off the frequency element that is equal to or lower than the rotation frequency of the optical disc 1 (for instance, 39.78 Hz). A second gain adjustment unit 67 adjusts the gain of the signal output from the second high pass filter 64 so that the gain would be a certain value.

A subtracter 69 subtracts the signal output from the second gain adjustment unit 67 from the signal output from the first gain adjustment unit 66. This is because the difference between the polarities of the changes of the envelope signal and the jitter signal is considered. As the focus position is apart from the best focus position, the size of the envelope signal output from the envelope detection unit 61 becomes small and the size of the jitter signal becomes larger.

A third high pass filter 65 has the same characteristics as the first high pass filter 63, passes the frequency element of the frequency (1 kHz) of the disturbance signal of the focus error signal FESS output from the switch unit 39, and cuts off the frequency element that is equal to or lower than the rotation frequency of the optical disc 1 (for instance, 39.78 Hz). A third gain adjustment unit 68 adjusts the gain of the signal output from the third high pass filter 65 so that the gain would be a certain value. A multiplier 70 multiplies the signal output from the subtracter 69 by the signal output from the third gain adjustment unit 68, and outputs the result to a balance processor 71 as the focus position information FPIS.

A third storage unit 72 is an erasable nonvolatile memory for storing the latest focus balance value for the groove track that has been obtained in the precise focus position detection. A fourth storage unit 73 is an erasable nonvolatile memory for storing the latest focus offset value for the land track that has been obtained in the precise focus position detection.

The balance processor 71 calculates the average of the focus position information FPIS from the multiplier 70 during the period designated by the gate signal IDGATE transferred from the address signal detection unit 31 and the gate signal RDGT transferred from the read gate detection unit 32, stores the obtained average, and outputs the control signals FBAL2 and FOFF2 corresponding to the average to the focus error detection unit 36 via the switch units 37 and 38. In this case, the balance processor 71 distinguishes a groove track and a land track according to the L/G switch signal LGS from the land groove detection unit 34, and changes the control signals FBAL2 and FOFF2 as in the case of the rough focus position detection that has been described. More specifically, when the L/G switch signal LGS represents a groove track, the balance processor 71 determines the control signal (the focus balance value) for the more suitable focus position according to the obtained average, stores the focus balance value in the third storage unit 72, and outputs the focus balance value as the control signal FBAL2. On the other hand, when the L/G switch signal LGS represents a land track, the balance processor 71 maintains the output of the control signal FBAL2, determines the control signal (the focus offset value) for the more suitable focus position according to the obtained average, stores the focus offset value in the fourth storage unit 73, and outputs the focus offset value as the control signal FOFF2.

Figure 17:
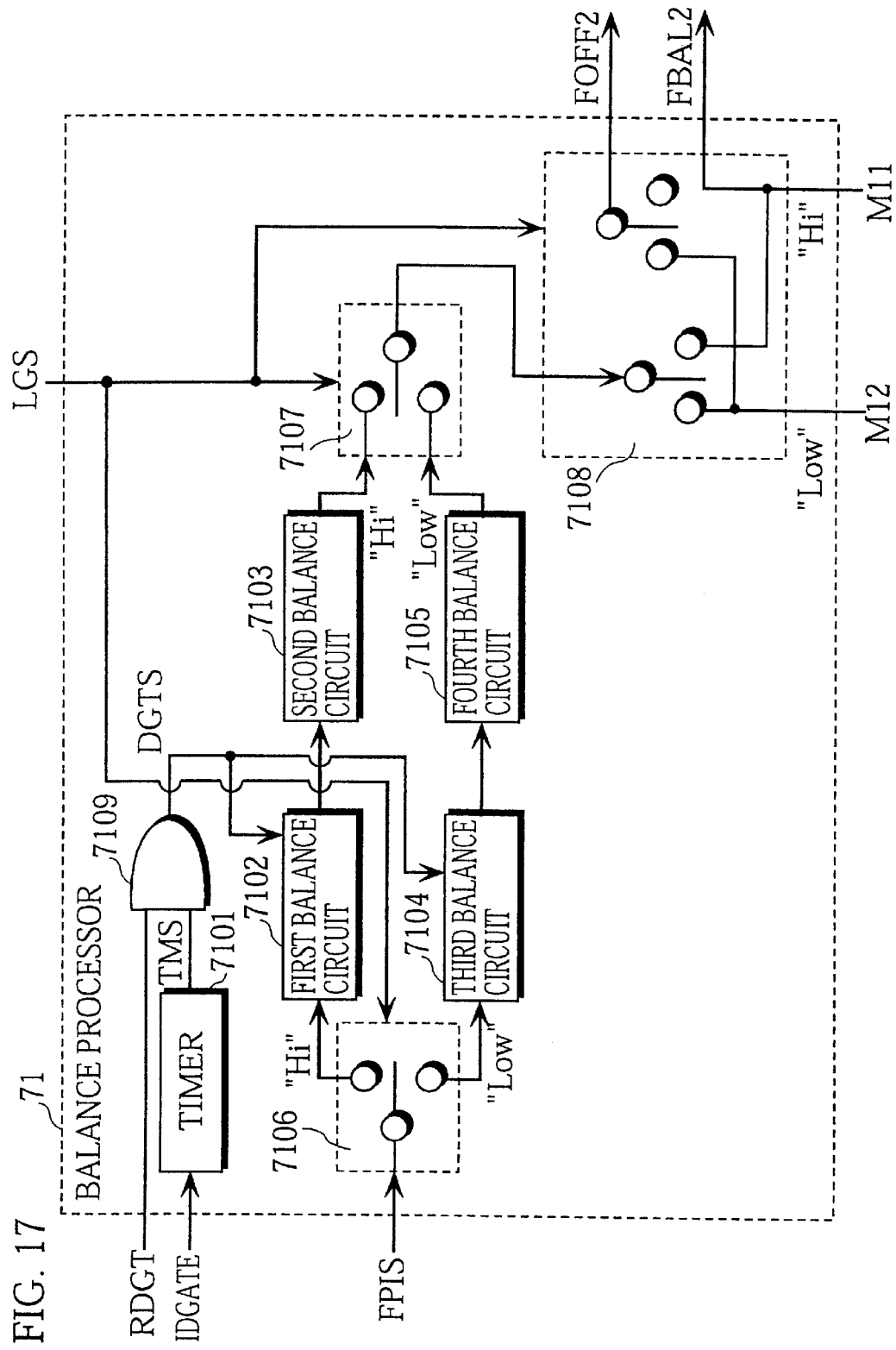
FIG. 17 is a block diagram showing the in-detail structure of a balance processor 71.

FIG. 17 is a block diagram showing the in-detail structure of the balance processor 71. A timer 7101 starts measuring after a predetermined wait time (200 μs) has elapsed since the rising edge of the gate signal IDGATE from the address signal detection unit 31, measures the time corresponding to one cycle of the disturbance (1 ms), and outputs a timer signal TMS that represents the period of time required by the measurement to an AND circuit 7109. The AND circuit 7109 carries out the AND between the timer signal TMS from the timer 7101 and the gate signal RDGT from the read gate detection unit 32, and outputs the result to a first balance circuit 7102 and a third balance circuit 7104 as a data obtainment timing signal DGTS. More specifically, only when the gate signal RDGT is "Hi" and the timer signal from the timer 7101 "Hi", the calculation of the average in the first and third balance circuits 7102 and 7104 is allowed.

A first selection circuit 7106 is a selector that outputs the focus position information FPIS from the multiplier 70 to the first balance circuit 7102 when the L/G switch signal LGS is "Hi", i.e., when the L/G switch signal LGS represents a groove track and outputs the focus position information FPIS to the third balance circuit 7104 when the L/G switch signal LGS is "Low", i.e., when the L/G switch signal LGS represents a land track.

The first balance circuit 7102 calculates the average of the focus position information FPIS from the first selection circuit 7106 only while the data obtainment timing signal DGTS from the AND circuit 7109 is "Hi". By doing so, the first balance circuit 7102 calculates the average of the focus position information FPIS for one cycle of disturbance signal when the read gate detection unit 32 does not operate, i.e., when the gate signal RDGT is always "Hi". A second balance circuit 7103 is composed of a DSP with a built-in control program and the like, calculates the mean of the average obtained in the first balance circuit 7102 a predetermined number of times, and outputs a new focus target position M11 (a new focus balance value) on a groove track that is determined according to the obtained average. The relationship between the focus position information FPIS and the new focus target position M11 will be described later.

The third balance circuit 7104 and a fourth balance circuit 7105 have the same functions as the first balance circuit 7102 and the second balance circuit 7103, respectively. The third balance circuit 7104 and the fourth balance circuit 7105, however, operate when the L/G switch signal LGS is "Low", i.e., when the L/G switch signal LGS represents a land track. As a result, the fourth balance circuit 7105 outputs a focus target position M12 (a focus offset value) on the land track.

A second selection circuit 7107 is a selector that selects the second balance circuit 7103 when the L/G switch signal LGS is "Hi", i.e., when the L/G switch signal LGS represents a groove track, selects the fourth balance circuit 7105 when the L/G switch signal LGS is "Low", i.e., when the L/G switch signal LGS represents a land track, and outputs the output signal to a third selection circuit 7108.

The third selection circuit 7108 outputs the focus target position M11 (the focus balance value) on the groove track to the third storage unit 72 when the L/G switch signal LGS is "Hi", and outputs the focus target position M12 (the focus offset value) on the land track to the fourth storage unit 73 when the L/G switch signal LGS is "Low". The third selection circuit 7108 reads out the latest focus target position M11 (focus balance value) that has been stored in the third storage unit 72 when reproducing the signal from a groove track, reads out the latest focus target position M12 (focus offset value) that has been stored in the fourth storage unit 73 when reproducing the signal from a land track, and outputs the read focus target position M11 or M12 to the focus error detection unit 36 via the switch units 37 and 38.

FIG. 18 is a timing chart of the disturbance signal, the gate signal IDGATE, and the timer signal TMS when the read gate detection unit 32 does not operate. In this case, the read gate detection unit 32 does not operate, i.e., the gate signal RDGT is always "Hi", so that the timer signal TMS is equal to the data obtainment timing signal DGTS. FIG. 18 shows that the timer 7101 starts measuring after a predetermined wait time (200 μs) has elapsed since the falling edge of the gate signal IDGATE from the address signal detection unit 31 and stops after the time corresponding to one cycle of disturbance signal has elapsed. In this way, the data obtainment timing signal DGTS for calculating the average of the focus position information FPIS during one cycle of disturbance signal in the data areas is obtained.

Figure 19A:
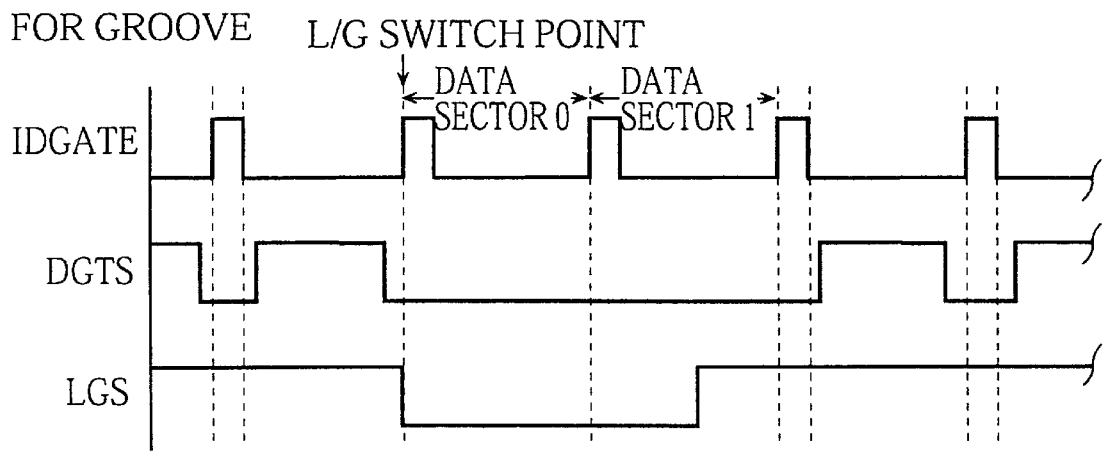
FIG. 19A is a timing chart of the gate signal IDGATE, the data obtainment timing signal DGTS, and the L/G switch signal LGS on a groove track in the precise focus position detection when the read gate detection unit 32 does not operate.
Figure 19B:
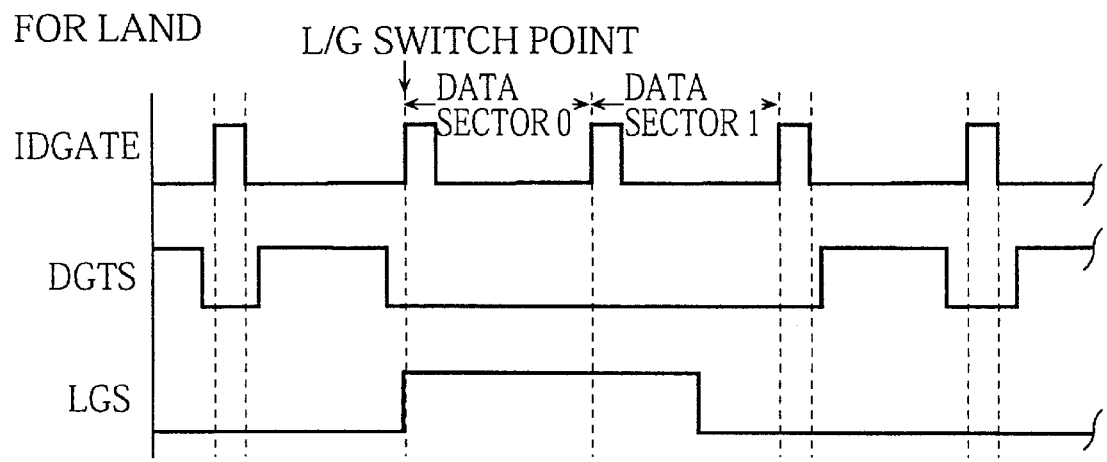
FIG. 19B is a timing chart of the gate signal IDGATE, the data obtainment timing signal DGTS, and the L/G switch signal LGS on a land track in the precise focus position detection when the read gate detection unit 32 does not operate.

FIGS. 19A and 19B are timing charts of the gate signal IDGATE, the data obtainment timing signal DGTS, and the L/G switch signal LGS on a groove track and a land track in the precise focus position detection when the read gate detection unit 32 does not operate. FIG. 19A is a timing chart on a groove track, and FIG. 19B is a timing chart on a land track.

The drive controller 14 controls the tracking controller 23 so that a still jump is performed for one rotation of the optical disc 1 and the laser beam on the optical disc 1 always follows a groove track or a land track in the precise focus position detection. As a result, when the laser beam on the optical disc 1 follows a groove track, the L/G switch signal LGS has the waveform that changes from a "Hi" level representing a groove track to a "Low" level representing a land track at the L/G switch point and changes again to a "Hi" level with a still jump in the data sector 1 as shown in FIG. 19A. In other words, the laser beam on the optical disc 1 that follows a land track after following a groove track again follows the same groove track with a still jump in the data sector 1.

Around the L/G switch point, the data obtainment timing signal DGTS shows a waveform that is at a "Low" level during the period in which the gate signal IDGATE is at a "Hi" level and just before and after the period and in the data sectors 0 and 1 as shown in FIG. 19A. When the data obtainment timing signal DGTS is at a "Low" level, the first balance circuit 7102 obtains no focus position information FPIS from the first selection circuit 7106, i.e., stops calculating the average of the focus position information FPIS.

On the other hand, when the laser beam on the optical disc 1 follows a land track, the L/G switch signal LGS has the waveform that changes from a "Low" level representing a land track to a "Hi" level representing a groove track at the L/G switch point and changes again to a "Low" level with a still jump in the data sector 1 as shown in FIG. 19B. In other words, the laser beam on the optical disc 1 that follows a groove track after following a land track again follows the same land track with a still jump in the data sector 1.

Around the L/G switch point, the data obtainment timing signal DGTS shows a waveform that is at a "Low" level during the period in which the gate signal IDGATE is at a "Hi" level and just before and after the period and in the data sectors 0 and 1 as shown in FIG. 19B. When the data obtainment timing signal DGTS is at a "Low" level, the third balance circuit 7104 obtains no focus position information FPIS from the first selection circuit 7106, i.e., stops calculating the average of the focus position information FPIS.

As shown by the timing charts shown in FIGS. 19A and 19D, the balance processor 71 discards the focus position information FPIS in the address areas according to the gate signal IDGATE from the address signal detection unit 31, distinguishes a groove track and a land track, and calculates the average of the focus position information FPIS. In other words, the balance processor 71 calculates the average of the focus position information FPIS obtained in the data area on a groove track and the focus position information FPIS obtained in the data area on a land track independently.

The conversion of the focus control target position in the precise focus position detection by the focus position precise detection unit 60 will be described below with reference to FIG. 16.

The focus position precise detection unit 60 outputs the control signals FBAL2 and FOFF2 corresponding to the focus control target position that has been obtained by calculating the average of the focus position information FPIS from the multiplier 70 in the balance processor 71 to the focus error detection unit 36. In this case, it is ideally favorable that the best focus position is obtained by the change of the focus control target position according to the focus position information FPIS so that the best reproduction condition would be obtained with one precise focus position detection. Such an ideal detection is represented by an Expression 6 described below.

$$\text{Focus position information FPIS} * K = \text{Change amount of target position} \quad \text{(Expression 6)}$$

In the Expression 6, the "K" represents the constant that relates the amount of shift from the best focus position to the change amount of the control target position (called a "correction gain constant" hereinafter in this specification). When the focus control target position is changed in accordance with the Expression 6, and when the correction gain constant "K" is set at "1", the focus control target position may be set with ideal one change so that the focus position is positioned at the best focus position.

The detection sensitivity of the envelope signal and the jitter signal, however, which change in response to the disturbance signal from the disturbance signal generation unit 25, varies in the precise focus position detection. As a result, the gain constant "K", which relates the focus position information FPIS to the focus control target position, is set at the value smaller than "1", the focus control target position is repeatedly renewed a predetermined number of times, and the focus control target position is converged so that the focus position is positioned at the best focus position in the present embodiment. When the gain constant "K" is set at, for instance, "0.7" and the precise focus position detection is performed four times so that the focus position is converged into the best focus position in the present embodiment, the best focus position may be detected accurate to within 0.05 $\mu$m even if the focus position is originally apart from the best focus position by 1 $\mu$m.

In this way, the focus position precise detection unit 60 discards the focus position information FPIS in the address areas and obtains the focus position information FPIS only in the data areas for a land track and a groove track, obtaining the focus control target position so that the focus position is positioned at the best focus position depending on whether the laser beam spot is positioned on the land track and the groove track.

The jitter detection unit 62 will be explained with reference to FIGS. 20, 21, and 22. FIG. 20 is a block diagram showing the in-detail structure of the jitter detection unit 62. A binary number circuit 6201 receives the reproduction signal RF from the signal processing unit 40 and outputs the RF pulse signal PRF, which is expressed in binary numbers using a predetermined threshold. A phase comparison circuit 6202 detects the phase shift of the RF pulse signal PRF from the clock signal CLK output from a Voltage Controlled Oscillator (VCO) 6205. More specifically, the phase comparison circuit 6202 outputs a pulse with the pulse width according to the phase shift from an output terminal UP or DN depending on whether the phase of the RF pulse signal PRF is leading the phase of the clock signal CLK or the phase of the RF pulse signal PRF is delaying. A differential circuit 6203 calculates the difference between the pulse signals UP and DN output from the phase comparison circuit 6202, and outputs the calculated difference to an integration circuit 6204. The integration circuit 6204 integrates the signal output from the differential circuit 6203 and outputs the result to the VCO 6205. The VCO 6205 outputs the clock signal CLK that has the frequency depending on the output from the integration circuit 6204 to the phase comparison circuit 6202. An addition circuit 6206 calculates the summation of the pulse signals UP and DN output from the phase comparison circuit 6202, and outputs the result to a lowpass filter (LPF) 6207, which will be described later. The LPS 6207 outputs a low frequency element of the signal output from the addition circuit 6206 as a pulse width change signal PD. The pulse width change signal PD, which has been created in this way, represents the jitter in the RF pulse signal PRF and the clock signal CLK.

Figure 21:
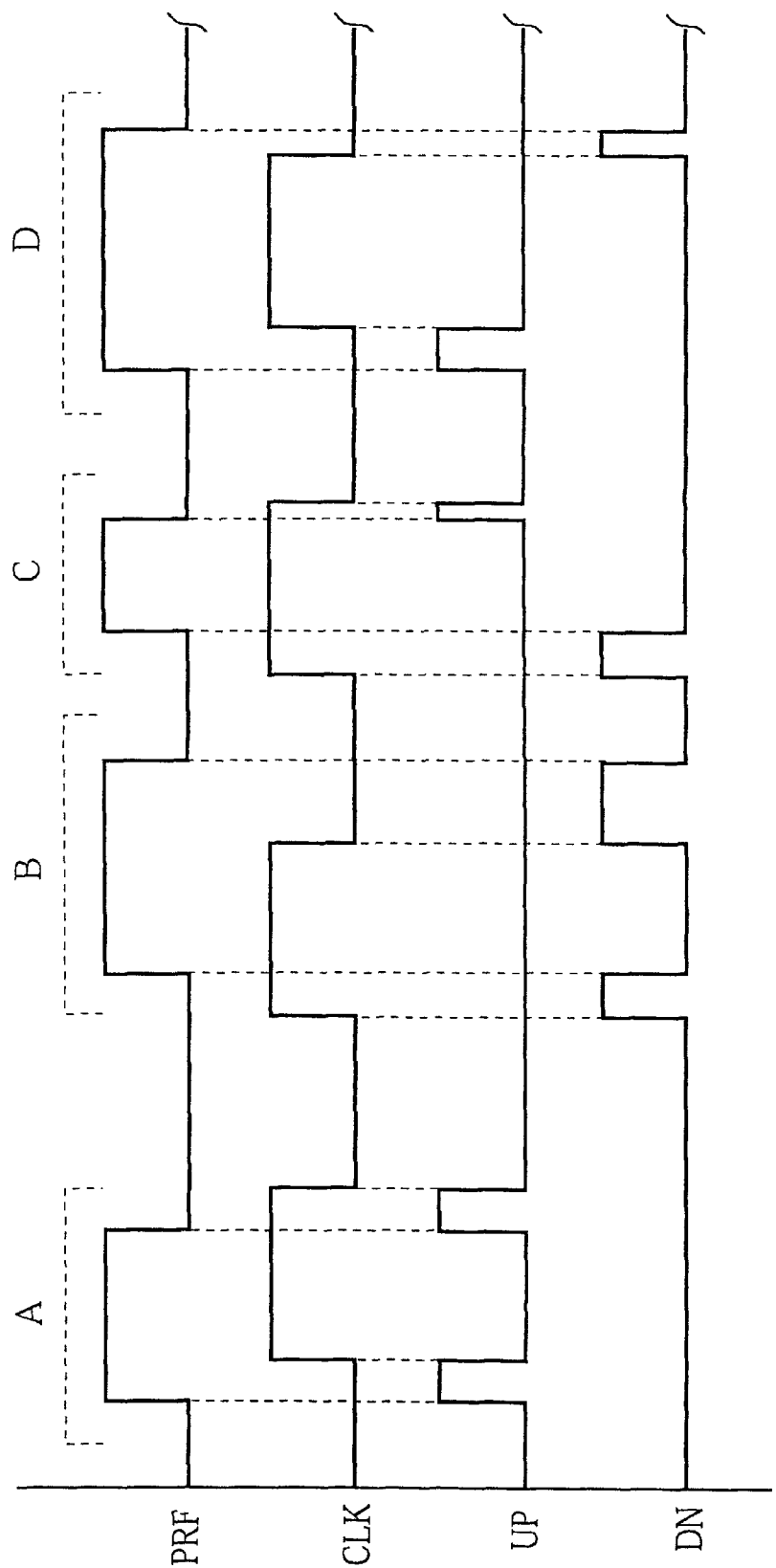
FIG. 21 is a timing chart of the RF pulse signal PRF, the clock signal CLK, and the pulse signals UP and DN in the jitter detection unit 62.

FIG. 21 is a timing chart of the RF pulse signal PRF, the clock signal CLK, and the pulse signals UP and DN output from the phase comparison circuit 6202 in the jitter detection unit 62. While three pulses of the clock signal CLK output from the VCO 6205 generally correspond to the pulse of the RF pulse signal PRF that has the narrowest pulse width for an Eight to Fourteen Modulation (EFM), in FIG. 21 it is assumed that the pulse width of the RF pulse signal PRF is equal to that of the clock signal CLK in the interests of simplicity.

The phase comparison circuit 6202, the differential circuit 6203, the integration circuit 6204, and the VCO 6205 form a Phase Locked Loop (PLL). The phase comparison circuit 6202 outputs the pulse signals UP and DN corresponding to the phase difference between the RF pulse signal PRF and the clock signal CLK as shown in FIG. 21. More specifically, when the RF pulse signal PRF is leading the clock signal CLK at a rising edge and a falling edge, the phase comparison circuit 6202 outputs the pulse signal UP that has the pulse width corresponding to the degree of the leading (refer to the range "A" in FIG. 21). On the other hand, when the RF pulse signal PRF is delaying, the phase comparison circuit 6202 outputs the pulse signal DN that has the pulse width corresponding to the degree of the delay (refer to the range "B" in FIG. 21). The lead and delay of the phase are changed into the positive and negative pulse signal by the differential circuit 6203, and the summation is calculated by the integration circuit 6204 to be one signal. The VCO 6205 creates the clock signal CLK that has the frequency corresponding to the voltage of the signal from the integration circuit 6204 and feedbacks the created clock signal CLK to the phase comparison circuit 6202. As a result, the clock signal CLK is controlled so that the average of the phase difference between the clock signal CLK and the RF pulse signal PRF would be "0".

When the pulse width of the RF pulse signal PRF is constant, the pulse signals UP and DN have no pulse corresponding to a phase difference as a result of the feedback, i.e., the pulse signals UP and DN remain at zero level. When the pulse width of the RF pulse signal PRF is narrower than that of the clock signal CLK (refer to the range "C" in FIG. 21), the pulse signal DN is generated at the rising edge of the clock signal CLK and the pulse signal UP is generated at the falling edge of the RF pulse signal PRF. On the other hand, when the pulse width of the RF pulse signal PRF is wider than that of the clock signal CLK (refer to the range "D" in FIG. 21), the pulse signal UP is generated at the rising edge of the RF pulse signal PRF and the pulse signal DN is generated at the falling edge of the clock signal CLK.

As described earlier, the PLL controls the frequency and the phase of the clock signal CLK so that the average of the phase difference between inputs U and V into the phase comparison circuit 6202 would be "0". By doing so, when the pulse width of the RF pulse signal PRF changes, the same width of pulses are output as the pulse signals UP and DN. As a result, the addition circuit 6206 only outputs the change element of a pulse width. The LPF 6207 smooths such a change element and outputs a signal that is expressed in a direct current voltage as the pulse width change signal PD. In this way, the jitter detection unit 62 outputs a pulse width change detection signal PD as the jitter in the reproduction signal RF in a data area.

Figure 22:
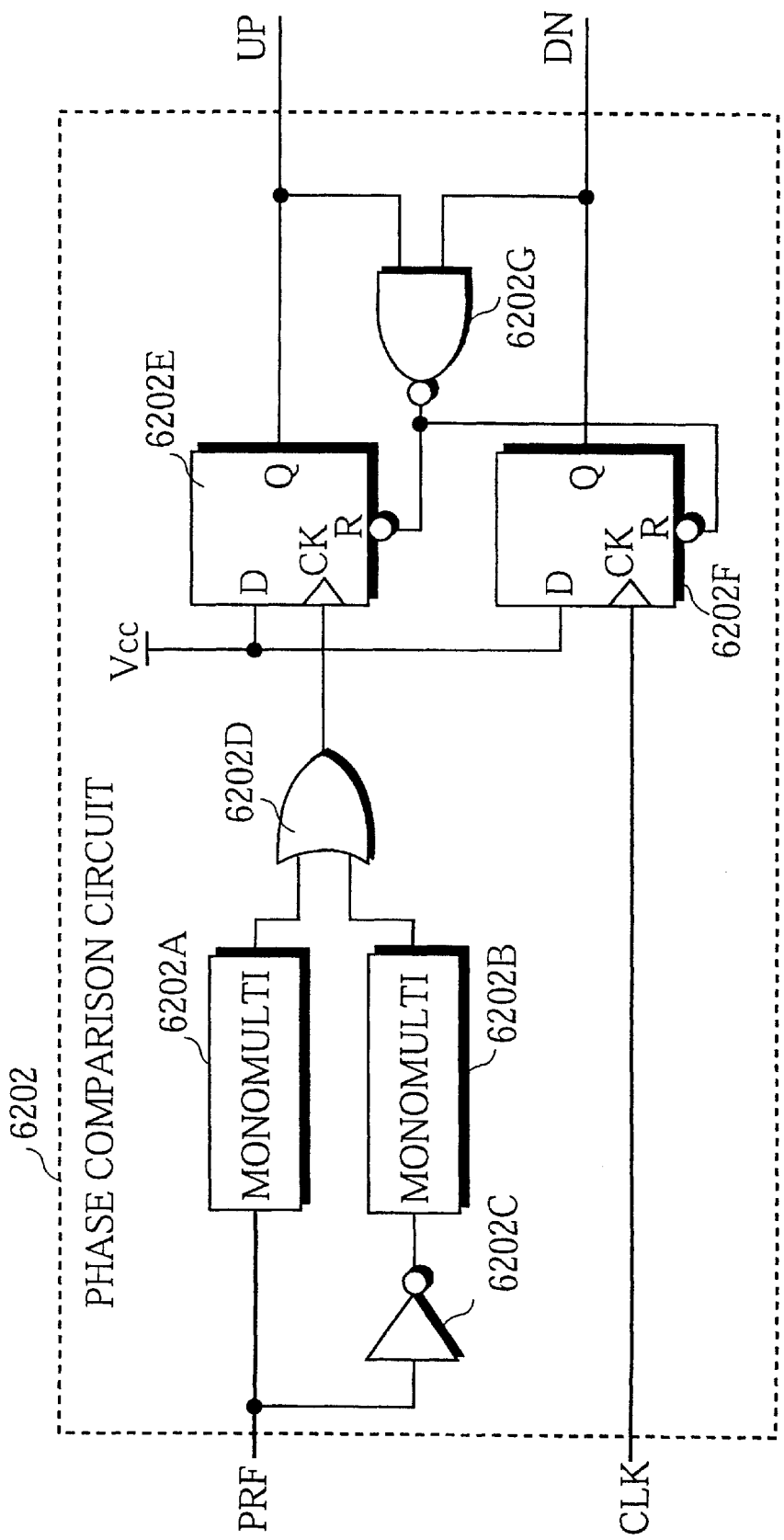
FIG. 22 is a block diagram showing the in-detail structure of a phase comparison circuit 6202.

FIG. 22 is a block diagram showing the in-detail structure of the phase comparison circuit 6202 shown in FIG. 20. As shown in FIG. 22, a rising edge of the RF pulse signal PRF is detected by a monomulti 6202A. A falling edge of the RF pulse signal PRF is changed into a rising edge by a reverse circuit 6202C, and the rising edge is detected by a monomulti 6202B. The output from each of the monomultis 6202A and 6202B is input into an OR circuit 6202D. The OR circuit 6202D inputs the output into a Clock (CK) terminal of a flip-flop 6202E. Into the CK terminal of a flip-flop 6202F the clock signal CLK from the VCO 6205 is input. The pulse signal UP from the flip-flop 6202E and the pulse signal DN from the flip-flop 6202F are input into a Negative AND (NAND) circuit 6202G, and the signals output from the NAND circuit 6202G are input into Reset (R) terminals of the flip-flops 6202E and 6202F. D inputs of the flip-flops 6202E and 6202F are connected to a power supply voltage (of +5V, for instance). The phase comparison circuit 6202, the structure of which has been described, sets one of the flip-flops 6202E and 6202F at the earlier one of the edges of the signal from the OR circuit 6202D and the clock signal CLK, and resets both of the flip-flops 6202E and 6202F at the later one.

The structure of the phase comparison circuit 6202 may be different from the structure shown in FIG. 22. In other words, the phase comparison circuit 6202 may be a circuit that outputs the difference between and the summation of the pulse signals UP and DN, i.e., a circuit that includes the difference (UP−DN) and the sum (UP+DN) as output terminals. The sum (UP+DN) may be realized by the exclusive—OR. It is preferable, however, for the phase comparison circuit 6202 to output the pulse signals UP and DN independently in order to obtain the difference (UP−DN) and the sum (UP+DN) with a relatively simple structure. In addition, the structure of the phase comparison circuit 6202 may be realized by another circuit structure with the functions that have been described.

The focus position precise detection unit 60 the structure of which has been described obtains the focus target positions M11 and M12 from the jitter and the envelope of the reproduction signal RF and the focus error signal FES that are generated when the disturbance signal from the disturbance signal generation unit 25 is applied to the focus control system via the adder 24. The focus position precise detection unit 60 outputs the control signals FBAL2 and FOFF2 for changing the control target position in the focus servo to the focus error detection unit 36 according to the obtained focus target position. The focus error detection unit 36 changes the focus balance and the focus offset according to the control signals FBAL2 and FOFF2 from the focus position precise detection unit 60, creates the focus error signal FES, and sets the zero level of the focus error according to the focus signals VFS1 and VFS2 output from the signal processing unit 40, i.e., the control target position in the focus servo.

As has described in the explanation of the conversion of the focus control target position in the precise focus position detection, when the correction gain constant that completely corrects the shift from the best focus position with one correction is supposed to be "1", the correction gain constant, which relates the amount of shift from the best focus position to the change amount of the control target position, is set at the value smaller than "1", "0.7" considering the detection sensitivity variation of the envelope signal and the jitter signal of the reproduction signal, which changes in response to the disturbance signal from the disturbance signal generation unit 25. Suppose that the focus position correction according to the control signals FBAL2 and FOFF2 corresponding to the average that has been obtained by calculating the average of the focus position information FPIS for 24 cycles of disturbance signal is performed once, it is possible to repeat the correction about four times and to obtain the focus position with the best amplitude and jitter in the reproduction signal, i.e., to set the shift from the best focus position at the value equal to or smaller than a predetermined value (for instance, ±0.05 μm converted to the focus position). In other words, it is possible to converge the focus position to the best focus position accurate to within ±0.05 μm with four times of correction.

The meaning of the processing by the focus position precise detection unit 60 and the focus controller 26 according to the gate signal IDGATE from the address signal detection unit 31 will be explained below.

On the optical disc 1 in SS-L/GFMT, the address areas are included between the data sectors, and a switch point at which a land and a groove switch is included after an address area for one turn of land or groove (refer to FIG. 4A). As shown in FIG. 4A, the structures of the data area and the address area are different. As a result, the condition of the laser beam that is reflected on the optical disc 1 and is to be directed into the reproduction signal detection unit 4 and the beam detection unit 5 is different for the data area and the address area, and offset is generated for focus error signals FES and broadband tracking error signals RFTE when the laser beam is positioned on a data area and an address area. More specifically, when the laser beam is positioned on an address area, the focus position and the tracking position detected according to the focus error signal FES and the broadband tracking error signal RFTE include errors.

As a result, when the focus servo that controls the laser beam so that the laser beam directed at the optical disc 1 always converges to a predetermined condition and the tracking servo that controls the laser beam so that the laser beam follows the track on the optical disc 1 are being performed, and when the laser beam moves from a data area to an address area, each of the focus serve and the tracking servo is disturbed. In order to prevent such disturbance, it is necessary to prevent the focus servo and the tracking servo from changing when the laser beam is positioned on an address area. This is because each of the focus serve and the tracking servo is hold according to the gate signal IDGATE (detected by the address signal detection unit 31) as shown in FIG. 6D when the laser beam is positioned in an address area.

As has been described, the laser beam moves from a land track to a groove track or from a groove track to a land track for one rotation of the optical disc 1 in SS-L/GFMT when information on the track in a single spiral is recorded and reproduced. The tracking polarity of a land track is the reverse of that of a groove track on the optical disc 1. As a result, it is necessary to switch tracking polarities when the laser beam moves from a land track to a groove track and from a groove track to a land track. The L/G switch signal LGS as shown in FIG. 4C is used for switching the tracking polarity to follow tracks.

In the precise focus position detection in the present embodiment operations described below are performed. The focus control and the tracking control are being performed. A still jump is performed for one rotation of the optical disc 1. The precise focus position detection is performed for a groove track when the laser beam always follows the groove track. The laser beam moves to the following land track after the precise focus position detection for the groove track. The precise focus position detection is performed for a land track when the laser beam always follows the land track. In addition, a focus position information FPIS for calculating the shift of the present focus position from the best focus position uses the envelope and the jitter in the reproduction signal. As a result, it is necessary to perform a focus position detection by the focus position precise detection unit 60 in an area on the optical disc 1, the area in which information has been recorded.

Figure 23:
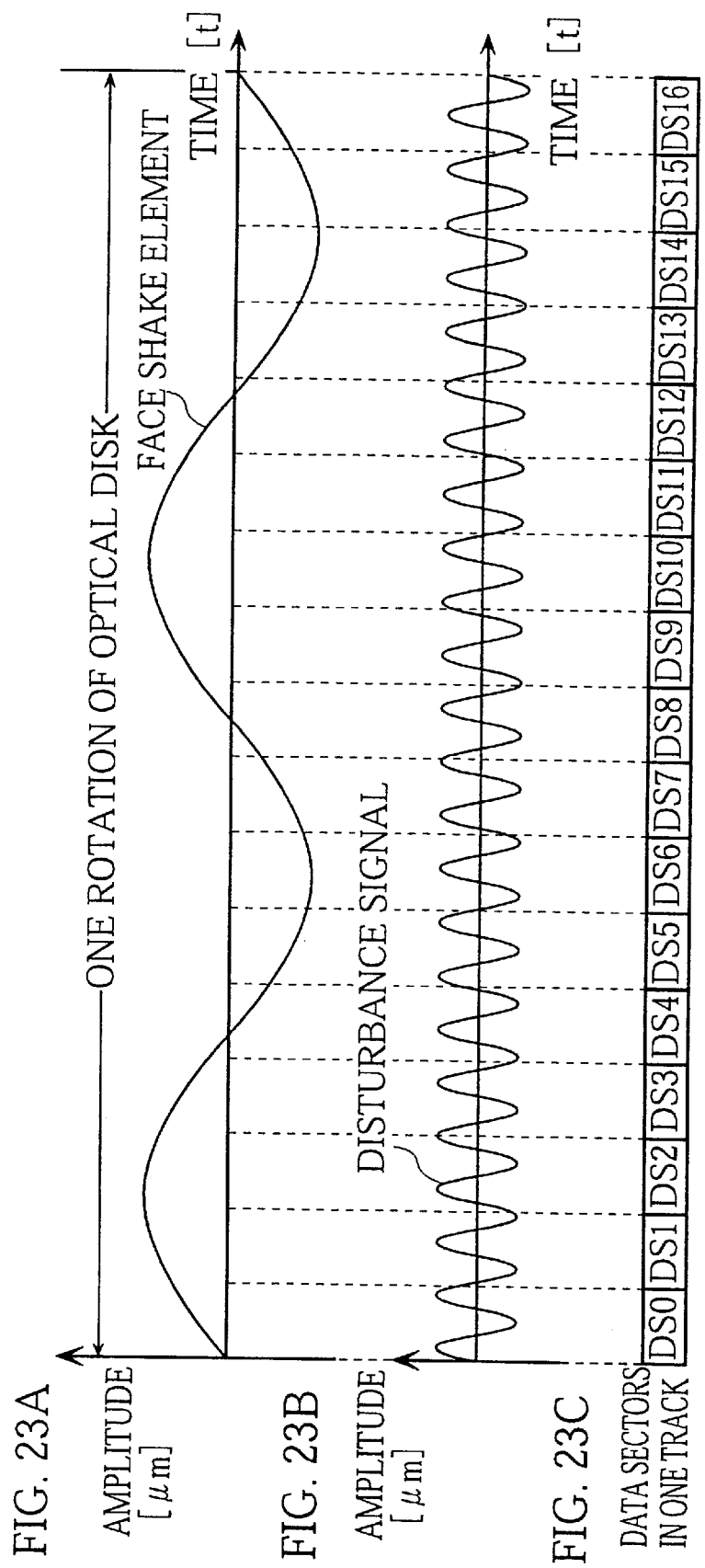
FIG. 23A is a waveform of the face shake element, which arises in the focus error signal FES as the residual error in the focus servo, for one rotation of the optical disc 1.
FIG. 23B is a waveform of the disturbance signal output from a disturbance signal generation unit 25.
FIG. 23C is a simplified view of the data sectors included in one cycle of track (one track) on the optical disc 1.

The relationship among a face shake element, which arises in the focus error signal FES as the residual error in the focus servo, the disturbance signal from the disturbance signal generation unit 25, and a data sector will be described with reference to FIGS. 23A to 23C. FIG. 23A is a waveform of the face shake element, which arises in the focus error signal FES as the residual error in the focus servo, for one rotation of the optical disc 1. FIG. 23B is a waveform of the disturbance signal output from the disturbance signal generation unit 25. FIG. 23C is a simplified view of the data sectors included in one turn of track on the optical disc 1 (for instance, a track at the inner radius of the optical disc 1).

As shown in FIG. 23A, a face shake element synchronizes with the rotation of the optical disc 1 and arises in the focus error signal FES as the residual error in the focus servo, here, as a sine wave that has two cycles for one rotation of the optical disc 1. As shown in FIG. 23C, 17 data sectors, data sector 0 (DS0) to data sector 16 (DS16), are included in the track at the innermost periphery of the optical disc 1. The rotation frequency of the optical disc 1 is 39.78 Hz at the innermost radius. As a result, the frequency of one data sector, which includes one address area, is 676 Hz.

In the precise focus position detection in the present embodiment, the focus position information FPIS in the address areas are discarded according to the gate signal IDGATE in the address areas to obtain the focus position information FPIS only in the data areas. When the focus position information FPIS only in the data areas is obtained, focus position information FPIS is intermittently obtained. As a result, in the precise focus position detection by the focus position precise detection unit 60, it is necessary to include at least one cycle of disturbance signal, which is applied from the disturbance signal generation unit 25 to the focus control system, in the data area in one data sector. In other words, by including at least one cycle of disturbance signal in the data area in one data sector, it is possible to obtain the focus position information FPIS corresponding to the disturbance for each data sector. As a result, the frequency of the disturbance signal that is applied to the focus control system in the precise focus position detection is set at "1 kHz" in the present embodiment, considering the conditions of the rotation speed of the optical disc 1 and the number of data sectors included in one turn of track, and the condition that at least one cycle of disturbance signal is included in the data area in one data sector.

Figure 24:
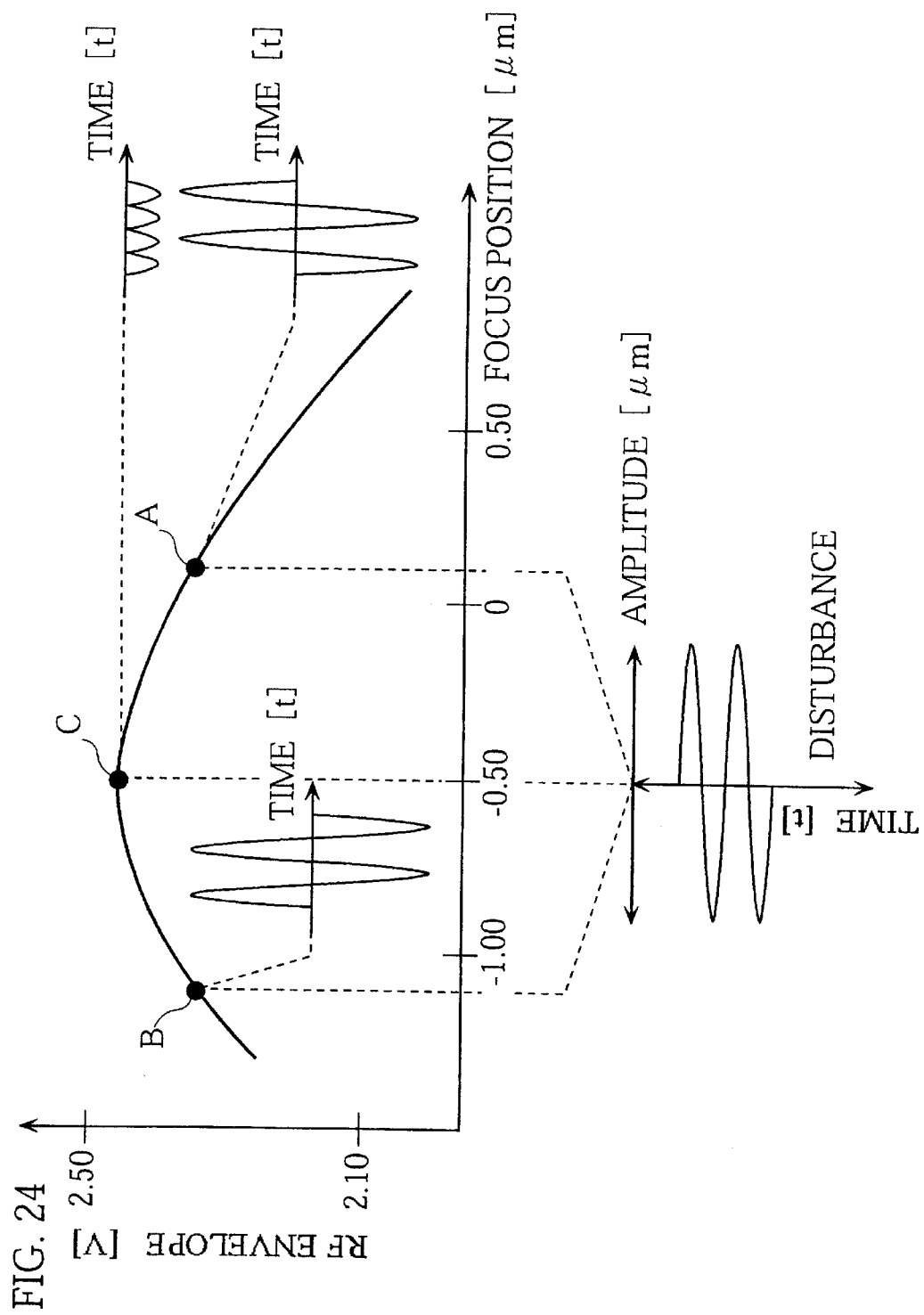
FIG. 24 shows the relationships between the focus position and the envelope of the reproduction signal RF detected by the envelope detection unit 61, and between the disturbance signal and the envelope of the reproduction signal RF at each focus position.

The fundamental of the detection of the best focus position will be explained below with reference to FIGS. 24, 25, 26, and 27. FIG. 24 shows the relationships between the focus position and the envelope of the reproduction signal RF detected by the envelope detection unit 61, and between the disturbance signal and the envelope of the reproduction signal RF at each focus position.

Suppose that the direction in which the object lens 3 approaches the optical disc 1 is set as the positive direction, and the direction in which the object lens 3 is apart from the optical disc 1 is set as the negative direction. When a focus control is being performed, the present focus position is at the position corresponding to the point "A", and the disturbance signal is applied from the disturbance signal generation unit 25 to the focus control system, the envelope of the reproduction signal RF becomes smaller as the focus position moves in the positive direction, and the envelope of the reproduction signal RF becomes larger as the focus position moves in the negative direction. When the present focus position is at the position corresponding to the point "B", and the disturbance signal is applied, the envelope of the reproduction signal RF becomes larger as the focus position moves in the positive direction, and the envelope of the reproduction signal RF becomes smaller as the focus position moves in the negative direction. When the present focus position is at the position corresponding to the point "C", i.e., the position where the envelope of the reproduction signal RF is the maximum, and the disturbance signal is applied, the envelope of the reproduction signal RF becomes smaller as the focus position moves in each of the positive and negative directions.

As has been described, when the disturbance signal from the disturbance signal generation unit 25 is applied to the focus control system, the focus servo responses to the applied disturbance signal, the focus position changes, and the envelope of the reproduction signal RF changes. As a result, if the disturbance element of the focus error signal FES and the envelope of the reproduction signal RF when the disturbance signal from the disturbance signal generation unit 25 is applied to the focus control system via the adder 24 are multiplied together, the amount and the polarity of the defocus from the focus position, i.e., the focus position information FPIS, which represents the shift of the focus position from the best focus position is obtained.

Figure 25A:
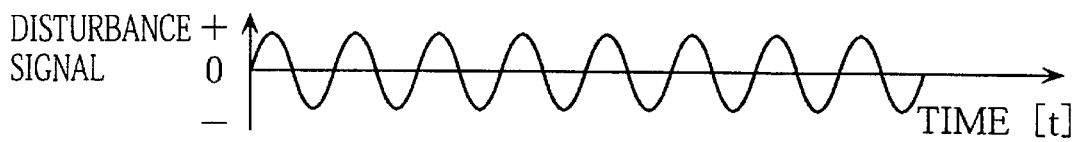
FIG. 25A shows a waveform of the disturbance signal.
Figure 25B:
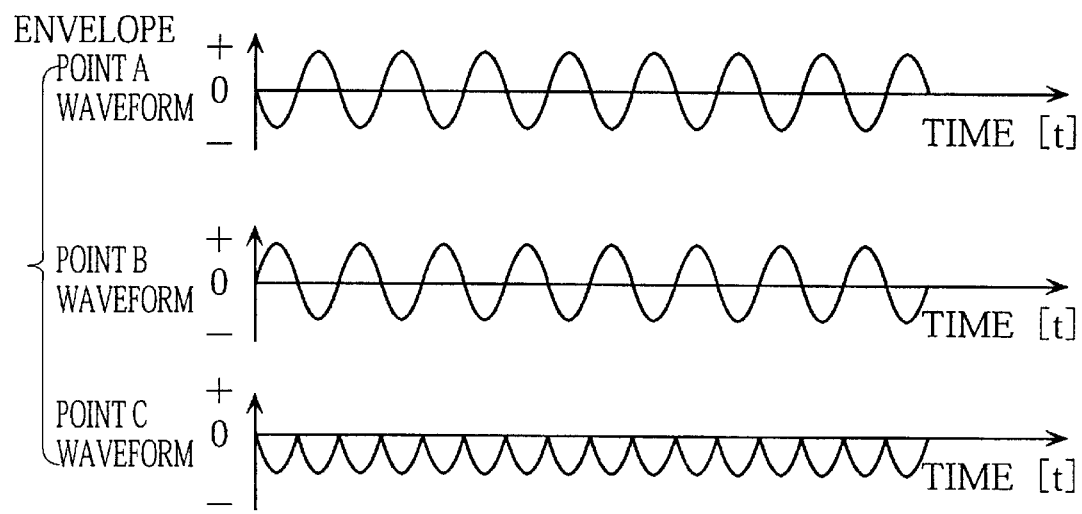
FIG. 25B shows waveforms of the envelopes of the reproduction signal RF at points "A", "B", and "C" in FIG. 24.
Figure 25C:
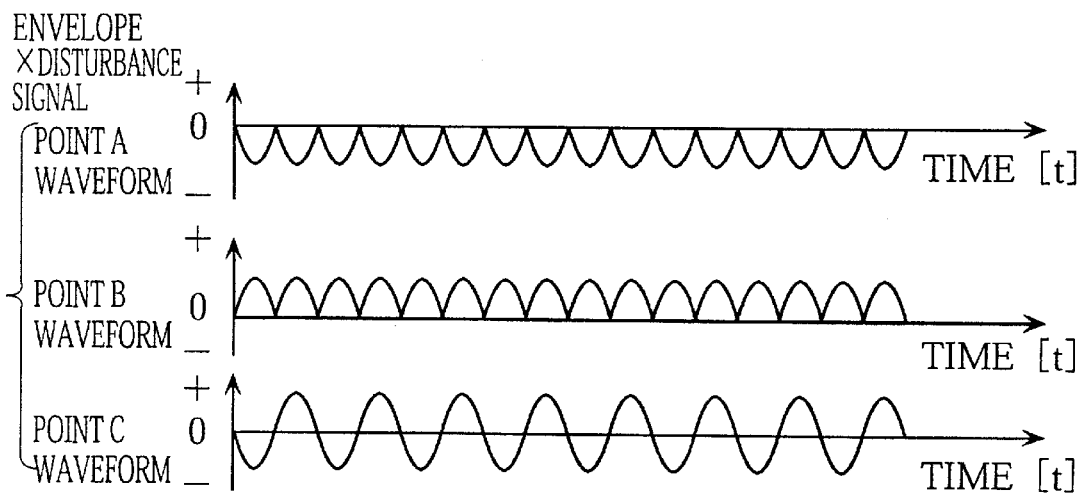
FIG. 25C shows waveforms of the results of multiplying the disturbance signal and the envelopes of the reproduction signal at the points "A", "B", and "C" in FIG. 24 together.

The fundamental of the obtainment of the shift from the best focus position from the focus error signal disturbance element and reproduction signal RF envelope will be explained with reference to FIGS. 24, and 25A to 25C. FIG. 25A shows a waveform of the disturbance signal. FIG. 25B shows waveforms of the envelopes of the reproduction signal RF at points "A", "B", and "C" in FIG. 24. FIG. 25C shows waveforms of the results of multiplying the disturbance signal and the envelopes of the reproduction signal at points "A", "B", and "C" in FIG. 24 together. For convenience of explanation, each of the disturbance signal and the signals obtained from multiplying the disturbance signal and the envelopes of the reproduction signals is supposed to be a continuous signal. When the disturbance signal in a continuous sine wave as shown in FIG. 25A is applied to the focus control system at the point "A" in FIG. 24, the envelope waveform of the reproduction signal RF is a sine wave 180° out of phase with the disturbance signal waveform as the point A waveform shown in FIG. 25B, and the waveform of the signal obtained from multiplying the reproduction signal RF envelope and the disturbance signal together is a waveform that changes in the negative side as the point A waveform shown in FIG. 25C. In other words, the focus position information FPIS that is obtained from multiplying the reproduction signal RF envelope and the disturbance signal together (called a "focus position information by envelope FPIS" hereinafter in this specification) has the waveform that always changes in the negative side in this case. When the point A waveform shown in FIG. 25C is smoothed with a lowpass filter, the shift amount from the best focus position and the polarity at the point "A" in FIG. 24 is obtained.

When the disturbance signal in a sine wave is applied to the focus control system at the point "B" in FIG. 24 in the same way, the envelope waveform of the reproduction signal RF is a sine wave that is in phase with the disturbance signal waveform as the point B waveform shown in FIG. 25B, and the waveform of the signal obtained from multiplying the reproduction signal RF envelope and the disturbance signal together is a waveform that changes in the positive side as the point B waveform shown in FIG. 25C. In other words, the focus position information by envelope FPIS has the waveform that always changes in the positive side in this case. When the point B waveform shown in FIG. 25C is smoothed with a lowpass filter, the shift amount from the best focus position and the polarity at the point "B" in FIG. 24 is obtained.

When the disturbance signal in a sine wave is applied to the focus control system at the point "C" in FIG. 24 in the same way, the envelope waveform of the reproduction signal RF is a wave that changes in the negative side as the point C waveform shown in FIG. 25B, and the waveform of the signal obtained from multiplying the reproduction signal RF envelope and the disturbance signal together is a sine wave 180° out of phase with the disturbance signal waveform as the point C waveform shown in FIG. 25C. In other words, the focus position information by envelope FPIS has the waveform corresponding to the waveform of the disturbance signal that is flipped vertically. When the point C waveform shown in FIG. 25C is smoothed with a lowpass filter, the shift amount from the best focus position and the polarity at the point "C" in FIG. 24 is obtained.

Figure 26:
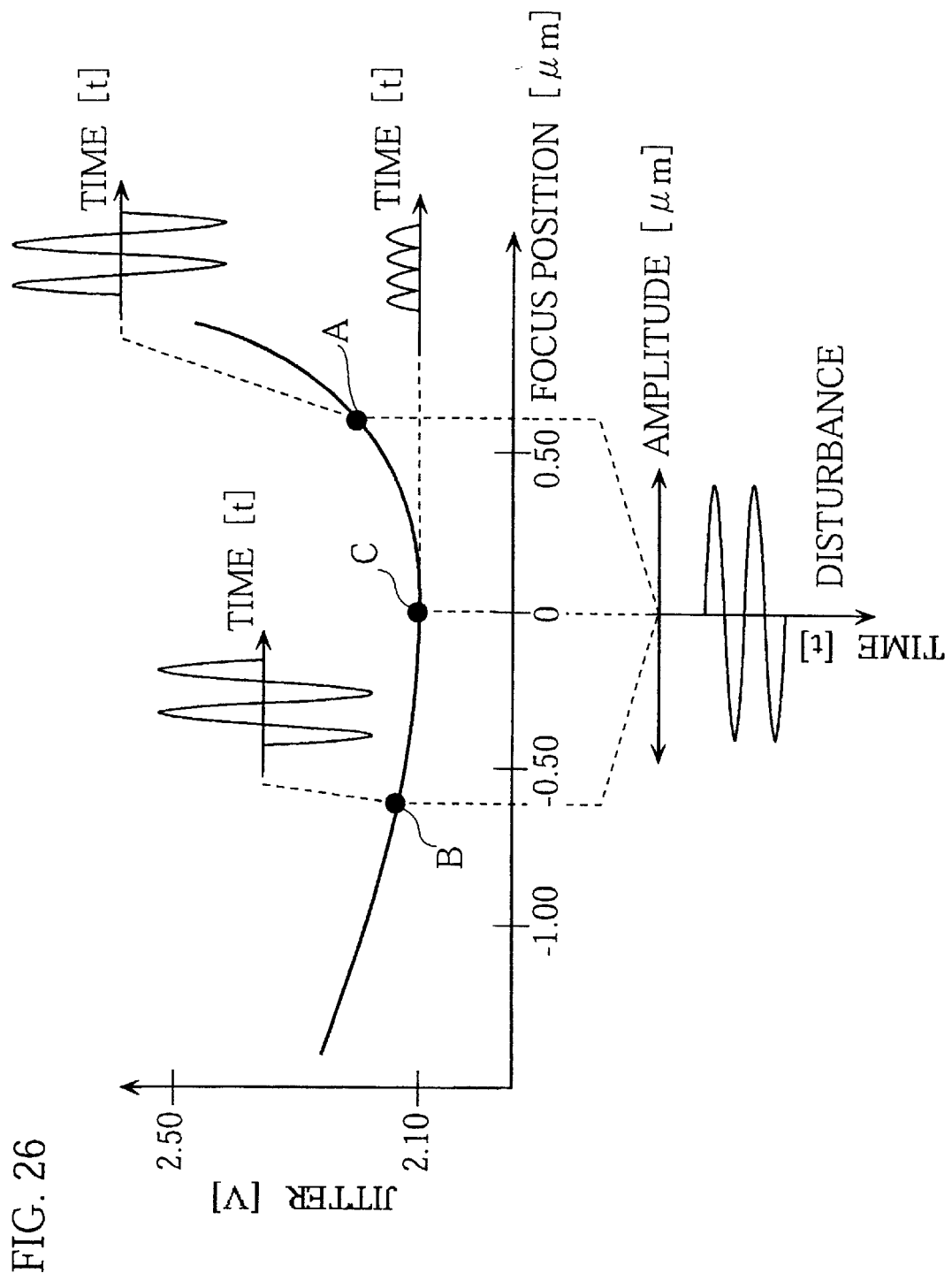
FIG. 26 shows the relationships between the focus position and the jitter in the reproduction signal RF from the jitter detection unit 62, and between the disturbance signal and the jitter in the reproduction signal RF at each focus position.

The relationship between the focus position and the jitter in the reproduction signal RF will be desired below with reference to FIG. 26. FIG. 26 shows the relationships between the focus position and the jitter in the reproduction signal RF from the jitter detection unit 62, and between the disturbance signal and the jitter in the reproduction signal RF at each focus position. Suppose that the direction in which the object lens 3 approaches the optical disc 1 is set as the positive direction, and the direction in which the object lens 3 is apart from the optical disc 1 is set as the negative direction. When a focus control is being performed, the present focus position is at the position corresponding to the point "A", and the disturbance signal is applied from the disturbance signal generation unit 25 to the focus control system, the jitter in the reproduction signal RF becomes larger as the focus position moves in the positive direction, and the jitter in the reproduction signal RF becomes smaller as the focus position moves in the negative direction. When the present focus position is at the position corresponding to the point "B", and the disturbance signal is applied, the jitter in the reproduction signal RF becomes smaller as the focus position moves in the positive direction, and the jitter in the reproduction signal RF becomes larger as the focus position moves in the negative direction. When the present focus position is at the position corresponding to the point "C", i.e., the position where the jitter in the reproduction signal RF is the minimum, and the disturbance signal is applied, the jitter in the reproduction signal RF becomes larger as the focus position moves in each of the positive and negative directions.

When the disturbance signal from the disturbance signal generation unit 25 is applied to the focus control system, the focus servo responses to the applied disturbance signal, and the focus position changes. As a result, if the disturbance element of the focus error signal FES and the jitter in the reproduction signal RF when the disturbance signal from the disturbance signal generation unit 25 is applied to the focus control system via the adder 24 are multiplied together, the amount and the polarity of the defocus from the focus position, i.e., the focus position information FPIS, which represents the shift of the focus position from the best focus position is obtained.

Here, the envelope waveform in FIG. 24 and the jitter waveform in FIG. 26 show that the envelope response characteristic of the reproduction signal from the envelope detection unit 61 is the reverse of the jitter response characteristic of the reproduction signal RF from the jitter detection unit 62. As a result, when the precise focus position detection is performs according to the focus position information FPIS depending on the reproduction signal RF from the envelope detection unit 61 and the focus position information FPIS depending on the reproduction signal RF from the jitter detection unit 62, it is necessary to adjust the polarities of the envelope and the jitter. For instance, it is necessary to adjust the polarity of the jitter to that of the envelope. In the present embodiment, the jitter signal from the second gain adjustment unit 67 is subtracted from the envelope signal from the first gain adjustment unit 66, and the polarities are adjusted in the subtracter 69 as shown in FIG. 16. The fundamental of the procedure for obtaining the shift from the best focus position from the disturbance element of the focus error signal and the jitter in the reproduction signal RF is the same as that of the detection of the shift from the best focus position according to the envelope. Here, the fundamental of the detection of the shift from the best focus position according to the jitter is not explained.

Figure 27:
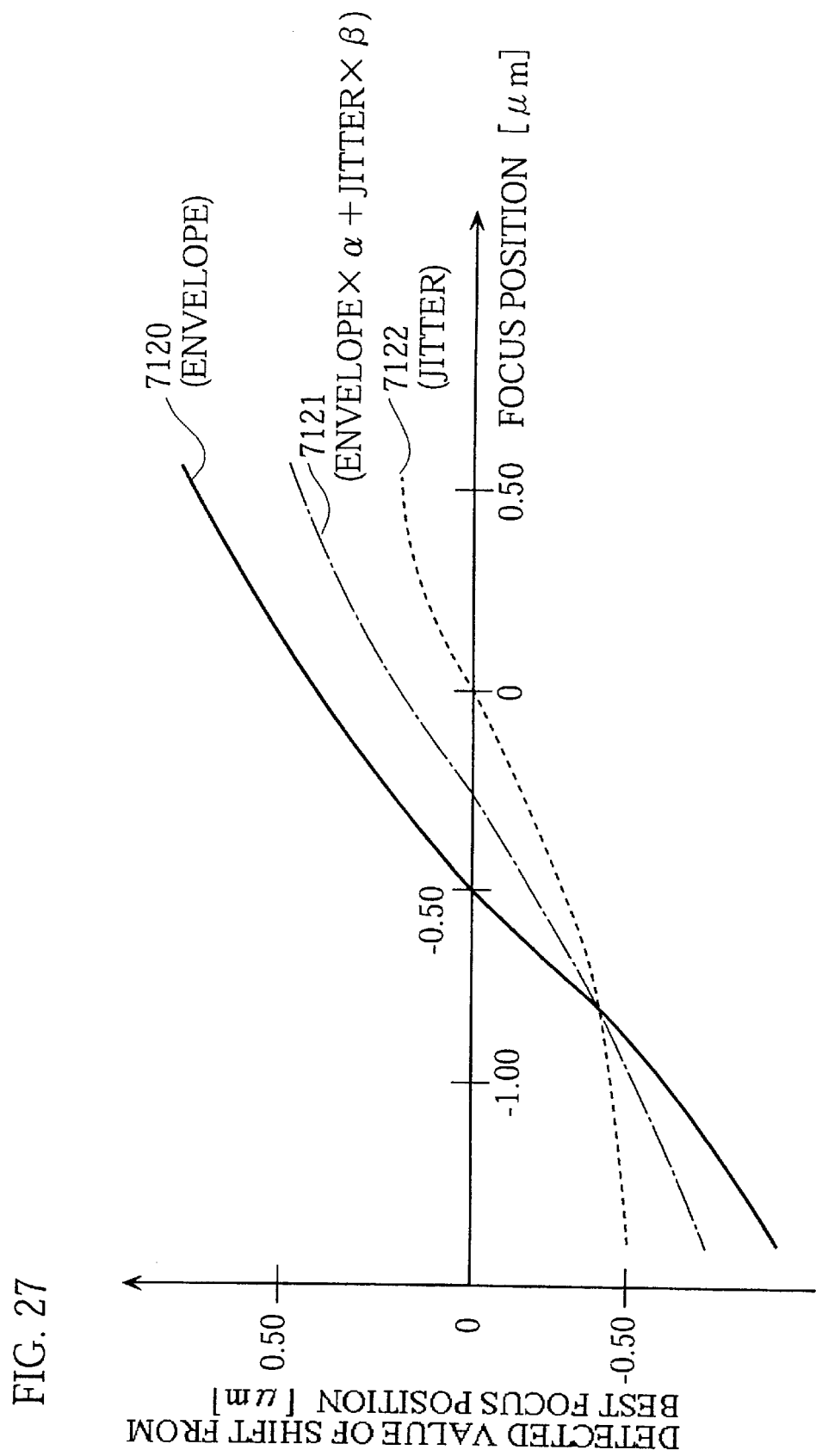
FIG. 27 shows the relationship between the focus positions and the detected value of the shift from the best focus position.

The detection characteristic of the shift from the best focus position that is obtained in the focus position precise detection unit 60 will be explained with reference to FIG. 27. FIG. 27 shows the relationship between the focus positions and the detected value of the shift from the best focus position.

Suppose that the gain of the second gain adjustment unit 67 is "0" and the first gain adjustment unit 66 is adjusted property in a focus position detection in the focus position precise detection unit 60. When the shift from the best focus position is detected only according to the envelope of the reproduction signal RF, the detected value of the shift from the best focus position is "0" at the focus position (for instance, −0.50 μm) where the envelope of the reproduction signal RF is the maximum as shown by the curve 7120 in FIG. 27. When the focus position moves in the positive direction from the focus position where the envelope is the maximum, the detected value of the shift from the best focus position increases in the positive direction, and when the focus position moves in the negative direction, the detected value increases in the negative direction.

On the other hand, when the gain of the first gain adjustment unit 66 is "0", the second gain adjustment unit 67 is adjusted properly, and the shift from the best focus position is detected only according to the jitter in the reproduction signal RF, the detected value of the shift from the best focus position is "0" at the focus position (for instance, 0 μm) where the jitter is the minimum as shown by the curve 7122 in FIG. 27. When the focus position moves in the positive direction from the focus position where the jitter is the minimum, the detected value of the shift from the best focus position increases in the positive direction, and when the focus position moves in the negative direction, the detected value increases in the negative direction.

When the gains of the first gain adjustment unit 66 and the second gain adjustment unit 67 are set as proper coefficients "α" and "β", respectively, and the detection sensitivities of the shifts from the best focus position according to the envelope and according to the jitter are adjusted to be equal, the detected value of the shift from the best focus position is "0" at the focus position (0.25 μm) that stands at the midpoint between the focus points where the envelope is the maximum and the jitter is the minimum. In this case, the detection characteristic of the shift from the best focus position stands at the midpoint between the detection characteristics of the shifts from the best focus position according to the envelope and according to the jitter. In other words, when the focus position moves in the positive direction from the midpoint between the focus positions where the envelope is the maximum and the jitter is the minimum, the detected value of the shift from the best focus position increases in the positive direction, and when the focus position moves in the negative direction, the detected value increases in the negative direction.

For this reason, the curve 7121 in which both of the envelope and the jitter in the reproduction signal RF is considered is adopted in the present embodiment. More specifically, the balance processor 71 in the focus position precise detection unit 60 calculates the shift amount corresponding to the focus position information that has been obtained by calculating the average according to the curve 7121 shown in FIG. 27, corrects the shift amount in accordance with the Expression 6, and moves the present focus positions M11, M12 by the corrected shift amount to obtain the new focus target positions M11 and M12.

The relationship between the conversion position error and the influence of an address area when the focus position precise detection unit 60 detects the best focus position will be described below. On the optical disc 1 in SS-L/GFMT in the present embodiment, an address is included between sectors. The precise focus position detection is performed when the focus control and the tracking control are being performed. As mentioned before, it is impossible to obtain a right focus error signal FES and the broadband tracking error signal RFTE in an address area. As a result, while the laser beam spot is positioned in an address area, the focus controller 26 and the tracking controller 23 hold the output signal of the time just before the laser beam, which is convergently directed at the optical disc 1, moves to the address area according to the gate signal IDGATE from the address signal detection unit 31 in both of the focus servo and the tracking servo. When the laser beam that is convergently directed at the optical disc 1 passes the address area and moves to a data area, the focus controller 26 and the tracking controller 23 free the hold of the output signal according to the gate signal IDGATE from the address signal detection unit 31, and resumes the focus servo and the tracking servo.

In a focus position detection, when the best focus position is detected using the focus position information FPIS including the envelope and the jitter in the reproduction signal RF that has been obtained in an address area, the detection result includes an error. In other words, the convergence error increases due to the influence of the address area. As a result, the disturbance signal at the frequency at which one cycle or more of disturbance is included in the data area in one data sector is applied to the focus control system, and the focus position information FPIS is detected using the data area after the address area is removed according to the gate signal IDGATE from the address signal detection unit 31 in the present embodiment. By doing so, even for the optical disc 1 including an address area that generates a detection error, best focus position detection with high precision that is influenced by no address is realized.

As has been described, the focus position precise detection unit 60 controls the best focus position so that the best focus position stands at the midpoint between the focus points where the envelope is the maximum and the jitter is the minimum. As a result, even if the focus position is changed after the adjustment of the focus position by the follow residual error to the face shake of the optical disc 1 in the focus servo, the best margin for the defocus and a relatively good reproduction characteristics may be obtained. In other words, when the focus position is adjusted to be positioned at the point at which the jitter is the minimum, the jitter margin for the defocus becomes smaller as the focus position moves in the positive direction as shown in FIG. 15. When the focus position is adjusted to be positioned at the point at which the envelope is the maximum, the envelope of the reproduction signal RF for the defocus becomes extremely small as the focus position moves in the negative direction, and the jitter becomes large. For this reason, the best focus position is adjusted to stand at the midpoint between the focus points where amplitude of the reproduction signal RF is the maximum and the jitter is the minimum, so that when the focus position at which the envelope of the reproduction signal RF is the maximum differs from the focus position at which the jitter is the minimum, relatively good reproduction characteristics may be obtained even if the focus position is changed by the residual error in the follow to the face shake of the optical disc 1 in the focus servo.

While the focus position precise detection unit 60 detects the focus position that stands at the midpoint between the focus points where amplitude of the reproduction signal RF is the maximum and the jitter is the minimum in the present embodiment, it is possible for the focus position precise detection unit 60 to detect the focus position at which the error rate of the reproduction signal RF is equal to or under a predetermined value, the focus position at which the amplitude of the reproduction signal RF is the maximum, the focus position at which the jitter in the reproduction signal RF is the minimum, or the focus position at which the error rate of the reproduction signal RF is the minimum.

A focus position is precisely detected while a still jump is being performed so that the laser beam spot follows a groove track, the laser beam spot is moved to the land track at the outer radius of the optical disc 1, and a focus position is precisely detected while a still jump is being performed in the precise focus position detection in the present embodiment. The procedure of the precise focus position detection is not limited to such a procedure. It is possible to reverse the order of the procedure as the rough focus position detection.

In other words, it is possible to adopt the transformed examples of the rough focus position detection (eight detection methods shown in FIG. 13) for the change of the focus control target position (focus balance value and the focus offset value) in the precise focus position detection in the present embodiment.

(Optional Functions in Precise Focus Position Detection)

Two optional functions in the precise focus position detection will be explained below. First of all, attention is paid to a specific data area on the optical disc 1, and the first optional function in the precise focus position detection, i.e., the function of the read gate detection unit 32 will be explained.

The read gate detection unit 32 outputs the gate signal RDGT that is "Hi" in the address areas on the optical disc 1 and the data sectors that have been designated by the drive controller 14 (read data sectors) to the focus position precise detection unit 60 as described before. In the present embodiment, the drive controller 14 fetches the focus error signal FES in advance, performs an A/D conversion on the fetched focus error signal FES, and detects the face shakes (alternating signals) that arise in the rotation of the optical disc. The drive controller 14 designates the data sectors as the read data sectors so that the gate signal RDGT is "Hi" in the data areas corresponding to the positions where the change of the alternating current signal is small.

The focus position precise detection unit 60 obtains the focus position information FPIS for the data areas that have been designated according to the gate signal RDGT, and performs the precise focus position detection. He meaning of the first optional function will be described below.

When performing the precise focus position detection, the focus controller 26 drives the actuator 2 via the adder 24 and the focus drive 21 according to the signal from the focus error detection unit 36, and controls the laser beam directed at the optical disc 1 so that the laser beam would be in a predetermined converged condition. When the degree of the face shake of the optical disc 1 increases, however, the control residual error of the face shake element of the optical disc 1 arises in the focus error signal FES. As a result, when the degree of the face shake of the optical disc 1 is large, it is necessary to continuously detect the focus position information FPIS and to balance the effect of the face shake to prevent the number of the errors in the focus position detection from increasing. On the optical disc 1 in SS-L/GFMT, however, the data areas are not continuously included. As a result, the focus position information FPIS is intermittently detected, and the precise focus position detection is influenced by the face shake element. For this reason, the focus position information FPIS is detected when the influence of the face shake of the optical disc 1 is reduced to further improve the accuracy of the focus position detection in the first optional function.

Figure 28:
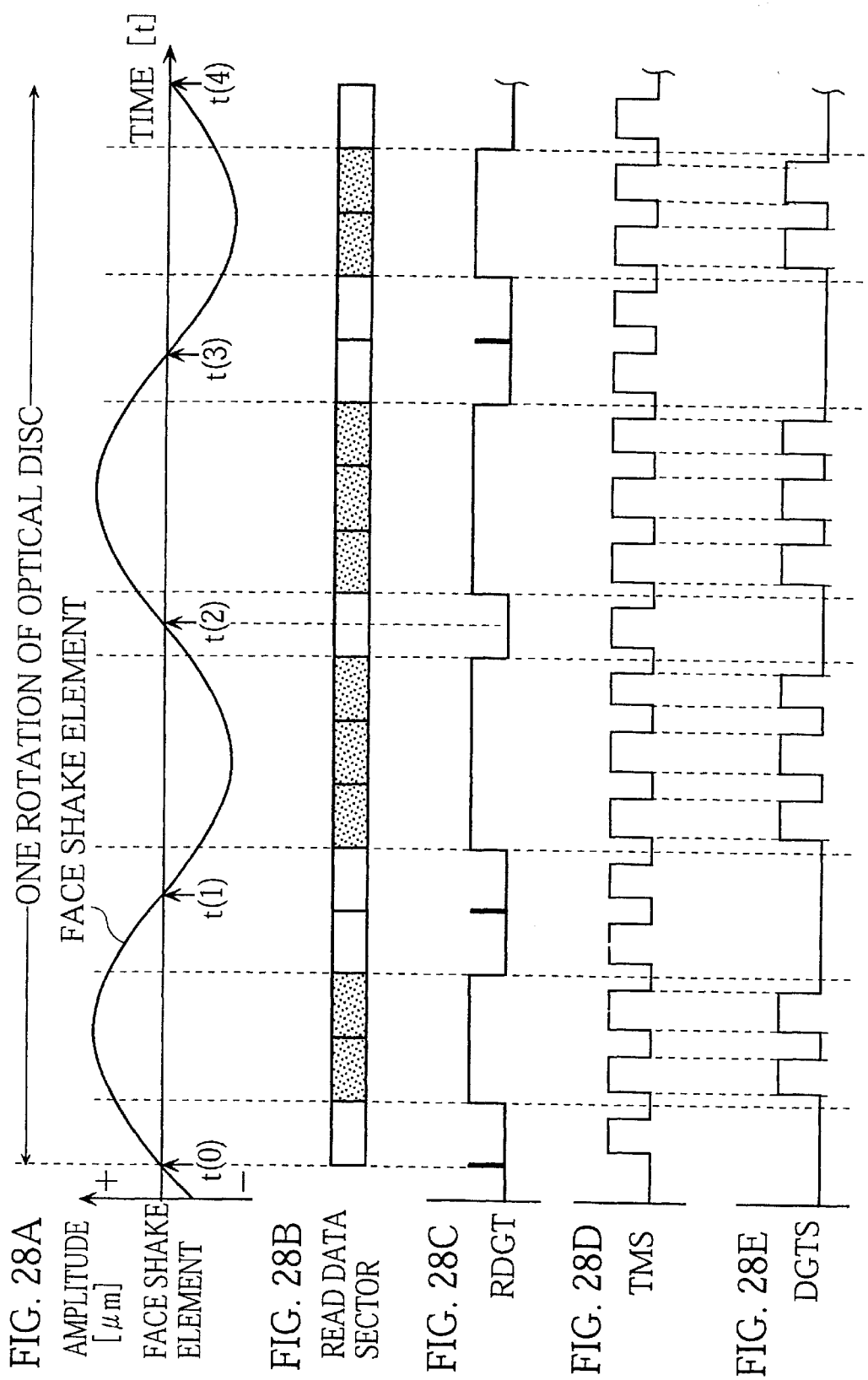
FIG. 28A shows a waveform of the face shake element of the optical disc 1.
FIG. 28B shows the read data sectors set in the read gate detection unit 32.
FIG. 28C shows the gate signal RDGT output from the read gate detection unit 32.
FIG. 28D shows the timer signal TMS output from a timer 7101 in the balance processor 71.
FIG. 28E shows the data obtainment timing signal DGTS output from an AND circuit 7109.

FIGS. 28A to 28E are timing charts for explaining the function of the read gate detection unit 32. FIG. 28A shows a waveform of the face shake element of the optical disc 1, FIG. 28B shows the read data sectors set in the read gate detection unit 32 with hatching blocks, FIG. 28C shows the gate signal RDGT output from the read gate detection unit 32, FIG. 28D shows the timer signal TMS output from the timer 7101 in the balance processor 71, and FIG. 28E shows the data obtainment timing signal DGTS output from the AND circuit 7109. For convenience in explanation, one cycle of alternating current signal is applied for the data area in one data sector in synchronization with the disturbance signal from the disturbance signal generation unit 25.

In the detection of the focus position information FPIS, the precise focus position detection is influenced by the face shake element of the optical disc 1 most at the times t(0), t(1), t(2), t(3), and t(4), each of which is near the time at which the change of the control residual error of the face shake element is the largest. The read gate detection unit 32 designates the data sectors apart from the data sector that is positioned at the timing at which the change amount of the face shake element is small, i.e., the polarity of the face shake element is reversed as shown in FIG. 28B. In such designation, the read gate detection unit 32 outputs the gate signal RDGT as shown in FIG. 28C, i.e., the signal that is "Hi" only in the address areas and the read data sectors according to the drive controller 14.

The gate signal RDGT is input into the balance processor 71 in the focus position precise detection unit 60, more specifically, the AND circuit 7109 shown in FIG. 17. Into the other input terminal of the AND circuit 7109, the timer signal TMS from the timer 7101 is input. The timer signal TMS starts measuring after a predetermined wait time (200 µs) has elapsed since the rising edge of the gate signal IDGATE from the address signal detection unit 31, measures the time corresponding to one cycle of the disturbance (here, the time corresponding to one data sector), and outputs a timer signal TMS that represents the period of time required by the measurement as shown in FIG. 18. The timer signal TMS is shown in FIG. 28D.

In the AND circuit 7109, the AND between the gate signal RDGT and the timer signal TMS is carried out, and the result is output to the first balance circuit 7102 and the third balance circuit 7104 as the data obtainment timing signal DGTS. The data obtainment timing signal DGTS is a pulse string that is "Hi" during one cycle of disturbance signal only for the data areas in which the change of the face shake is small as shown in FIG. 28E. The first balance circuit 7102 and the third balance circuit 7104 calculates the average of the focus position information FPIS from the multiplier 70 while the data obtainment timing signal DGTS is "Hi". By doing so, focus position information FPIS is obtained and the average is calculated in the areas that is not the address areas and are designated as read data sectors, i.e., in the stable data areas except for the data areas in which the change of the face shake element is large and the address areas, in which the focus position information FPIS include errors, and the focus position information FPIS is used for the precise focus position detection.

As has been described, the precise focus position detection with high accuracy that prevents the control disturbance by the face shake element is realized by the first optional function.

The second optional function in which the precise focus position is performed according to the focus error signal FESS that has been obtained by removing the face shake element from the focus error signal FES, i.e., the function of the face shake element removal unit 35 will be explained below.

As mentioned above, the face shake element removal unit 35 is a filter that removes the face shake element of the optical disc 1 included in the focus error signal FES from the focus error detection unit 36 and passes the other frequency elements (for instance, signals of 1 kHz applied from the disturbance signal generation unit 25), and outputs the passed signals to the switch unit 39.

Figure 29:
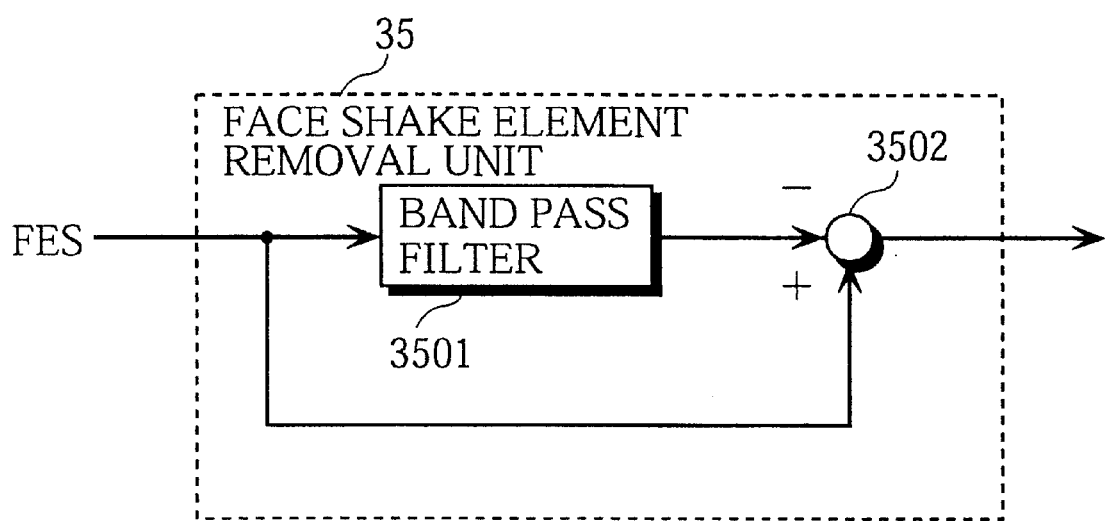
FIG. 29 is a block diagram showing the in-detail structure of the face shake element removal unit 35.

FIGS. 29 is a block diagram showing the in-detail structure of the face shake element removal unit 35. The face shake element removal unit 35 includes a band pass filter 3501 passing only the frequency band of the face shake element that has been known and a subtracter 3502. The focus error signal FES is input into the positive terminal of the subtracter 3502, and the face shake element signal that passes the band pass filter 3501 is input into the negative terminal. As a result, the output signal from the subtracter 3502 is the focus error signal FES from which the face shake element is removed.

Here, when the second optional function is activated, the switch unit 39 switches so that the signal from the face shake element removal unit 35 would be input into the focus position precise detection unit 60 in accordance with the instruction from the drive controller 14. As a result, the focus position precise detection unit 60 performs the precise focus position detection according to the signal output from the face shake element removal unit 35.

By doing so, the detection errors that are caused by the unnecessary disturbance such as the face shake of the optical disc 1 arise less frequently in the focus position information FPIS. More specifically, in the focus position precise detection unit 60, the focus position information is obtained from the focus error signal FESS that is the focus error signal FES from which the face shake element of the optical disc 1 is removed by the face shake element removal unit 35 and the envelope of the reproduction signal RF, or from the focus error signal FESS and the jitter in the reproduction signal RF, and the precise focus position detection is performed according to the focus position information FPIS. As a result, the precise focus position detection with high accuracy is realized in the focus position precise detection unit 60.

While the face shake element removal unit 35 is a filter that removes the face shake element of the rotating optical disc 1 in the present embodiment, the face shake element removal unit 35 may remove the unnecessary signal element of low frequency such as a power frequency.

(Re-Detection of Focus Position)

The timing when the optical disc drive apparatus 100 starts the focus position detection (the rough focus position detection and the precise focus position detection) again in recording and reproduction will be described below. In the optical disc drive apparatus 100, the rough focus position detection and the following precise focus position detection are generally performed when the rotation speed of the optical disc 1 has reached a predetermined speed. The start of the focus position detection is not limited to such a condition, however. When detecting that the conditions described below are met, the drive controller 14 has the focus position rough detection unit 50 and the focus position precise detection unit 60 start the focus position detection (the rough and precise focus position detections) in accordance with the built-in control program in recording and reproduction. The conditions to be met and the operations in the focus position detection will be described below.

Firstly, the conditions for staring the re-detection of the focus position in recording will be described.

When recording information on the optical disc 1, the drive controller 14 controls the laser power drive 41 and the like so that the laser poser would be modulated according to the signal pattern that is to be recorded and information would be recorded on the optical disc 1. After recording of the information, the drive controller 14 performs a verify operation for verifying that the recording has been performed in a desired manner. In a verify operation, information that has been recorded on the optical disc 1 is reproduced just after the recording and whether the information has been properly recorded. When judging that the desired recording characteristic (for instance, the bit error rate BER) is not obtained, the drive controller 14 increases the recording power and records the information and performs the verify operation again. The drive controller 14 controls the laser power drive 41 and the like so that the recording power would be increased until the desired recording characteristic is obtained. The recording power, however, has the ceiling. After the recording power reaches the ceiling, no matter how increasing the recording power, it is impossible to improve the reproduction characteristic. The ceiling of the recording power may not be completely erased when the recording power increases too much. In other words, the ceiling of the recording power depends on the power margin in recording and erasing and the function of the semiconductor laser 8.

For this reason, the ceiling of the recording power is set in the laser power drive 41. Even if the recording power is increased and the desired recording characteristic is not obtained, however, the recording power is not always responsible for the result. As a result, the situation in which the recording power reaches the ceiling is set as the condition for starting the focus position detection again. By doing so, even when the recording power is increased and the bit error rate BER is not improved, it is possible to obtain the recording characteristic in which the bit error rate BER is equal to or smaller than a predetermined value by the re-detection of the focus position.

Figure 30:
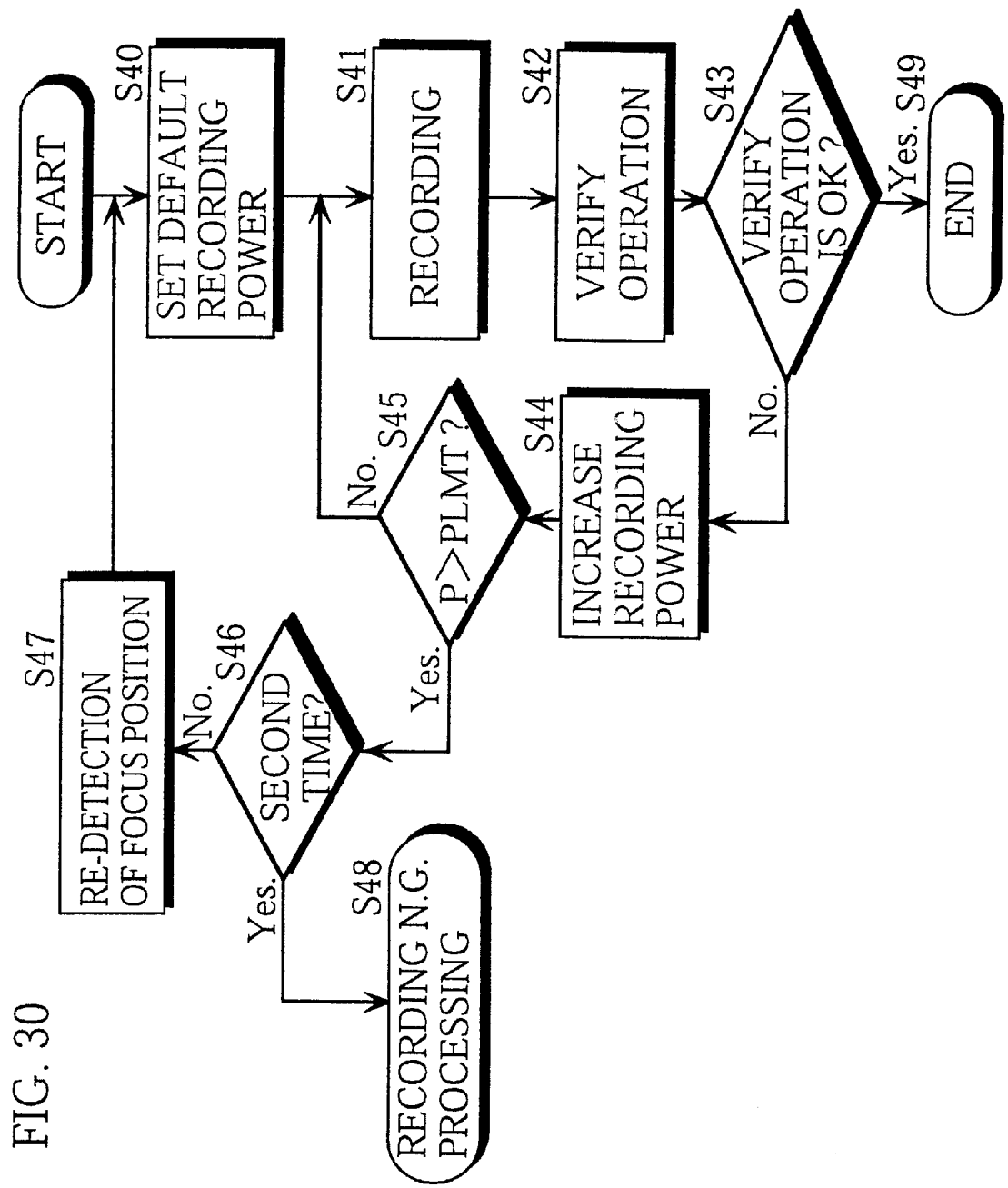
FIG. 30 is a flowchart showing the specific procedure of the re-detection of the focus position in recording.

FIG. 30 is a flowchart showing the specific procedure of the re-detection of the focus position in recording. When recording information on the optical disc 1, the drive controller 14 transfers the power set point and the recording signal pattern for recording to the modulator 42 (Step S40).

The modulator 42 receives the recording power set point and the recording signal pattern from the drive controller 14, and transfers the signal for modulating the laser power to the laser power drive 41. The laser power drive 41 modulates the laser power according to the modulator 42, and records information on the optical disc 1 (Step S41). Here, the recording power that has been obtained at the time of the assembly of the optical disc drive apparatus 100 (called a "process value of the recording power" hereinafter in this specification) is used as the set point of the ordinary recording power. The range of the recording power is 11 mW to 14 mW, and the ordinary recording power is about 12 mW. As a result, when information is recorded on the optical disc 1, the drive controller 14 sets the process value of the recording power and records the information on the optical disc 1.

After recording the information, the drive controller 14 performs the verify operation for verifying that the information has been properly recorded (Step S42). The drive controller 14 judges whether the verify operation is normally completed (Step S43). When it is not the case, the drive controller 14 increases the recording power by a predetermined unit (for instance, by 0.5 mW), and records the information again (Step S44). Here, before recording, the drive controller compares the ceiling of the recording power with the renewed recording power (Step S45). When the renewed recording power is smaller than the ceiling of the recording power, the drive controller 14 records (Step S41), and performs the verity operation (Step S42).

When the verify operation is not normally completed (Step S43), the operations at Steps S44, S45, and S41 to S43 are repeated. When recording (Step S41), verifying (Step S42), and the increase of the recording power (Steps S44 and S45) are repeated, and when the recording power is larger than the ceiling (Step S45), the drive controller 14 instructs the focus position rough detection unit 50 and the focus position precise detection unit 60 to start the re-detection of the focus position (Steps S46 and S47). When the re-detection of the focus position is completed, the drive controller 14 sets the process value of the recording power again (Step S40), and performs recording and the verify operation (Steps S41 and S42). When the verify operation is completed normally (Step S43), the drive controller 14 normally completes the recording (step S49). On the other hand, when the verify operation is not normally completed (Step S43), the drive controller 14 increases the recording power (Steps S44 and S45), records information (Step S41), and performs the verify operation (Step S42).

When the recording power exceeds the ceiling (Step S45), and when the recording power consecutively exceeds the ceiling (Step S46), the drive controller 14 performs the operation of the situation in which the recording is not normally completed (Step S48). In other words, the drive controller 14 activates the optical disc drive apparatus 100 again.

The drive controller 14 stores the address of the test area that has been used in the focus position detection at the time of the activation of the optical disc drive apparatus 100, refers to the stores address in the re-detection of the focus position, and detects the focus position again using the track that is the same as the test track used in the activation.

Then, the conditions for staring the re-detection of the focus position in reproduction will be described below.

The information that has been recorded on the optical disc 1 can not be reproduced because the bit error rate BER increases while the information is being reproduced. This problem arises when the focus position shifts due to the temperature characteristic of the optical head 7 even though the focus position is once detected. When the bit error rate BER increases, the optical disc drive apparatus 100 retries the reproduction of the information to reproduce the desired recorded information. The retry of the reproduction is repeated within a predetermined number of times until the recorded information is properly reproduced. When the bit error rate BER significantly increases, the recorded information can not be properly reproduced even though the retry of the reproduction is repeated the predetermined number of times.

For this reason, the situation in which the retry of the reproduction is repeated the predetermined number of consecutive time is set as another condition for starting the re-detection of the focus position in reproduction. As a result, even though not properly reproduced after the predetermined number of reproduction retry, the recorded information may be reproduced within the predetermined number of reproduction retry in the next reproduction by the re-detection of the focus position.

Figure 31:
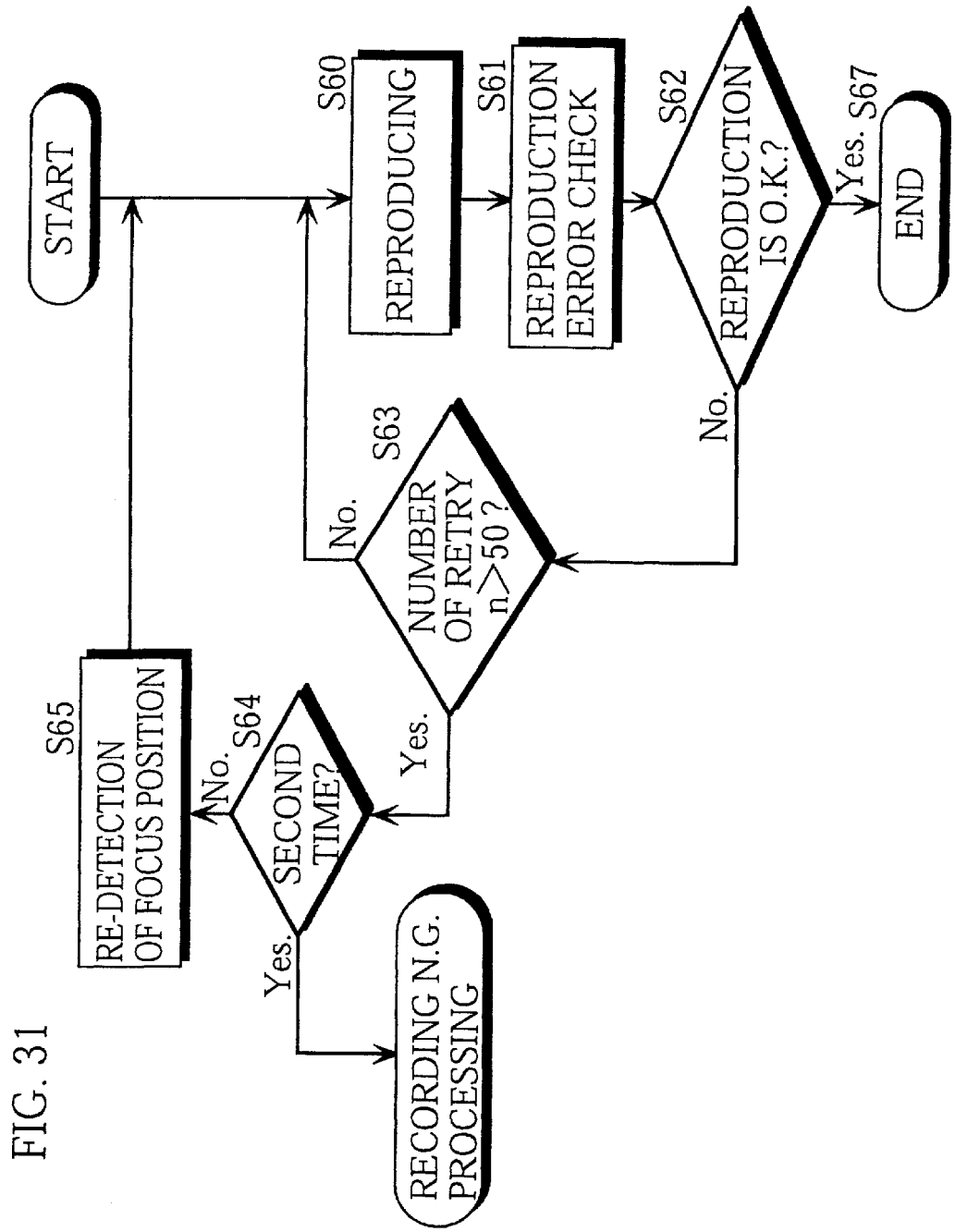
FIG. 31 is a flowchart showing the specific procedure of the re-detection of the focus position in reproduction.

FIG. 31 is a flowchart showing the specific procedure of the re-detection of the focus position in reproduction. When reproducing the signal from the optical disc 1, the drive controller 14 receives the RF pulse signal PRF from the demodulator 47 (Step S60), and checks reproduction errors for each 16 sectors (Step S61). When the reproduction error check is normally completed (Step S62), the reproduction retry is repeated (Steps S63 and S60). When the reproduction retry is repeated more than 50 times (Step S63), the drive controller 14 instructs the focus position rough detection unit 50 and the focus position precise detection unit 60 to start the re-detection of the focus position (Steps S64 and S65).

After the re-detection of the focus position, the drive controller 14 performs the reproducing that has been already described (Steps S60 and S61). When the reproduction error check is normally completed (Step S62), the reproduction is normally completed (Step S67). On the other hand, when the reproduction error check is not normally completed (Step S62), the reproduction retry is repeated (Steps S63, and S60 to S62).

When the reproduction retry is repeated more than 50 times (Step S63), and when the reproduction retry is consecutively repeated more than 50 times (Step S64), the drive controller 14 performs the operation of the situation in which the reproduction is not normally completed (Step S66). In other words, the drive controller 14 activates the optical disc drive apparatus 100 again.

The drive controller 14 stores the address of the test area that has been used in the focus position detection at the time of the activation of the optical disc drive apparatus 100, moves the optical head 7 to the address of the test area that has been used at the time of the activation, and detects the focus position again.

The re-detection of the focus position that has been described enables the optical disc drive apparatus 100 to record and reproduce information again even when the focus position shifts from the best focus position in the operation and recording and reproduction is not normally performed in spite of the focus position detection at the time of the activation of the optical disc drive apparatus 100.

While the optical disc drive apparatus 100 has been described according to the embodiment, the present invention is not limited to the embodiment.

In the present embodiment, the optical disc drive apparatus 100 detects the focus position using two modes (the rough and precise focus position detection), and uses two optional functions (the read gate detection unit 32 and the face shake element removal unit 35) in the precise focus position detection. The optical disc drive apparatus 100 of the present invention may not use the two modes and the two optional functions.

Figure 32:
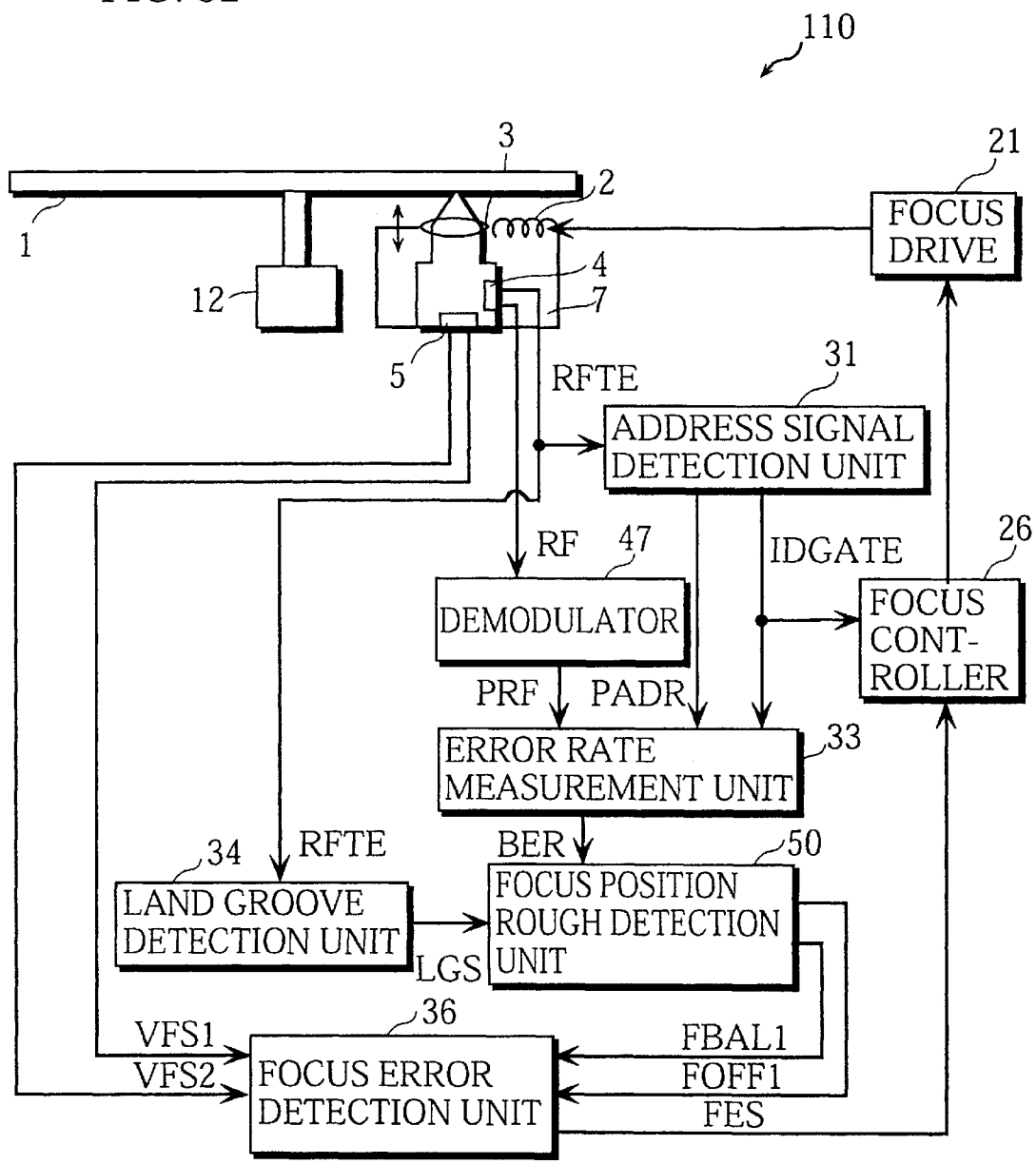
FIG. 32 is a block diagram showing the components that are related to the focus position detection in an optical disc drive apparatus 110, which performs only the rough focus position detection.

For instance, the optical disc drive apparatus 100 may be a simpler optical disc drive apparatus that has no function of precise focus position detection, i.e., an optical disc drive apparatus that performs only the rough focus position detection. FIG. 32 is a block diagram showing the components that are related to the focus position detection in an optical disc drive apparatus 110, which performs only the rough focus position detection. As shown in FIG. 32, the optical disc drive apparatus 110 includes the focus position rough detection unit 50 and the like for the rough focus position detection, but not includes no focus position precise detection unit 60 and the like for the precise focus position detection.

Figure 33:
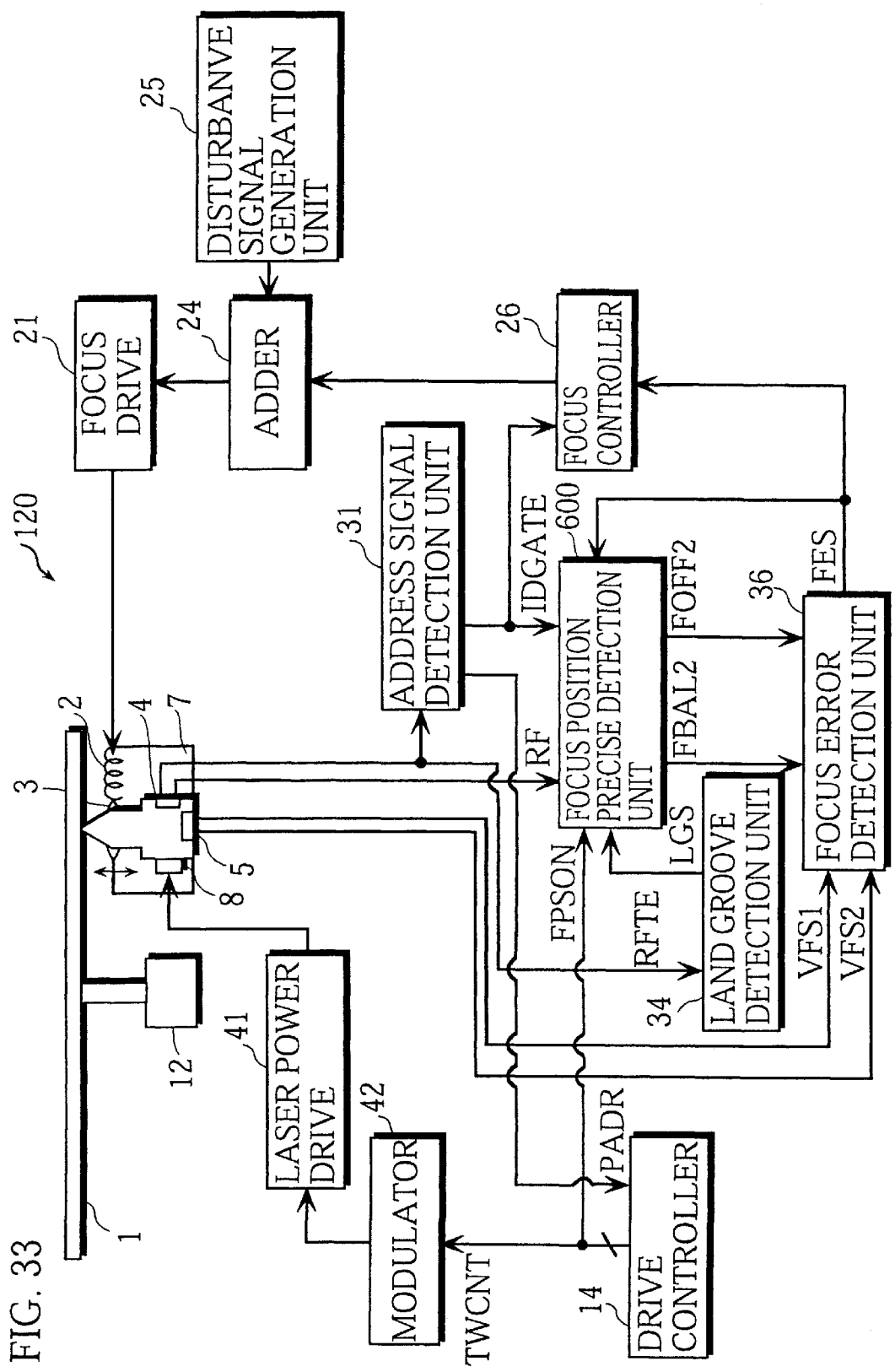
FIG. 33 is a block diagram showing the components that are related to the focus position detection in an optical disc drive apparatus 120, which performs only the precise focus position detection.
Figure 34:
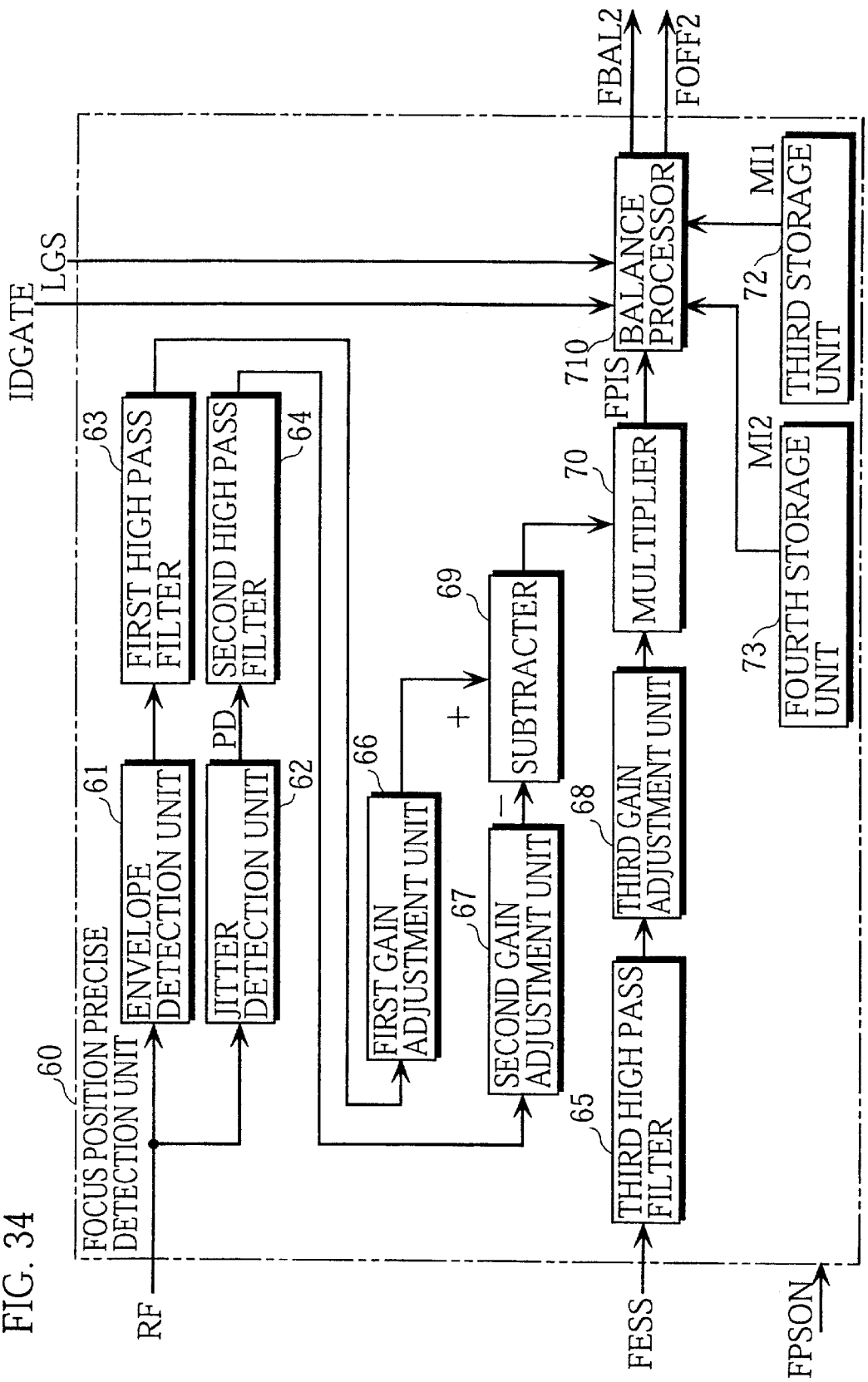
FIG. 34 is a block diagram showing the in-detail structure of a focus position precise detection unit 600 in the optical disc drive apparatus 120 in FIG. 33.
Figure 35:
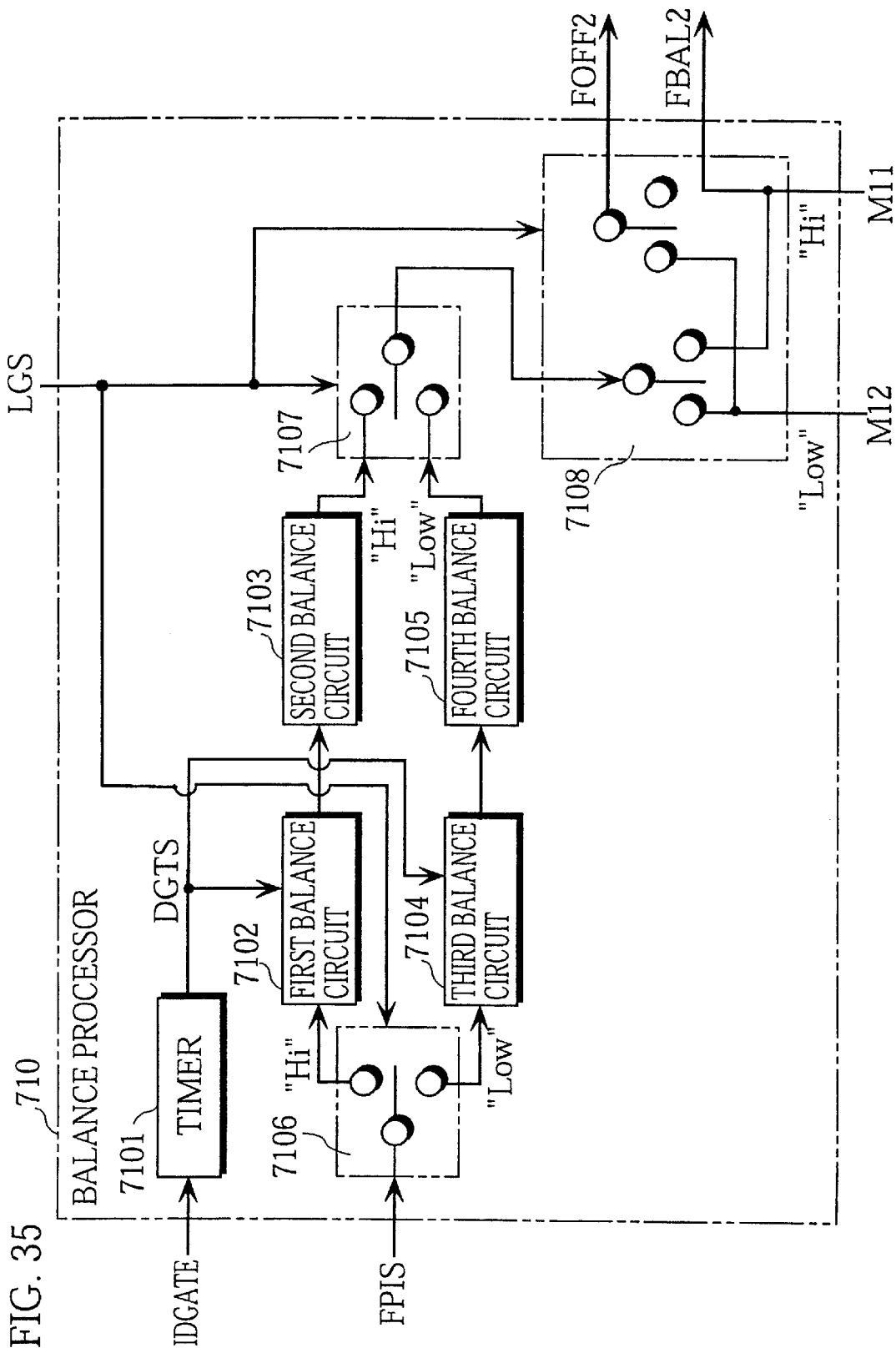
FIG. 35 is a block diagram showing the in-detail structure of the balance processor 710 in FIG. 34.

The optical disc drive apparatus 100 may also be a simpler optical disc drive apparatus that has no function of rough focus position detection, i.e., an optical disc drive apparatus that performs only the precise focus position detection. FIG. 33 is a block diagram showing the components that are related to the focus position detection in an optical disc drive apparatus 120, which performs only the precise focus position detection. As shown in FIG. 33, the optical disc drive apparatus 120 includes the disturbance signal generation unit 25, a focus position precise detection unit 600, and the like for the precise focus position detection. The optical disc drive apparatus 120 includes no focus position rough detection unit 50 and the like for the rough focus position detection, and no read gate detection unit 32 and no face shake element removal unit 35 that are related to the optional functions. FIG. 34 is a block diagram showing the in-detail structure of the focus position precise detection unit 600 in the optical disc drive apparatus 120 in FIG. 33. Compared with the focus position precise detection unit 60 in FIG. 16, the focus position precise detection unit 600 includes a balance processor 710 into which no gate signal RDGT is input. FIG. 35 is a block diagram showing the in-detail structure of the balance processor 710 in FIG. 34. Compared with the balance processor 71 in FIG. 17, the balance processor 710 includes no component that is related to the gate signal RDGT (the AND circuit 7109 in FIG. 17).

Figure 36:
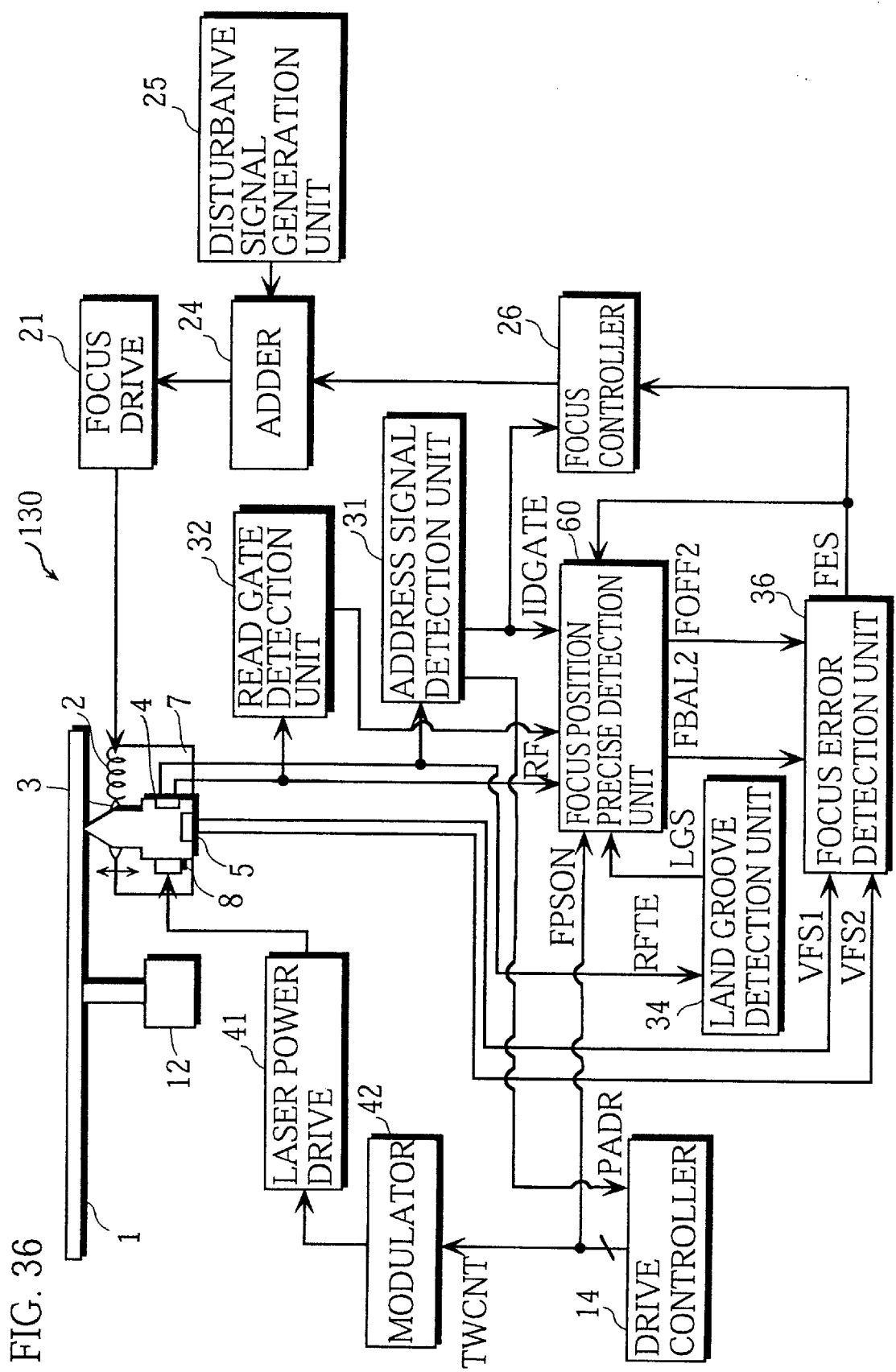
FIG. 36 is a block diagram of the components that are related to the focus position detection in an optical disc drive apparatus 130, which has a first optional function (the read gate detection unit 32)

The optical disc drive apparatus 100 may also be an optical disc drive apparatus that includes the first optional function (the read gate detection unit 32) and performs only the precise focus position detection. FIG. 36 is a block diagram of the components that are related to the focus position detection in an optical disc drive apparatus 130, which includes the first optional function (the read gate detection unit 32) and performs only the precise focus position detection. As shown in FIG. 36, the optical disc drive apparatus 130 includes the disturbance signal generation unit 25, the focus position precise detection unit 60 and the like for the precise focus position detection, and the read gate detection unit 32, but includes no focus position rough detection unit 50 and the like for the rough focus position detection and no face shake element removal unit 35 that is related to the second optional function.

Figure 37:
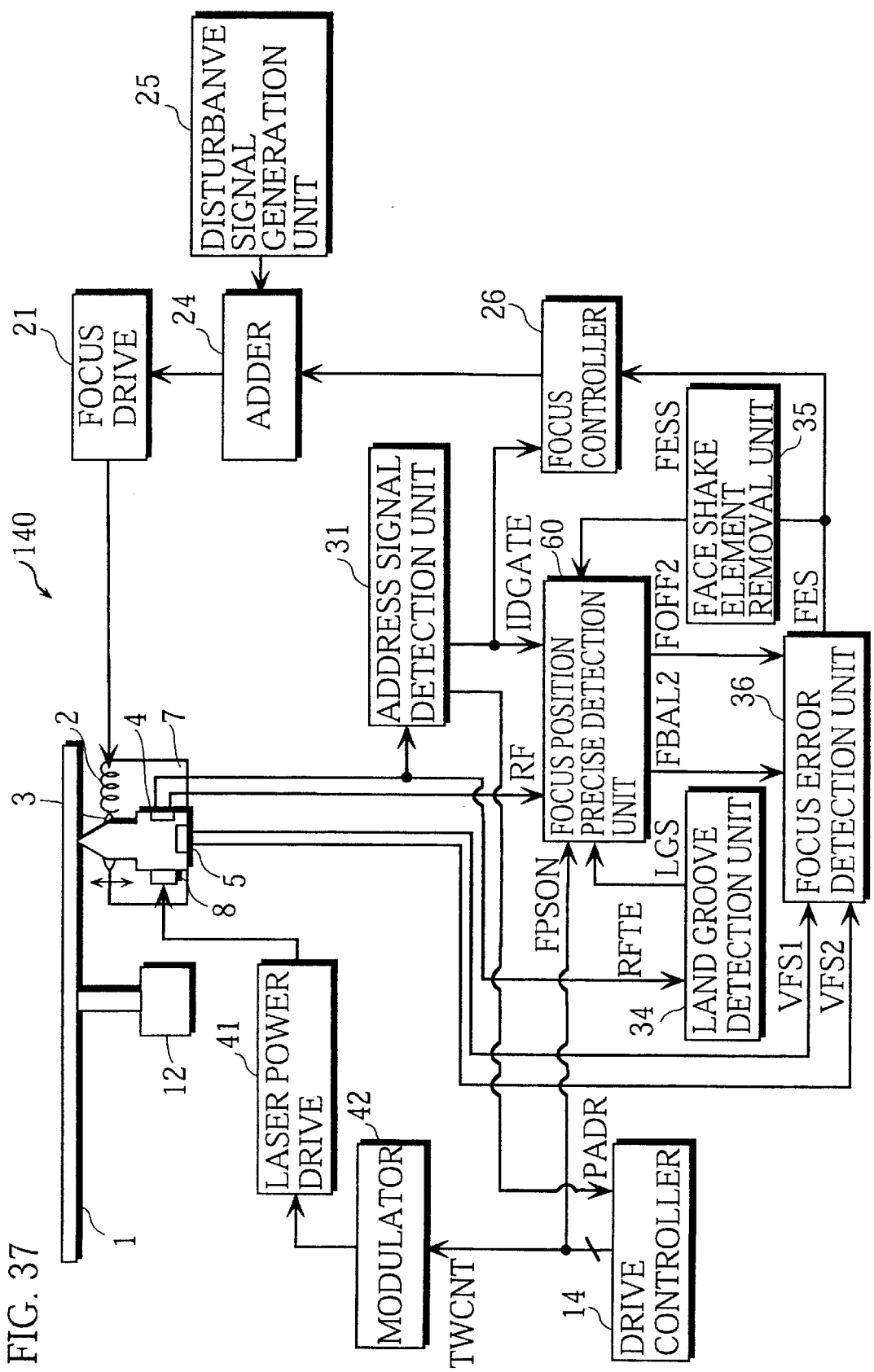
FIG. 37 is a block diagram of the components that are related to the focus position detection in an optical disc drive apparatus 140, which has a second optional function (the face shake element removal unit 35).

The optical disc drive apparatus 100 may also be an optical disc drive apparatus that includes the second optional function (the face shake element removal unit 35) and performs only the precise focus position detection. FIG. 37 is a block diagram of the components that are related to the focus position detection in an optical disc drive apparatus 140, which includes the second optional function (the face shake element removal unit 35) and performs only the precise focus position detection. As shown in FIG. 37, the optical disc drive apparatus 140 includes the disturbance signal generation unit 25, the focus position precise detection unit 60 and the like for the precise focus position detection, and the face shake element removal unit 35, but includes no focus position rough detection unit 50 and the like for the rough focus position detection and no read gate detection unit 32 that is related to the first optional function.

In the present embodiment, the rough and precise focus position detections are performed for a groove track (or a land track) under the condition in which the focus and tracking controls are performed, a still jump is performed for each rotation of the optical disc 1, and the laser beam spot always follows the groove track (or a land track). The present invention is not limited to the manner in which the still jump is performed. For instance, it is possible for the focus position rough detection unit 50 (or the focus position precise detection unit 60) to switch a land track and a groove track for each rotation of the optical disc 1 according to the L/G switch signal LGS, to consecutively measure the bit error rate BER (or the focus position information FPIS) on each of the groove track and the land track, and to consecutively renew the focus control target position (the focus balance value and the focus offset value) for each of the groove track and the land track without a still jump under the condition in which the laser beam spot consecutively follows a groove track or a land track in a spiral on the optical disc 1. As a result, it is possible to consecutively repeat the rough (or precise) focus position detection without a complicated tracking control such as a still jump.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track, wherein the focus position renewal unit judges whether the reproduction condition improves when the focus position is moved by a predetermined amount, and determines the first and second renewed focus position according to the judgment by the focus position renewal unit; and a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects an error rate in the reproduction signal as the reproduction condition, and when the track identification signal represents the first shape track, the focus position renewal unit determines the first renewed focus position so that the error rate is lower, and when the track identification signal represents the second shape track, the focus position renewal unit determines the second renewed focus position so that the error rate is lower.

2. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
  a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track, wherein the focus position renewal unit judges whether the reproduction condition improves when the focus position is moved by a predetermined amount, and determines the first and second renewed focus position according to the judgment by the focus position renewal unit; and
  a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the focus error detection unit includes:
    a balance adjustment unit for obtaining two focus signals, for weighting the obtained two focus signals by assigning weights to the two focus signals, and for calculating a difference between the weighted two focus signals; and
    an offset adjustment unit for adding an offset to the difference, and for outputting a sum of the offset and the difference as the focus error signal, and
    wherein the focus error signal modification unit modifies the focus error signal by changing at least one of a ratio between the weights and the offset.

3. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
  a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track, wherein the focus position renewal unit judges whether the reproduction condition improves when the focus position is moved by a predetermined amount, and determines the first and second renewed focus position according to the judgment by the focus position renewal unit; and
  a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the focus error detection unit includes a balance adjustment unit for obtaining two focus signals, for weighting the obtained two focus signals by assigning weights to the two focus signals, and for calculating a difference between the weighted two focus signals.

4. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:

a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track, wherein the focus position renewal unit judges whether the reproduction condition improves when the focus position is moved by a predetermined amount, and determines the first and second renewed focus position according to the judgment by the focus position renewal unit;

a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal; and a tracking control unit for having the laser beam spot alternatively follow a first shape track and a second shape track, wherein the focus position renewal unit determines the first renewed focus position when the tracking control unit has the laser beam spot follow a first shape track, and the focus position renewal unit determines the second renewed focus position when the tracking control unit has the laser beam spot follow a second shape track.

5. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:

a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal; and an area detection unit for detecting whether the laser beam spot is positioned in a data area or an address area on the optical disc, wherein the reproduction condition detection unit detects a part of the reproduction signal according to the detection by the area detection unit, and detects the reproduction condition according to the detected part of the reproduction signal, wherein the reproduction condition detection unit detects the reproduction condition according to the detected part of the reproduction signal only when the area detection unit detects that the laser beam spot is positioned in an address area.

6. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:

a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal; and an area detection unit for detecting whether the laser beam spot is positioned in a data area or an address area on the optical disc, wherein the reproduction condition detection unit detects a part of the reproduction signal according to the detection by the area detection unit, and detects the reproduction condition according to the detected part of the reproduction signal, wherein the reproduction condition detection unit detects the reproduction condition according to the detected part of the reproduction signal only when the area detection unit detects that the laser beam spot is positioned in a data area.

7. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:

a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects the reproduction condition according to the reproduction signal and the focus error signal, and the reproduction condition detection unit includes:

an envelope detection unit for detecting an envelope of the reproduction signal; and a jitter detection unit for detecting jitter in the reproduction signal, and wherein the reproduction condition detection unit detects the reproduction condition according to the detected envelope, the detected jitter, and the focus error signal.

8. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:

a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects the reproduction condition according to the reproduction signal and the focus error signal, and the focus control unit adds a disturbance at a certain frequency when changing the focus position, and the reproduction condition detection unit further includes:

a first filter unit for detecting a frequency element from the envelope;

a second filter unit for detecting a frequency element from the jitter;

a third filter unit for detecting a frequency element from the focus error signal; and a reproduction condition determination unit for determining the reproduction condition using the frequency elements that have been detected from the first, second, and third filter units.

9. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and
a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects the reproduction condition according to the reproduction signal and the focus error signal, and;
an area detection unit for detecting whether the laser beam spot is positioned in a data area or an address area on the optical disc, wherein the reproduction condition detection unit detects the reproduction condition, ignoring the reproduction signal and the focus error signal when the laser beam spot is positioned in an address area.

10. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and
a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects the reproduction condition according to the reproduction signal and the focus error signal, and;
a face shake element exclusion filter for excluding a frequency element that represents a face shake of the optical disc from the focus error signal, wherein the reproduction condition detection unit detects the reproduction condition according to the reproduction signal and the focus error signal from which the frequency element has been removed.

11. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and
a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects the reproduction condition according to the reproduction signal and the focus error signal, and;

a sector designation unit for designating sectors which are positioned where a face shake acceleration is small, wherein the reproduction condition detection unit detects the reproduction condition according to the focus error signal and the reproduction signal that has been obtained from the designated sectors.

12. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
  a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and
  a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects the reproduction condition according to the reproduction signal and the focus error signal, and;

detection preparation unit for judging, when the focus position renewal unit is to determine the first and second renewed focus positions, whether information has been recorded on the optical disc before the determination by the focus position renewal unit, for moving, when information has been recorded, the focus position of the laser beam so that the reproduction condition is detected for the information, and for moving, when no information has been recorded, the laser beam focus position, recording test data on the optical disc, and having the reproduction condition detected for the test data.

13. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
  a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and
  a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects the reproduction condition according to the reproduction signal and the focus error signal, and the focus error detection unit includes:
    a balance adjustment unit for obtaining two focus signals, for weighting the obtained two focus signals by assigning weights to the two focus signals, and for calculating a difference between the weighted two focus signals; and
    an offset adjustment unit for adding an offset to the difference, and for outputting a sum of the offset and the difference as the focus error signal, and wherein the focus error signal modification unit modifies the focus error signal by changing at least one of a ratio between the weights and the offset.

14. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
　　a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and
　　a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects the reproduction condition according to the reproduction signal and the focus error signal, and the focus error detection unit includes an offset adjustment unit for obtaining two focus signals, for creating a signal that is a sum of a difference between the obtained two focus signals and an offset, and for outputting the created signal as the focus error signal.

15. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
　　a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and
　　a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects the reproduction condition according to the reproduction signal and the focus error signal, and the focus detection unit includes a balance adjustment unit for obtaining two focus signals, for weighting the obtained two focus signals by assigning weights to the two focus signals, and for calculating a difference between the weighted two focus signals.

16. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
　　a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and
　　a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, wherein the reproduction condition detection unit detects the reproduction condition according to the reproduction signal and the focus error signal, and a tracking control unit for having the laser beam spot alternatively follow a first shape track and a second shape track, wherein the focus position renewal unit determines a first renewed focus position when the tracking control unit has the laser beam spot follow a first shape track, and the focus position renewal unit determines a second renewed focus position when the tracking control unit has the laser beam spot follow a second shape track.

17. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, and;

a recording unit for recording test data on a test area that has been allocated in at least one of a lead-in area and a lead-out area on the optical disc, wherein the reproduction condition detection unit detects the reproduction condition according to the reproduction signal when the test data is read, wherein the recording unit selects a track in the test area at random, and records the test data on the selected track.

18. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, and;

a recording unit for recording test data on a test area that has been allocated in at least one of a lead-in area and a lead-out area on the optical disc, wherein the reproduction condition detection unit detects the reproduction condition according to the reproduction signal when the test data is read, track storage unit for storing a track identifier of a track in the test area on which the test data has been recorded; and track designation unit for controlling, when the focus position renewal unit is to determine the first and second renewed focus positions again, the reproduction condition detection unit so that the reproduction condition detection unit detects the reproduction condition using the test data that has been recorded on the track represented by the track identifier stored in the track storage unit before the determination by the focus position renewal unit.

19. A focus position adjustment device for an optical disc that includes a first shape track and second shape track, comprising:

focus error detection unit for detecting a convergence condition of a laser beam that is directed at the optical disc, and for outputting a focus error signal that represents the convergence condition;

focus control unit for changing a focus position of the laser beam according to the focus error signal so that the convergence condition is a predetermined condition;

reproduction condition detection unit for detecting a reproduction condition of the optical disc according to a reproduction signal when information that has been recorded on the optical disc is read;

track detection unit for detecting whether a laser beam spot is positioned on a first or second shape track, and for outputting a track identification signal that represents a track on which the laser beam spot is positioned; and focus position detection unit that includes:
- a focus position renewal unit for determining a first renewed focus position with an improved reproduction condition according to the reproduction condition when the track identification signal represents a first shape track, and for determining a second renewed focus position with an improved reproduction condition according to the reproduction condition when the track identification signal represents a second shape track; and
- a focus error signal modification unit for modifying the focus error signal so that the focus position is the first renewed focus position when the track identification signal represents a first shape track, and for modifying the focus error signal so that the focus position is the second renewed focus position when the track identification signal represents a second shape track, wherein the focus control unit changes the focus position of the laser beam according to the modified focus error signal, and;
- a recording unit for recording test data on a test area that has been allocated in at least one of a lead-in area and a lead-out area on the optical disc, wherein the reproduction condition detection unit detects the reproduction condition according to the reproduction signal when the test data is read,
- a poor condition judgment unit for judging whether the reproduction condition is of a poor condition in which the reproduction condition is beyond a predetermined tolerance level; and
- a re-detection unit for having the focus position renewal unit determine new first and second renewed focus positions and for having the focus error signal modification unit modify the focus error signal when the poor condition judgment unit has judged that the reproduction condition is the poor condition.

20. The focus position adjustment device according to claim 1 further comprising an area detection unit for detecting whether the laser beam spot is positioned in a data area or an address area on the optical disc, wherein the reproduction condition detection unit detects the error rate in the reproduction signal only when the laser beam spot is positioned in the address area.

21. The focus position adjustment device according to claim 2, wherein the focus error signal modification unit modifies the focus error signal by changing the ratio between the weights when the track identification signal represents the first shape track, and modifies the focus error signal by changing the offset when the track identification signal represents the second shape track.

22. The focus position adjustment device according to claim 2, wherein the focus error signal modification unit includes an offset storage unit for storing in advance an offset that makes the convergence condition of the laser beam when the track identification signal represents the first shape track equal to the convergence condition of the laser beam when the track identification signal represents the second shape track, wherein the focus error signal modification unit modifies the focus error signal by changing the ratio of the weights into a balance value when the track identification signal represents the first shape track, and wherein the focus error signal modification unit modifies the focus error signal by changing the ratio of the weights into the balance value and by changing the offset into the offset that has been stored in the offset storage unit when the track identification signal represents the second shape track.

23. The focus position adjustment device according to claim 2, wherein the focus error signal modification unit includes a balance storage unit for storing in advance ratios of the weights that make the convergence condition of the laser beam when the track identification signal represents the first shape track equal to the convergence condition of the laser beam when the track identification signal represents the second shape track as first and second balance values, wherein the focus error signal modification unit modifies the focus error signal by changing the ratio of the weights into the first balance value stored in the balance storage unit and by changing the offset into a new offset when the track identification signal represents the first shape track, and wherein the focus error signal modification unit modifies the focus error signal by changing the ratio of the weights into the second balance value stored in the balance storage unit and by changing the offset into the new offset when the track identification signal represents the second shape track.

24. The focus position adjustment device according to claim 1, wherein the focus error detection unit includes an offset adjustment unit for obtaining two focus signals, for creating a signal that is a sum of a difference between the obtained two focus signals and an offset, and for outputting the created signal as the focus error signal.

25. The focus position adjustment device according to claim 24, wherein the focus error signal modification unit modifies the focus error signal by changing the offset into a first value when the track identification signal represents the first shape track, and modifies the focus error signal by changing the offset into a second value when the track identification signal represents the second shape track.

26. The focus position adjustment device according to claim 3, wherein the focus error signal modification unit modifies the focus error signal by changing a ratio between the weights into a first value when the track identification signal represents the first shape track, and modifies the focus error signal by changing the ratio between the weights into a second value when the track identification signal represents the second shape track.

27. The focus position adjustment device according to claim 1 further comprising first tracking control unit for having the laser beam spot continuously follow tracks of a same shape, wherein the focus position renewal unit determines the first renewed focus position when the first tracking control unit has the laser beam spot follow the first shape track, and the second renewed focus position when the first tracking control unit has the laser beam spot follow the second shape track.

28. The focus position adjustment device according to claim 4, wherein
the tracking control unit has the laser beam spot repeatedly follow a first shape track and a second shape track, and
the focus position detection unit has the focus position renewal unit repeatedly determine the first and second renewed focus positions, and has the focus error signal modification unit repeatedly modify the focus error signal.

29. The focus position adjustment device according to claim 1 further comprising an area detection unit for detecting whether the laser beam spot is positioned in a data area or an address area on the optical disc, wherein the reproduction condition detection unit detects a part of the reproduction signal according to the detection by the area detection unit, and detects the reproduction condition according to the detected part of the reproduction signal.

30. The focus position adjustment device according to claim 8, wherein the reproduction condition determination unit calculates a sum of a value obtained by multiplying the frequency element from the first filter unit and a first coefficient together and a value obtained by multiplying the frequency element from the second filter unit and a second coefficient together, multiplies the calculated sum and the frequency element from the third filter unit together to obtain an arithmetic value, and determines the reproduction condition using the obtained arithmetic value.

31. The focus position adjustment device according to claim 30, wherein the reproduction condition determination unit calculates a mean arithmetic value over a period that is equal to or longer than a rotation cycle of the optical disc, and determines the mean arithmetic value as the reproduction condition.

32. The focus position adjustment device according to claim 31 further comprising area detection unit for detecting whether the laser beam spot is positioned in a data area or an address area on the optical disc, wherein the reproduction condition determination unit calculates the mean arithmetic value only when the laser beam spot is not positioned in an address area.

33. The focus position adjustment device according to claim 32 further comprising sector designation unit for designating sectors which are positioned where a face shake acceleration is small, wherein the reproduction condition determination unit calculates the mean arithmetic value that has been obtained from the designated sectors.

34. The focus position adjustment device according to claim 13, wherein the focus error signal modification unit modifies the focus error signal by changing the ratio between the weights when the track identification signal represents the first shape track, and modifies the focus error signal by changing the offset when the track identification signal represents the second shape track.

35. The focus position adjustment device according to claim 13, wherein the focus error signal modification unit includes an offset storage unit for storing in advance an offset that makes the convergence condition of the laser beam when the track identification signal represents the first shape track equal to the convergence condition of the laser beam when the track identification signal represents the second shape track, wherein the focus error signal modification unit modifies the focus error signal by changing the ratio of the weights into a balance value when the track identification signal represents the first shape track, and wherein the focus error signal modification unit modifies the focus error signal by changing the ratio of the weights into the balance value and by changing the offset into the offset that has been stored in the offset storage unit when the track identification signal represents the second shape track.

36. The focus position adjustment device according to claim 13, wherein the focus error signal modification unit includes a balance storage unit for storing in advance ratios of the weights that make the convergence condition of the laser beam when the track identification signal represents the first shape track equal to the convergence condition of the laser beam when the track identification signal represents the second shape track as first and second balance values, wherein the focus error signal modification unit modifies the focus error signal by changing the ratio of the weights into the first balance value stored in the balance storage unit and by changing the offset into a new offset when the track identification signal represents the first shape track, and wherein the focus error signal modification unit modifies the focus error signal by changing the ratio of the weights into the second balance value stored in the balance storage unit and by changing the offset into the new offset when the track identification signal represents the second shape track.

37. The focus position adjustment device according to claim 14, wherein the focus error signal modification unit modifies the focus error signal by changing the offset into a first value when the track identification signal represents the first shape track, and modifies the focus error signal by changing the offset into a second value when the track identification signal represents the second shape track.

38. The focus position adjustment device according to claim 15, wherein the focus error signal modification unit modifies the focus error signal by changing a ratio between the weights into a first value when the track identification signal represents the first shape track, and modifies the focus error signal by changing the ratio between the weights into a second value when the track identification signal represents the second shape track.

39. The focus position adjustment device according to claim 19 further comprising first tracking control means for having the laser beam spot continuously follow tracks of a same shape, wherein the focus position renewal unit determines the first renewed focus position when the first tracking control means has the laser beam spot follow the first shape track, and the second renewed focus position when the first tracking control means has the laser beam spot follow the second shape track.

40. The focus position adjustment device according to claim 16, wherein the tracking control unit has the laser beam spot repeatedly follow a first shape track and a second shape track, and the focus position detection unit has the focus position renewal unit repeatedly determine the first and second renewed focus positions, and has the focus error signal modification unit repeatedly modify the focus error signal.

41. The focus position adjustment device according to claim 1 further comprising recording means for recording test data on a test area that has been allocated in at least one of a lead-in area and a lead-out area on the optical disc, wherein the reproduction condition detection means detects the reproduction condition according to the reproduction signal when the test data is read.

42. The focus position adjustment device according to claim 19, wherein the poor condition judgement means judges that the reproduction condition is the poor condition when a retry for reproduction has been repeated more than a predetermined number of times.

43. The focus position adjustment device according to claim 19, wherein the poor condition judgement means judges that the reproduction condition is the poor condition when a value of power of the laser beam in recording is larger than a predetermined value.

* * * * *